US009849861B2

(12) United States Patent
Kim et al.

(10) Patent No.: US 9,849,861 B2
(45) Date of Patent: Dec. 26, 2017

(54) WIPER BLADE

(71) Applicant: THE KOREA DEVELOPMENT BANK, Seoul (KR)

(72) Inventors: In Kyu Kim, Ansan-si (KR); Kyung Su Kim, Cheongyang-gun (KR); Kyung Jong Nam, Cheongyang-gun (KR); Sang Jin Jeong, Cheongyang-gun (KR)

(73) Assignee: THE KOREA DEVELOPMENT BANK, Seoul (KR)

( * ) Notice: Subject to any disclaimer, the term of this patent is extended or adjusted under 35 U.S.C. 154(b) by 587 days.

(21) Appl. No.: 14/314,186

(22) Filed: Jun. 25, 2014

(65) Prior Publication Data

US 2014/0304936 A1     Oct. 16, 2014

Related U.S. Application Data

(63) Continuation of application No. 13/689,140, filed on Nov. 29, 2012, now Pat. No. 8,800,096.

(30) Foreign Application Priority Data

Dec. 1, 2011   (KR) .................. 10-2011-0127918
Jul. 5, 2012   (KR) .................. 10-2012-0073347

(51) Int. Cl.
*B60S 1/38*     (2006.01)
*B60S 1/04*     (2006.01)

(52) U.S. Cl.
CPC .......... *B60S 1/3806* (2013.01); *B60S 1/0408* (2013.01); *B60S 1/3801* (2013.01); *B60S 2001/3815* (2013.01)

(58) Field of Classification Search
CPC .... B60S 1/3801; B60S 1/3806; B60S 1/0408; B60S 2001/3813; B60S 2001/3815
USPC ........... 15/250.361, 250.44, 250.46, 250.201
See application file for complete search history.

(56) References Cited

U.S. PATENT DOCUMENTS 3,673,631 A * 7/1972 Yamadai ............... B60S 1/3806
                                           15/250.201
4,766,636 A   8/1988 Shinpo
4,852,206 A   8/1989 Fisher
4,953,251 A   9/1990 Chow
(Continued)

FOREIGN PATENT DOCUMENTS

CN      101239614 A    8/2008
CN      101959726 A    1/2011
(Continued)

OTHER PUBLICATIONS

Japanese Patent Office, Communication issued in corresponding Japanese Patent Application No. 2012-262279 dated Dec. 13, 2013.
(Continued)

*Primary Examiner* — Gary Graham
(74) *Attorney, Agent, or Firm* — Sughrue Mion, PLLC

(57) ABSTRACT

A wiper blade having a lever assembly and a spoiler integrated in the lever assembly. The wiper blade has a wiper rubber and the lever assembly holding the wiper rubber and being coupled to a wiper arm. The lever assembly has a plurality of levers, adjacent levers of which are hinge-jointed to each other. The lever of the lever assembly includes a spoiler portion forming a section of a spoiler integrated in the lever.

11 Claims, 83 Drawing Sheets

(56) References Cited

U.S. PATENT DOCUMENTS

| | | |
|---|---|---|
| 5,325,563 A | 7/1994 | Cayan |
| 5,546,627 A | 8/1996 | Chen |
| 5,893,192 A | 4/1999 | Lee |
| 5,946,764 A | 9/1999 | Tworzydlo |
| 6,336,243 B1 * | 1/2002 | Charng ................ B60S 1/3806 15/250.201 |
| 6,622,339 B1 | 9/2003 | Zimmer |
| 8,020,249 B2 | 9/2011 | Masuda et al. |
| 8,181,308 B2 | 5/2012 | Kwon et al. |
| 8,347,450 B2 | 1/2013 | Amano |
| 8,533,897 B2 | 9/2013 | Kim |
| 2002/0133896 A1 * | 9/2002 | Herinckx ............... B60S 1/3801 15/250.46 |
| 2004/0010881 A1 | 1/2004 | Roekens |
| 2006/0064841 A1 | 3/2006 | Nakano |
| 2011/0225761 A1 | 9/2011 | Kim |

FOREIGN PATENT DOCUMENTS

| | | |
|---|---|---|
| EP | 0343869 A2 | 5/1989 |
| GB | 2103075 A | 2/1983 |
| JP | 58-36748 A | 3/1983 |
| JP | 1992-062257 U | 5/1992 |
| JP | 7-28759 U | 5/1995 |
| JP | 11-263199 A | 9/1999 |
| JP | 11-514945 A | 12/1999 |
| JP | 2003-160028 A | 6/2003 |
| JP | 2007-55589 A | 3/2007 |
| JP | 2008-254585 A | 10/2008 |
| JP | 2011-116365 A | 6/2011 |
| KR | 10-2003-0031158 A | 4/2003 |
| KR | 10-2006-0051763 A | 5/2006 |
| KR | 10-0717516 B1 | 5/2007 |
| KR | 10-2008-009440 A | 10/2008 |
| KR | 10-2010-0059580 A | 6/2010 |
| KR | 20-0449008 Y1 | 6/2010 |
| WO | 2008/126406 A1 | 10/2008 |
| WO | 2010062125 A2 | 6/2010 |

OTHER PUBLICATIONS

Chinese Patent Office, Office Action issued by in Chinese Patent Application No. 201210511015.5 dated Sep. 26, 2014.

\* cited by examiner

WIPER BLADE

CROSS-REFERENCE TO RELATED APPLICATIONS

This is continuation application of U.S. patent application Ser. No. 13/689,140 (allowed), filed Nov. 29, 2012, which claims priority from Korean Patent Application No. 10-2011-0127918 filed on Dec. 1, 2011 and Korean Patent Application No. 10-2012-0073347 filed on Jul. 5, 2012, the entire subject matters of which are incorporated herein by reference.

TECHNICAL FIELD

The present invention relates to a wiper blade for wiping a windshield of a motor vehicle. More particularly, the present invention relates to a wiper blade with a spoiler.

BACKGROUND

Motor vehicles are equipped with a windshield wiper device for cleaning or wiping a surface of a windshield. The windshield wiper device includes a wiper blade, a wiper arm and a wiper motor oscillating the wiper arm. The wiper blade is releasably coupled to the wiper arm. The wiper blade is placed on the surface of the windshield by the wiper arm. The wiper blade wipes the surface of the windshield while sliding thereon through oscillation motions of the wiper arm.

The wiper blade has an elongated wiper rubber and a frame structure. The wiper rubber is placed in contact with the windshield surface. The frame structure holds and supports the wiper rubber along its length. The frame structure may include an assembly having a main lever and a plurality of yoke levers linked to the main lever. The main lever is connected to the wiper arm. The yoke lever is linked to the main lever or another yoke lever at its middle. The yoke levers hold the wiper rubber.

When a motor vehicle runs, wind or air stream impinging against the windshield applies a force to the wiper blade along the entire length of the wiper blade placed on the windshield. The wiper blade generally stands upright on the surface of the inclined windshield. Thus, the force applied by the wind or air stream acts in a direction of lifting the wiper blade from the surface of the windshield. The faster the motor vehicle runs, the stronger such a lift force would be. This weakens the contact between the wiper rubber and the windshield surface, thus deteriorating wiping performance.

To address the deterioration in wiping performance caused by the lift of a wiper blade, it is known in the art to attach a spoiler to the wiper blade. The spoiler interacts with wind or air stream and thereby applies a force in a direction opposite to the lift of the wiper blade. By way of example, Korean Patent Application Publication No. 10-2003-0031158 discloses a wiper blade with a spoiler attached to a main lever. It is also disclosed in the art to attach a cover to a wiper blade so as to cover a main lever and a yoke lever. By way of another example, Korean Patent Application Publication No. 10-2006-0051763 discloses a wiper blade with such a cover.

SUMMARY

The lower an entire height of the lever assembly holding the wiper blade, the less air resistance the lever assembly could be subjected to. However, the prior art lever assembly of the wiper blade has difficulties in reducing its entire height due to a furcate configuration of its levers. The wiper blade with the spoiler attached to the lever assembly requires that the spoiler be prepared separately from and attached to the lever assembly. This may increase manufacturing cost of the wiper blade and further lead to detachment of the spoiler from the wiper blade. Further, the wiper blade with the cover covering the lever assembly needs parts for joining the cover to the lever assembly. This may increase the number of the parts of the wiper blade and cause increase in manufacturing cost.

The present invention is directed to solving the aforementioned problems of the prior art. The present invention provides a wiper blade wherein a lever assembly holding a wiper rubber has a low entire height. Further, the present invention provides a wiper blade wherein a spoiler is integrated in a lever assembly.

In one exemplary embodiment of the present invention, the wiper blade includes a wiper rubber and a lever assembly holding the wiper rubber and coupled to a wiper arm. The lever assembly includes a plurality of levers, adjacent levers of which are hinge-jointed to each other. The lever includes a spoiler portion forming a section of a spoiler, which is integrated in the lever.

In an embodiment of the present invention, the spoiler portion includes an inclined surface extending in a longitudinal direction of the wiper rubber and defining the section of a spoiler. At least a portion of a lateral surface of the spoiler portion forms the inclined surface.

In an embodiment of the present invention, the inclined surface comprises a forward inclined surface facing forward in a running direction of a motor vehicle and a backward inclined surface opposed to the forward inclined surface. The lever has at least one air hole in the backward inclined surface.

In an embodiment of the present invention, one of the adjacent levers includes an arm extending from the spoiler portion thereof toward the other of the adjacent levers and holding the wiper rubber at a distal end. The arm is situated in and hinge-jointed to the spoiler portion of the other of the adjacent levers. The arm is hidden in the spoiler portion of the other of the adjacent levers. The arm and the spoiler portion of the one of the adjacent levers extend straight.

In an embodiment of the present invention, the other of the adjacent levers includes a joint portion extending from the spoiler portion thereof toward the one of the adjacent levers and hinge-jointed to the arm. The lever assembly further includes a joint cover that is coupled to the joint portion between the one of the adjacent levers and the other of the adjacent levers. The joint cover has a cross-sectional profile corresponding to a cross-sectional profile of the spoiler portion of the one of the adjacent levers and a cross-sectional profile of the spoiler portion of the other of the adjacent levers.

In an embodiment of the present invention, the lever assembly further includes a joint nested on and hinge-jointed to the arm. The joint is coupled to the spoiler portion of the other of the adjacent levers.

In an embodiment of the present invention, one of the arm and the spoiler portion of the other of the adjacent levers includes a pair of hinge pins, while the other of the arm and the spoiler portion of the other of the adjacent levers includes a pair of fitting holes to which the pair of the hinge pins are fitted respectively. The spoiler portion of the other of the adjacent levers includes a pair of raised portions therein. The raised portions are spaced apart to receive the arm. Opposing end surfaces of the adjacent levers are inclined at an acute angle toward an end of the wiper rubber. An outermost lever of the levers includes: a clamp formed at an end portion of the spoiler portion thereof and holding the wiper rubber; and a pressing portion located opposite to the clamp and bringing the wiper rubber into contact with the clamp. The lever has a plurality of transverse ribs and a longitudinal rib intersecting the transverse ribs.

In an embodiment of the present invention, an outermost lever of the levers includes a clamp formed at an end portion of the spoiler portion thereof and holding the wiper rubber; and a clamp insert fitted to the clamp and bringing the wiper rubber into contact with the clamp.

In an embodiment of the present invention, the lever assembly includes a covering sheet covering an interior of the lever assembly.

In an embodiment of the present invention, the section of a spoiler comprises a central spoiler and an end spoiler adjoining the central spoiler and the plurality of the levers comprises a central lever and a pair of end levers. The central lever includes a pair of central spoiler portions each forming the central spoiler and is coupled to the wiper arm between the central spoiler portions. Each of the end levers includes an end spoiler portion and an end arm. The end spoiler portion forms the end spoiler and adjoins the central spoiler portion. The end spoiler portion holds the wiper rubber. The end arm is hidden in and hinge-jointed to the central spoiler portion. The end arm extends from the end spoiler portion toward the central lever and holds the wiper rubber.

In an embodiment of the present invention, the section of a spoiler comprises a central spoiler, an intermediate spoiler adjoining the central spoiler and an end spoiler adjoining the intermediate spoiler. The plurality of the levers comprises a central lever, a pair of intermediate levers and a pair of end levers. The central lever includes a pair of central spoiler portions each forming the central spoiler and is coupled to the wiper arm between the central spoiler portions. Each of the intermediate levers includes an intermediate spoiler portion and intermediate arm. The intermediate spoiler portion forms the intermediate spoiler and adjoins the central spoiler portion. The intermediate arm is hidden in and hinge-jointed to the central spoiler portion. The intermediate arm extends from the intermediate spoiler portion toward the central lever and holds the wiper rubber. Each of the end levers includes an end spoiler portion and an end arm. The end spoiler portion forms the end spoiler and adjoins the intermediate spoiler portion. The end spoiler portion holds the wiper arm. The end arm is hidden in and hinge-jointed to the intermediate spoiler portion. The end arm extends from the end spoiler portion toward the intermediate lever and holds the wiper rubber. The intermediate lever includes a yoke lever that is hinge-jointed to a distal end of the intermediate arm and holds the wiper rubber at both ends.

In an embodiment of the present invention, the spoiler has a cross-sectional profile that varies in a longitudinal direction of the wiper rubber or includes one of a triangle with both curved legs, a semicircle and a semiellipse.

In the wiper blades according to the embodiments, the lever assembly includes a plurality of levers and the spoiler portion of each lever forms the section of a spoiler of the wiper blade. The lever assembly is configured such that the spoiler portions of the respective levers are straight adjoined one after another and a portion of one lever except for its spoiler portion is hidden in the spoiler portion of another adjacent lever. Thus, the lever assembly has a low entire height and the spoiler portions adjoined one after another in the lever assembly form a spoiler of the wiper blade.

Accordingly, due to the lever assembly with the spoiler integrated therein and having straight-adjoined levers, the wiper blade can have a smaller number of parts and effectively prevent its lift.

BRIEF DESCRIPTION OF THE DRAWINGS

Arrangements and embodiments may be described in detail with reference to the following drawings in which like reference numerals refer to like elements or components, wherein.

DETAILED DESCRIPTION

Figure 1:
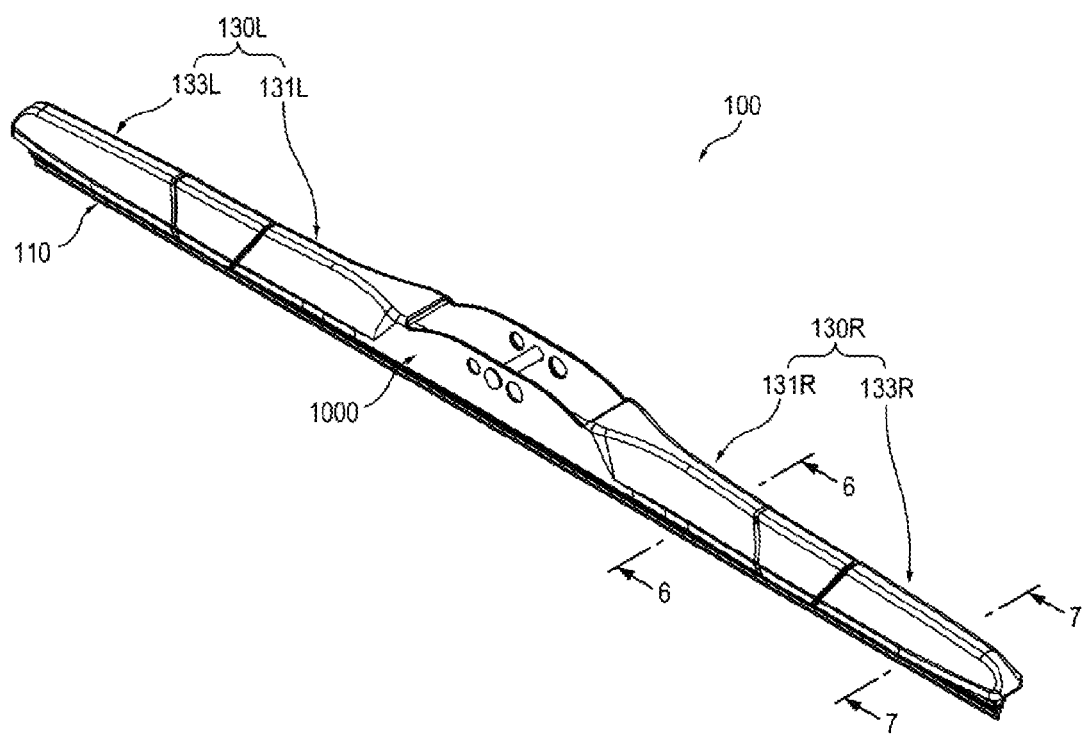
FIG. 1 is a perspective view showing a wiper blade in accordance with a first embodiment.

Detailed descriptions are made as to embodiments of a wiper blade with reference to the accompanying drawings. The directional term "upper," "upward" or the like as used herein is generally based on a position, in which a lever assembly is disposed relative to a wiper rubber in the drawings, while the directional term "lower," "downward" or the like generally refers to a direction opposite to the upper or upward direction. A wiper blade shown in the accompanying drawings may be otherwise oriented (e.g., rotated 180 degrees or at other orientations) and the aforementioned directional terms may be interpreted accordingly. Further, as used herein, the term "longitudinal inner end" or "longitudinal inner end portion" generally refers to an end that is closer to a center of a wiper blade in a longitudinal direction of an element, while the term "longitudinal outer end" or "longitudinal outer end portion" refers to the other end opposite to the inner end or the inner end portion.

Wiper blades according to embodiments have a lever assembly that holds or retains a wiper rubber to be placed on a surface of a windshield. The lever assembly is coupled to a wiper arm and supports the wiper rubber. The lever assembly includes a plurality of levers, which are joined straight one after another in a longitudinal direction of the wiper rubber and are at substantially the same height on the wiper rubber. Two adjacent levers are hinge-jointed to each other.

Further, the wiper blades according to embodiments include a spoiler that produces a reaction force preventing the lift of the wiper blade, which wind or air stream may cause. The spoiler is integrated in the lever assembly in the longitudinal direction of the wiper blade. A spoiler section, which becomes a section of the spoiler, is integrated in each lever of the lever assembly. That is, each lever has a spoiler portion defining said spoiler section. Since the levers are arranged in a straight line, the spoiler portions of the respective levers are adjoined one after another, thus forming the portion or the entirety of the spoiler.

The spoiler portion has at least one or a pair of inclined surfaces that produce the reaction force preventing the lift caused by wind or air stream. The inclined surface extends in the spoiler portion in the longitudinal direction of the wiper rubber and defines the spoiler section that is located in each lever. Further, the inclined surface forms the portion or the entirety of a lateral surface of the spoiler portion. The inclined surface may include a flat surface, a concave or convex curved surface, etc. The pair of the inclined surfaces may be at least partially symmetrical in a width direction of each lever. Further, one of the pair of the inclined surfaces may have a width larger than that of the other.

One or more levers among the levers of the lever assembly have a holding portion configured to hold the wiper rubber. The holding portion comprises an arm that extends from the spoiler portion provided in one of two adjacent levers toward the other of the adjacent levers, which is further inward or outward than the one of the adjacent levers in the lever assembly. Lower edges of the arm and the spoiler portion are approximately straight. That is, the arm and the spoiler extend in a straight line. The adjacent levers are joined to each other in such a manner that the arm of one of the levers is situated in the spoiler portion of the other of the levers and the arm and the spoiler portion of the other lever are hinge-jointed to each other. When the adjacent levers are joined together, the respective spoiler portions are at an approximately equal height on the wiper rubber and the arm of one of the adjacent levers is hidden inside the spoiler portion of the other adjacent levers.

In the embodiments, the lever assembly has a central lever to be coupled to a wiper arm. The lever assembly is constructed in such a manner that levers configured to hold the wiper rubber are joined to the central lever. In one embodiment, the lever assembly includes a central lever and a pair of end levers, thus holding the wiper rubber at four pressure points. The central lever is located in the middle of the lever assembly and the end levers are located at an outermost position in the lever assembly. In another embodiment, the lever assembly includes a central lever, a pair of intermediate levers and a pair of end levers, thus holding the wiper rubber at six or eight pressure points. The intermediate lever is interposed between the central lever and the outermost end lever.

FIGS. 1 to 29 show a wiper blade according to a first embodiment, generally denoted by 100, and elements or components constituting the wiper blade 100. The wiper blade 100 has a wiper strip or wiper rubber 110, which is placed on a surface of a windshield of a motor vehicle, and a lever assembly 1000 holding the wiper rubber 110. Further, the wiper blade 100 includes a pair of spoilers 130L, 130R that produce a reaction force preventing the lift caused by wind or air stream. The left spoiler 130L and the right spoiler 130R are symmetrical relative to a longitudinal center of the wiper rubber 110. The spoilers 130L, 130R are integrally formed in the lever assembly 1000 and extend in the longitudinal direction of the wiper rubber 110.

Figure 8:
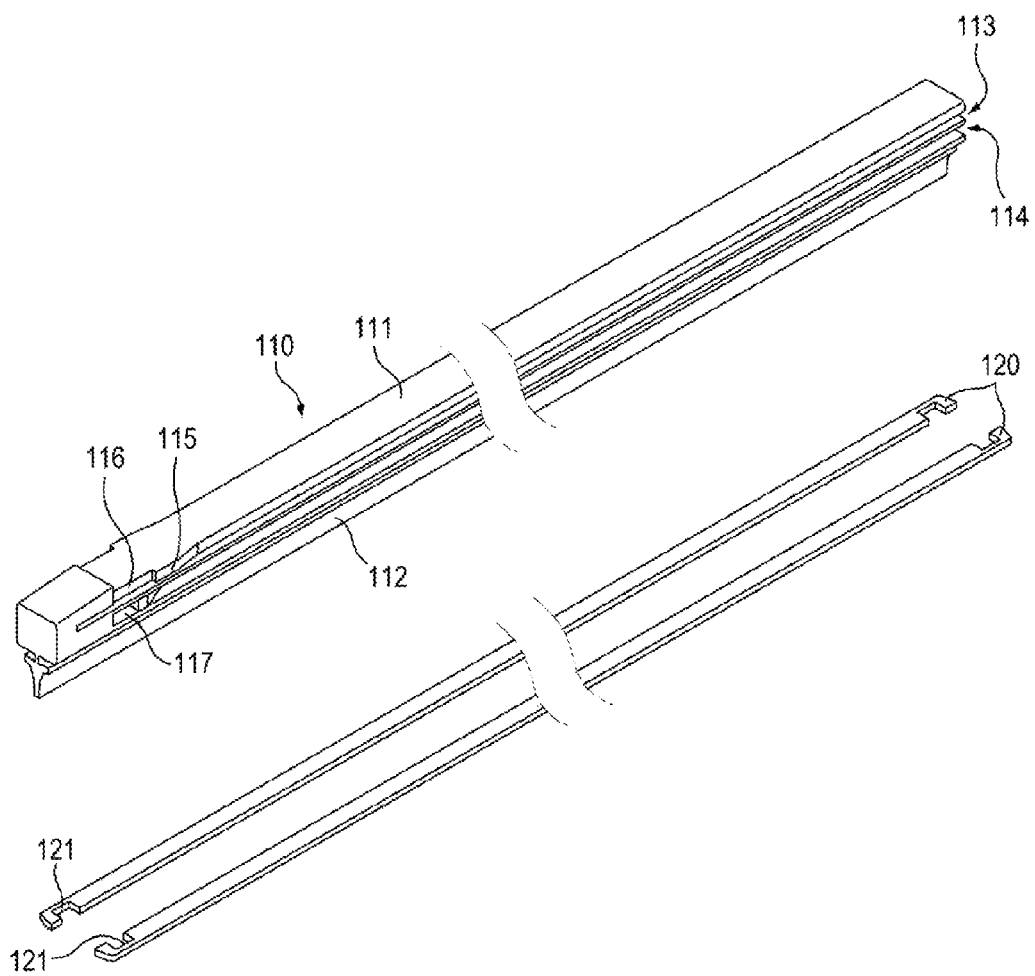
FIG. 8 is a perspective view showing a wipe rubber and spring rails of the wiper blade according to the first embodiment.
Figure 9:
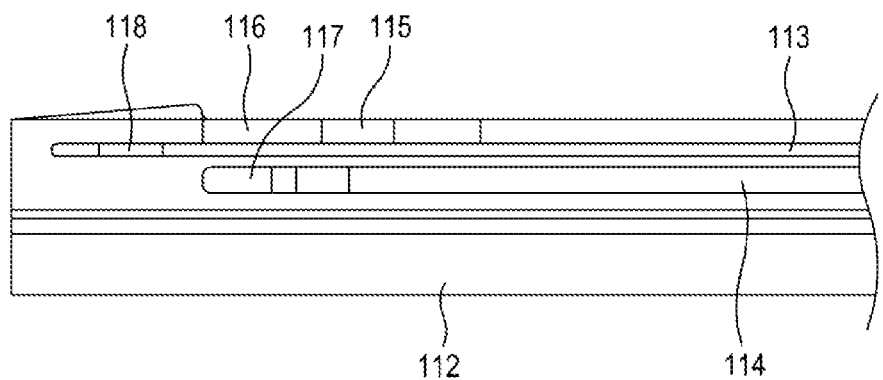
FIG. 9 is a fragmental front view of the wiper rubber shown in FIG. 8.
Figure 10:
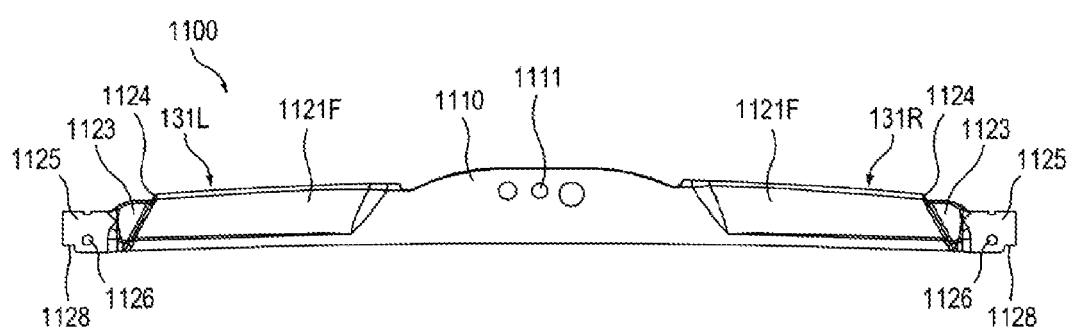
FIG. 10 is a front view of a central lever of the wiper blade according to the first embodiment.
Figure 11:
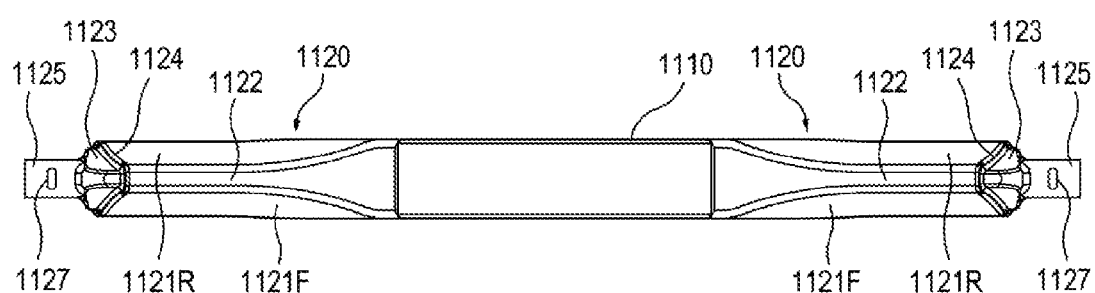
FIG. 11 is a top view of the central lever shown in FIG. 10.
Figure 12:
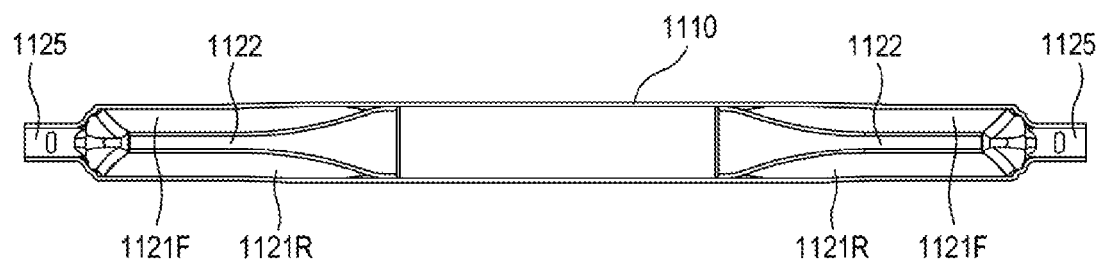
FIG. 12 is a bottom view of the central lever shown in FIG. 10.
Figure 13:
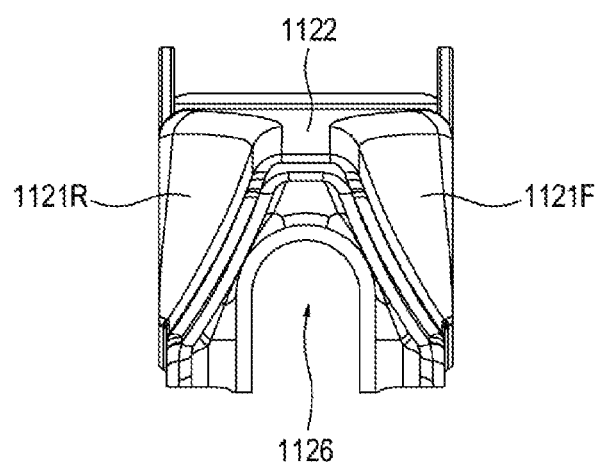
FIG. 13 is a left side view of the central lever shown in FIG. 10.

The wiper rubber 110 may be made from a rubber or plastic material having elasticity. Referring to FIGS. 8 and 9, the wiper rubber 110 has an elongated body portion 111 and a wiper lip 112 longitudinally extending beneath the body portion 111 and contacting the windshield surface. Further, the wiper rubber 110, at either side of the body portion 111, has two rows of grooves 113, 114 that extend in the longitudinal direction of the wiper rubber. A first groove 113 extends along the body portion 111 right below a top side of the body portion 111. A second groove 114 extends along the body portion 111 below the first groove 113. Spring rails 120 are inserted to the first grooves 113 respectively. Both ends of a clamp provided in a lever of the lever assembly 1000 are fitted to the second grooves 114 respectively. Further, a portion, to which an outermost clamp of the clamps of the levers is fitted, is formed in the vicinity of one end of the wiper rubber 110. That is, in the vicinity of the one end of the wiper rubber 110, stoppers 115 protrude between the top side and the first grooves 113 and recesses 116 are defined in edges of the top side due to the stoppers 115. Further, insertion holes 117, to which the ends of the outermost clamp are inserted to, are formed below the recesses 116. The insertion holes 117 are located in the vicinity of the one end of the second groove 114. When the lever assembly 1000 and the wiper rubber 110 are assembled together, the ends of the outermost clamp are fitted to the insertion holes 117 and a part to be inserted to the outermost clamp (this will be described below) is placed in the recesses 116, thus holding the wiper rubber 110 against the outermost clamp.

The spring rails 120 (referred to as a "vertebra" in the art) are inserted to the wiper rubber 110 in the longitudinal direction and impart rigidity to the wiper rubber 110. Further, the spring rails 120 distribute pressure applied by a wiper arm, along the entire length of the wiper rubber 110. The spring rails 120 are made from a metallic material and have a shape of a thin elongated bar. The spring rails 120 are inserted to the first grooves 113 of the wiper rubber 110 respectively. The spring rail 120 has a concave notch 121 at either end and the first groove 113 has a protrusion 118 engaging the notch. Some embodiments may include the spring rails 120 that are inlaid or embedded to the body portion 111 of the wiper rubber 110.

The lever assembly 1000 connects the wiper rubber 110, to which the spring rails 120 are fitted to (hereinafter, the wiper rubber with the spring rails fitted thereto is referred to as a "wiper rubber assembly 110, 120"), to a wiper arm (not shown) of a wiper device. Further, the lever assembly 1000 supports the wiper rubber assembly 110, 120 with respect to the wiper arm. The wiper arm is coupled to a rotating shaft of a wiper motor of the wiper device at its base end and is oscillated by the wiper motor. The wiper blade 100 is coupled to the wiper arm in such a manner that the lever assembly 1000 is releasably attached to a distal end of the wiper arm. The wiper blade 100 wipes the surface of the windshield while sliding thereon through oscillation motions of the wiper arm. In this embodiment, the lever assembly 1000 includes a central lever 1100 centrally located with respect to the wiper rubber assembly 110, 120 and a pair of end levers 1300L, 1300R joined to the central lever respectively. The levers have an elongated hollow shape and may be made by pressing a metallic sheet or injection-molding a plastic material.

Figure 2:
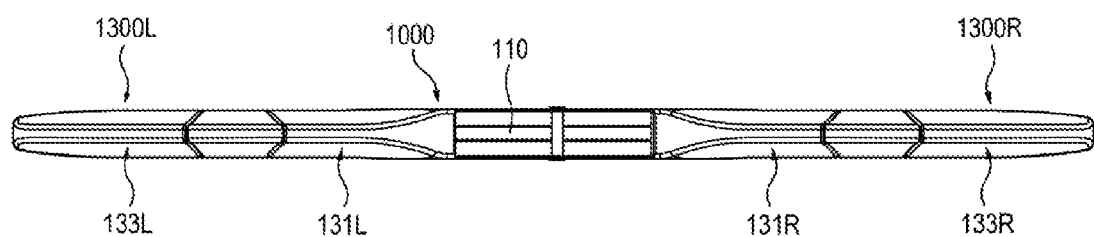
FIG. 2 is a top view of the wiper blade shown in FIG. 1.
Figure 3:
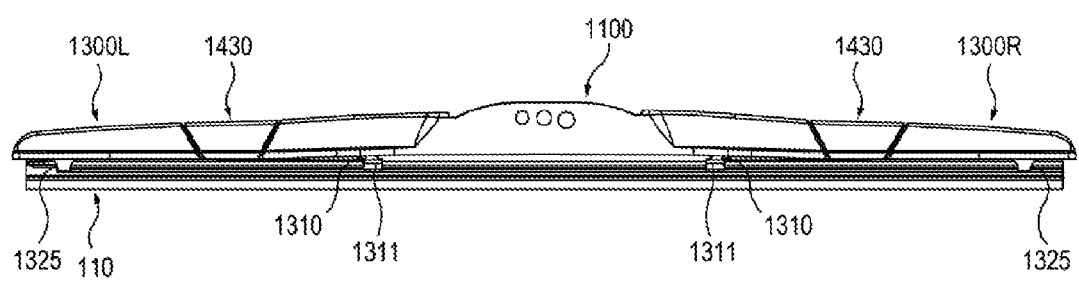
FIG. 3 is a front elevational view of the wiper blade shown in FIG. 1.
Figure 4:
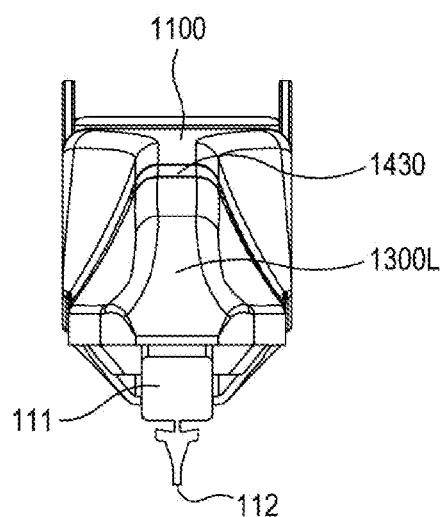
FIG. 4 is a left side view of the wiper blade shown in FIG. 1.
Figure 5:
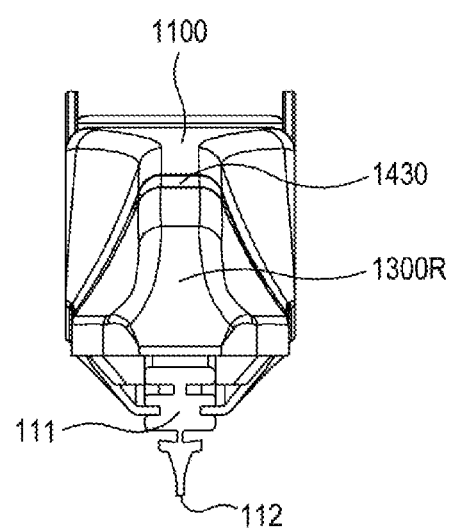
FIG. 5 is a right side view of the wiper blade shown in FIG. 1.
Figure 6:
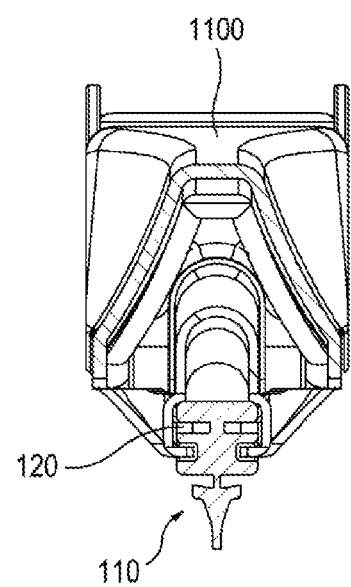
FIG. 6 is a sectional view taken along the line 6-6 in FIG. 1.
Figure 7:
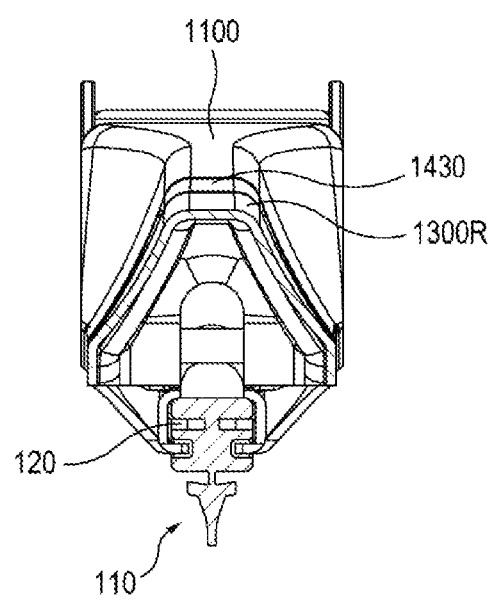
FIG. 7 is a sectional view taken along the line 7-7 in FIG. 1.

Referring to FIGS. 1 to 3, the pair of the spoilers 130L, 130R are formed in an upper surface of the lever assembly 1000 along its longitudinal direction (or along the longitudinal direction of the wiper rubber 110). A portion of the upper surface of the lever assembly 1000 (a portion of an upper or lateral surface of each lever constituting the lever assembly) forms the spoiler 130L, 130R. Each spoiler 130L, 130R reacts to wind or air stream impinging against the wiper blade 100 during running of a motor vehicle and produces a reaction force preventing the wiper blade 100 from being lifted. Such a reaction force is produced by interaction between wind or air stream and a contour of a cross-section (hereinafter referred to as a "cross-sectional profile") of the spoiler 130L, 130R. The cross-sectional profile may be constant or may vary (e.g. diminish or enlarge) in the longitudinal direction of the lever assembly 1000. That is, the cross-sectional profile may be constant in the longitudinal direction of the lever assembly 1000 or may diminish in width and height dimensions toward a distal end of the wiper blade 100. Further, the cross-sectional profile may be symmetrical or asymmetrical in a width direction of the lever assembly (in a direction perpendicular to the longitudinal direction of the wiper rubber). In this embodiment, as shown in FIGS. 6 and 7, the cross-sectional profile of the spoiler 130L, 130R includes a triangle with somewhat concave legs. That is, the cross-sectional profile of the spoiler 130L, 130R includes a pair of concave curves that are symmetrical in the width direction of the wiper rubber 110.

Since a pair of the end levers 1300L, 1300R are joined to the central lever 1100, each longitudinal half of the lever assembly 1000 has the same configuration. Each spoiler 130L, 130R comprises spoiler sections located in respective levers 1100, 1300L, 1300R of the lever assembly 1000. The spoiler sections of the respective levers are straight adjoined one after another, i.e., they are consecutively adjoined with the spoiler sections of adjacent levers adjoining each other, thereby defining the spoiler 130L, 130R of the wiper blade 100. A spoiler portion included in each lever forms each corresponding spoiler section. Further, a portion of the upper surface of the lever, specifically a portion of a lateral surface of the lever, more specifically a portion or the entirety of the lateral surface of the spoiler portion forms the corresponding spoiler section. In the below descriptions on the wiper blade 100 according to the first embodiment, regarding the spoiler 130L, 130R integrally formed in the lever assembly 1000, a spoiler section integrated in the central lever 1100 to become a section of the spoiler 130L, 130R is referred to as a central spoiler 131L, 131R, while a spoiler section integrated in the end lever 1300L, 1300R to become another section of the spoiler 130L, 130R is referred to as an end spoiler 133L, 133R.

The central lever 1100 is releasably coupled to the distal end of the wiper arm. Referring to FIGS. 10 to 13, the central lever 1100 includes a bracket portion 1110 at its middle. Further, the central lever 1100 includes a pair of central spoiler portions 1120 that extend from the bracket portion 1110 in opposite longitudinal directions (in the longitudinal direction of the wiper rubber 110) and form the central spoiler 131L, 131R respectively.

The bracket portion 1110 generally has a shape of a vertically-pierced rectangular parallelepiped. Fitting apertures 1111 are formed in widthwise opposing lateral walls of the bracket portion 1110 respectively. A pin or rivet 1112 (see FIG. 25) is fitted to the fitting apertures 1111. The rivet 1112 participates in connection to the wiper arm. An adaptor (not shown), which is configured to be connected to a corresponding element provided in the distal end of the wiper arm through fitting, snapping, engaging, etc., may be coupled to the rivet 1112. The rivet 1112 may function as a pivot shaft of the wiper blade 100.

A lower edge of the central lever 1100 (lower edges of the bracket portion 1110 and the central spoiler portion 1120) is straight or upwardly curved with slight curvature. The central spoiler portion 1120 has an inverted V-shaped cross-section. The central spoiler portion 1120 has a pair of inclined surfaces 1121F, 1121R that are symmetrical in the width direction of the central lever 1100. The inclined surfaces 1121F, 1121R are located in the lateral surfaces of the central spoiler portion 1120. The inclined surfaces 1121F, 1121R extend in the longitudinal direction of the wiper rubber 110 in the central lever 1100 and form the lateral surfaces of the central spoiler portion 1120. Accordingly, the central spoiler 131L, 131R is integrated in the central lever 1100 through the central spoiler portion 1120 having the inclined surfaces 1121F, 1121R. An apex portion 1122 interconnects the inclined surfaces 1121F, 1121R at their upper edges.

The inclined surfaces 1121F, 1121R may include a flat, concave or convex surface. In this embodiment, the inclined surfaces 1121F, 1121R are concave. A width of the apex portion 1122 becomes sharply narrow from the bracket portion 1110 and is then constant. The inclined surfaces 1121F, 1121R are concave in harmony with such a width of the apex portion 1122. Thus, the cross-sectional profile of the central spoiler 131L, 131R, which the inclined surfaces 1121F, 1121R of the central spoiler portion 1120 define, is generally a triangle with both concave legs. The central spoiler portion 1120 has a stepped surface 1124 that is further inward than a longitudinal outer end portion 1123. The stepped surface 1124 is inclined at an acute angle toward the center of the central lever 1100. The longitudinal outer end portion 1123 has width and height dimensions less than those of the central spoiler portion 1120. Further, the central lever 1100 has a joint portion 1125 extending from the longitudinal outer end portion 1123 of the central spoiler portion 1120. The joint portion 1125 has an inverted U-shaped cross-section and has width and height dimensions less than those of the outer end portion 1123. Further, the central spoiler portion 1120 has an arm receiving portion 1126 that receives a portion of the end lever 1300L, 1300R and hides the same therein. The arm receiving portion 1126 is defined by a space between the inclined surfaces 1121F, 1121R and an interior space of the joint portion 1125. The joint portion 1125 has a slit 1127 at its top and indentations 1128 at its lower edge. A positioning protrusion of a joint cover (this will be described below) is inserted to the slit 1127 of the joint portion and the slit 1127 participates in positioning the joint cover. A claw of the joint cover (this will be described below) engages the indentation 1128 of the joint portion, thereby preventing separation of the joint cover.

Each end lever 1300L, 1300R is joined to the central lever 1100 and holds the wiper rubber assembly 110, 120. Descriptions are made as to the end lever 1300L with reference to FIGS. 14 to 18. The end lever 1300R and the end lever 1300L are symmetrical in the longitudinal direction of the lever assembly 1000. The end lever 1300L, 1300R includes an end arm 1310 to be situated in the arm receiving portion 1126 of the central spoiler portion 1120 and an end spoiler portion 1320 oppositely extending from the end arm 1310. The end arm 1310 has an inverted U-shaped cross-section. The end spoiler portion 1320 has an inverted V-shaped cross-section. The end arm 1310 extends from a longitudinal inner end portion 1323 of the end spoiler portion 1320 toward the central lever 1100. A lower edge of the end arm 1310 and a lower edge of the end spoiler portion 1320 form an approximately straight line.

The end spoiler 133L, 133R is integrally formed in the end spoiler portion 1320 of the end lever 1300L, 1300R. The end spoiler portion 1320 has a pair of inclined surfaces 1321F, 1321R that are symmetrical in the width direction of the end lever 1300L, 1300R. The inclined surfaces 1321F, 1321R are located in the lateral surfaces of the end spoiler portions 1320. The inclined surfaces 1321F, 1321R extend in the longitudinal direction of the wiper rubber 110 in the end lever 1300L, 1300R and form the lateral surfaces of the end spoiler portion 1320. Accordingly, the end spoiler 133L, 133R is integrated in the end lever 1300L, 1300R through the end spoiler portion 1320 having the inclined surfaces 1321F, 1321R. An apex portion 1322 interconnects the inclined surfaces 1321F, 1321R at their upper edges. The inclined surfaces 1321F, 1321R may include a flat, concave or convex surface. In this embodiment, the inclined surfaces 1321F, 1321R are concave in the width direction of the end lever 1300L, 1300R. Further, a height dimension of the inclined surfaces 1321F, 1321R decreases gradually toward the distal end of the wiper blade 100. Further, lower edges of the inclined surfaces 1321F, 1321R approach each other at the distal end of the end lever 1300L, 1300R, thereby forming a round distal end of the end lever 1300L, 1300R along with the apex portion 1322. The inclined surfaces 1321F, 1321R of the end spoiler portion 1320 may be curved with the same curvature as that of the inclined surfaces 1121F, 1121R of the central spoiler portion 1120, or curved with a curvature varying therefrom. In this embodiment, the inclined surfaces 1321F, 1321R of the end spoiler portion 1320 is curved with the same curvature as that of the inclined surfaces 1121F, 1121R at the stepped surface 1124 of the central spoiler portion 1120.

Each end lever 1300L, 1300R has two clamps 1311, 1325 for holding the wiper rubber assembly 110, 120. A longitudinal inner clamp 1311 is formed at a distal end of the end arm 1310. A longitudinal outer clamp 1325 is formed at a lower edge of the end spoiler portion 1320 in the vicinity of a longitudinal outer end thereof.

Figure 17:
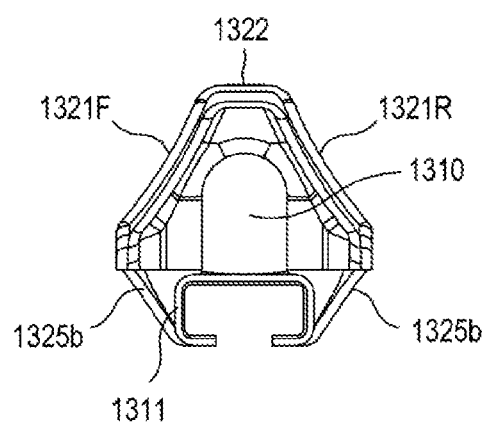
FIG. 17 is a right side view of the end lever shown in FIG. 14.

As shown in FIG. 17, the clamp 1311 has a generally rectangular cross-section with its bottom side cut away partially and thus both ends thereof extend inwardly. When the end lever 1300L, 1300R is coupled to the wiper rubber assembly 110, 120, an upper inner surface of the clamp 1311 is placed on a top side of the wiper rubber 110 and lateral portions of the clamp 1311 sandwich the spring rail 120 and a portion of the wiper rubber 110 adjacent thereto and the both ends of the clamp 1311 are inserted to the second groove 114.

Figure 14:
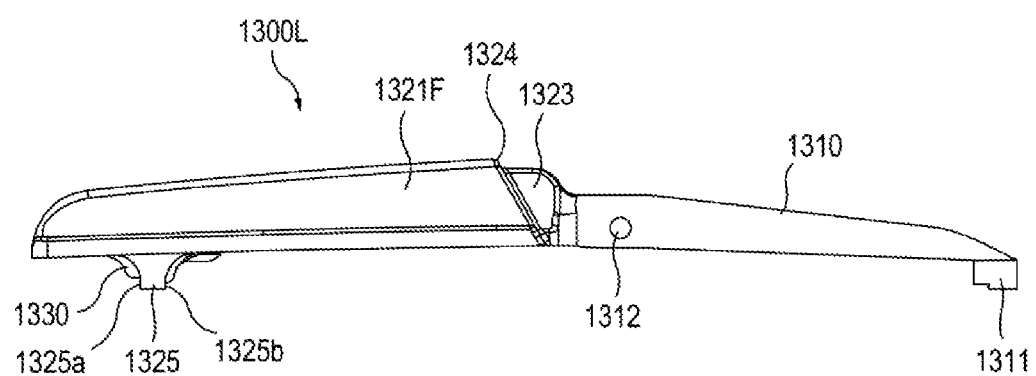
FIG. 14 is a front view of an end lever of the wiper blade according to the first embodiment.
Figure 15:
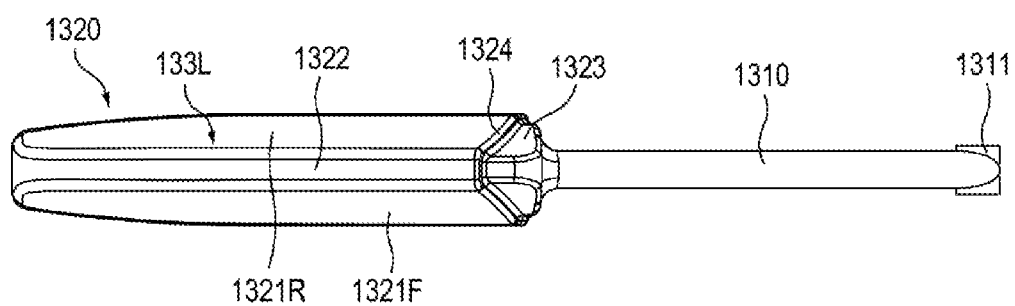
FIG. 15 is a top view of the end lever shown in FIG. 14.
Figure 16:
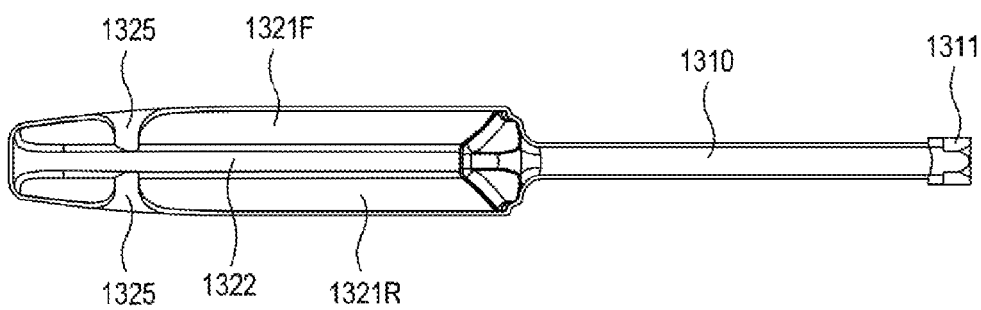
FIG. 16 is a bottom view of the end lever shown in FIG. 14.
Figure 18:
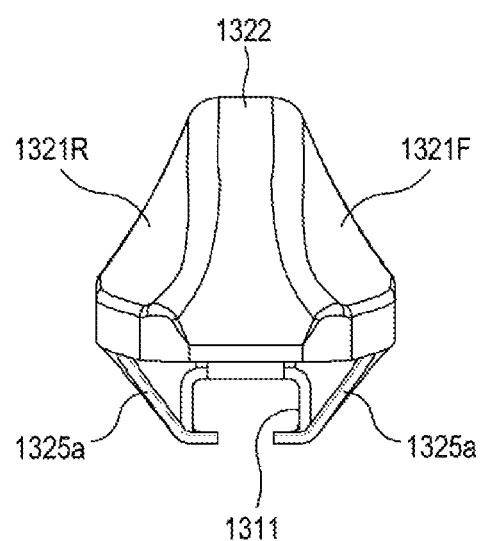
FIG. 18 is a left side view of the end lever shown in FIG. 14.
Figure 19:
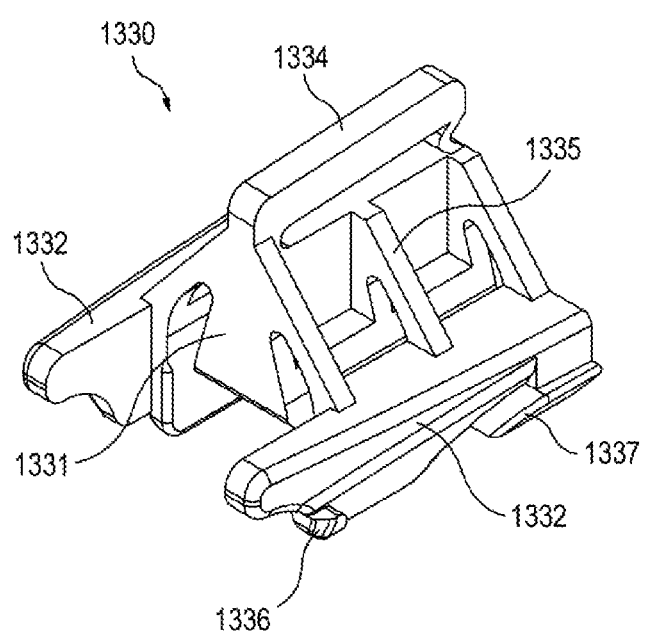
FIG. 19 is an upper perspective view of a clamp insert.
Figure 20:
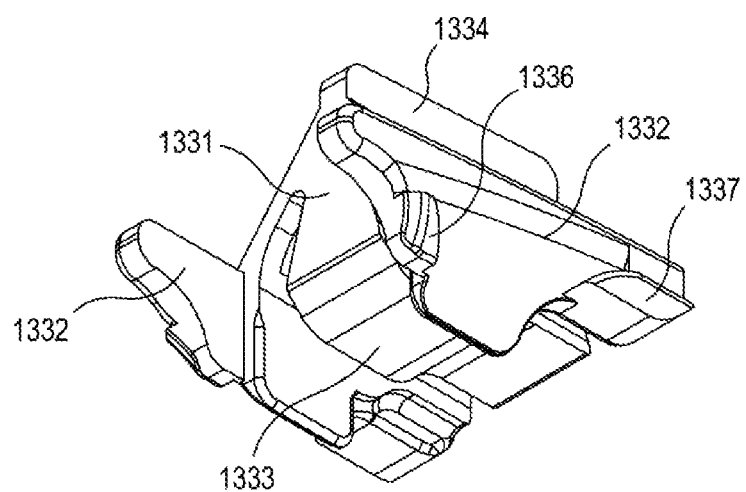
FIG. 20 is a lower perspective view of the clamp insert shown in FIG. 19.
Figure 21:
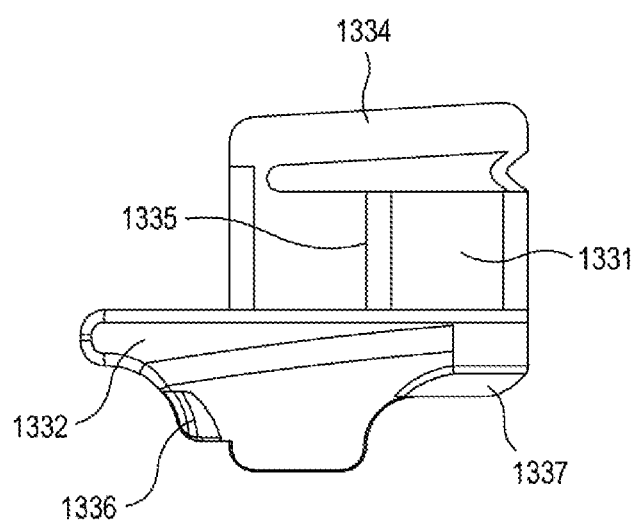
FIG. 21 is a right side view of the clamp insert shown in FIG. 19.
Figure 22:
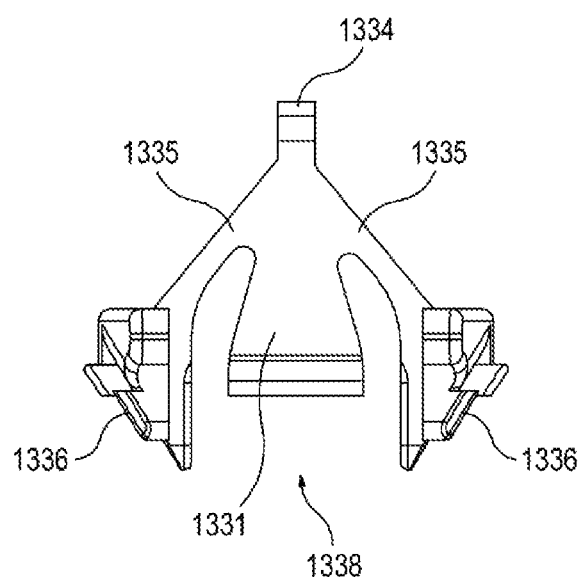
FIG. 22 is a front view of the clamp insert shown in FIG. 19.

Referring to FIGS. 14 and 18, the clamp 1325 extends from the lower edge of the end spoiler portion 1320 in a V shape. Both ends of the clamp 1325 are inserted to the second groove 114 of the wiper rubber 110. A longitudinal outer surface 1325a of the clamp 1325 is inclined longitudinally outwardly, while a longitudinal inner surface 1325b is inclined longitudinally inwardly. A portion of the end lever 1300L, 1300R, at which the clamp 1325 is located, is hollow. To ensure fixation between the clamp 1325 and the wiper rubber 110, a clamp insert 1330 is fitted to the clamp 1325. The clamp insert 1330 is intervened between the wiper rubber 110 and the portion of the end lever 1300L, 1300R where the clamp 1325 is located. That is, as shown in FIG. 14, the lever assembly 1000 has the clamp insert 1330 that is fitted to the clamp 1325 of the end lever 1300L, 1300R to fix the wiper rubber assembly 110, 120 to the clamp 1325. FIGS. 16 to 18 do not show the clamp insert 1330 to clearly depict the interior of the end lever.

Reference is made to FIGS. 19 to 24 and descriptions are made as to the clamp insert 1330. The clamp insert 1330 is shaped to mate with a cross section formed by the inclined surfaces 1321F, 1321R, the apex portion 1322 and the clamp 1325 in the end lever 1300L, 1300R. Further, the clamp insert 1330 is configured to snap-engage the clamp 1325 and sandwich or pinch the wiper rubber 110. The clamp insert 1330 has a body portion 1331, a pair of sandwiching portions 1332 located beside the body portion 1331 and coupled to the clamp 1325, and a pressing portion 1333 formed in the body portion 1331 to abut or press the top side of the wiper rubber 110. The body portion 1331 extends in the longitudinal direction of the end lever 1300L, 1300R. On a top side of the body portion 1331 is formed a longitudinally-extending head portion 1334, which contacts the inner surface of the apex portion 1322 of the end lever or is positioned with a slight gap therebetween. A sandwiching space 1338, in which an upper portion of the wiper rubber 110 is received, is defined between the body portion 1331 and the sandwiching portion 1332.

The sandwiching portion 1332 is formed in a rib portion 1335 extending the top side of the body portion 1331. Thus, the sandwiching portion 1332 can snap-engage the clamp 1325 through the rib portion 1335 elastically bending inwardly and outwardly of the body portion 1331. The sandwiching portion 1332 extends in the longitudinal direction of the body portion 1331. Claws 1336, 1337 are formed at longitudinal inner and outer ends of the sandwiching portion 1332 respectively. The longitudinal outer claw 1336 engages the longitudinal outer surface 1325a of the clamp 1325. A longitudinally leading end of the outer claw 1336 is inwardly inclined for easy insertion of the clamp insert 1330 to the clamp 1325. The longitudinal inner claw 1337 engages the longitudinal inner surface 1325b of the clamp 1325. Further, a longitudinal inner surface of the outer claw 1336 and a longitudinal outer surface of the inner claw 1337 are inclined to correspond to the longitudinal outer surface 1325a and the longitudinal inner surface 1325b of the clamp 1325 respectively.

At least a portion of the body portion 1331 protrudes downwardly to thus form the pressing portion 1333. The pressing portion 1333 is formed to be located above the both ends of the clamp 1325 when the clamp insert 1330 is fitted to the clamp 1325. An underside of the pressing portion 1333 is placed on or abuts the top side of the wiper rubber 110, thereby fixing the wiper rubber 110 to the clamp 1325 or pressing the wiper rubber against the both ends of the clamp 1325.

Figure 23:
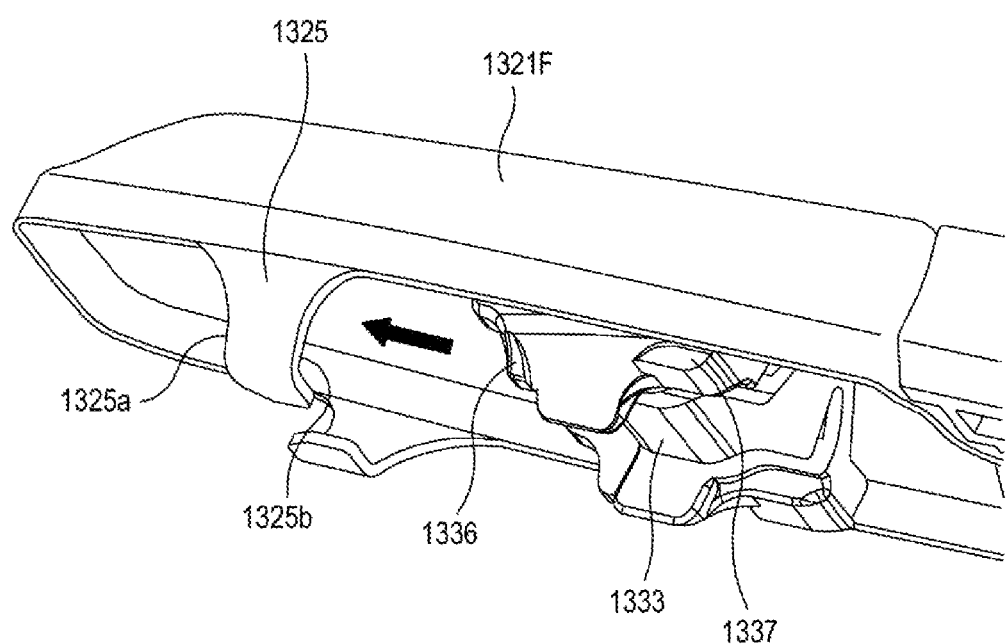
FIG. 23 depicts the insertion of the clamp insert to a clamp.
Figure 24:
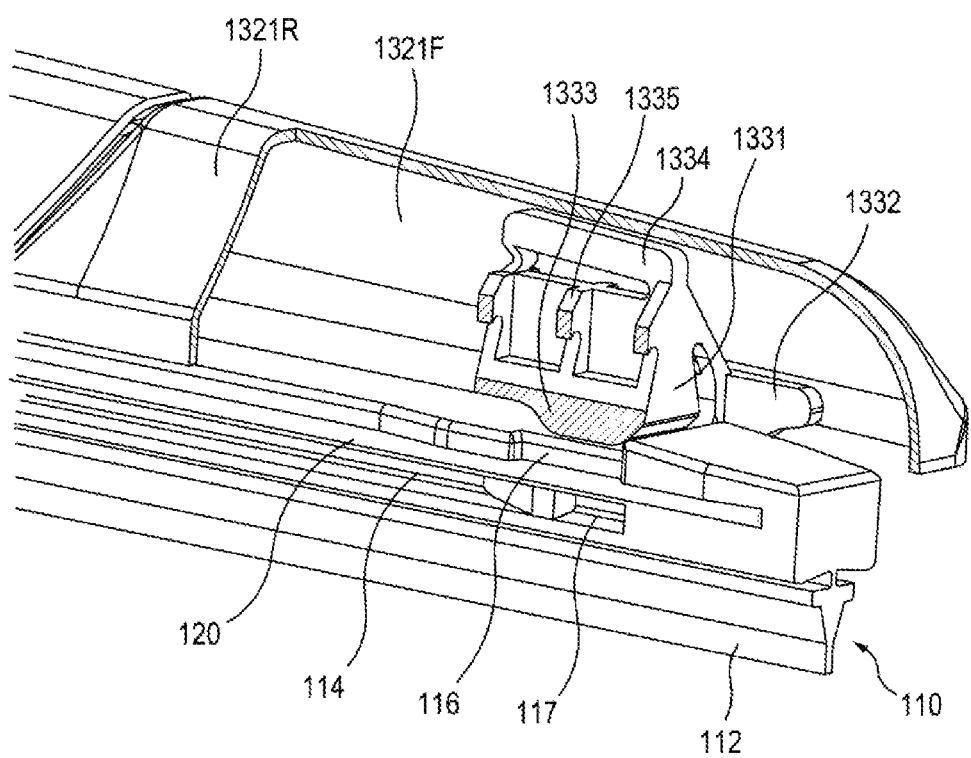
FIG. 24 shows the end lever with the clamp insert fitted thereto.

FIGS. 23 and 24 depict an example coupling between the end lever 1300L, 1300R and the clamp insert 1330. As shown in FIG. 23, the clamp insert 1330 snap-engages the clamp 1325 through insertion. The clamp insert 1330 is situated inside the end lever 1330L, 1300R and then is pushed toward the clamp 1325. Then, the outer claw 1326 is brought into abutment with the inner surface 1325b of the clamp 1325. Since the sandwiching portion 1332 may be pushed toward the body portion 1331 via the rib portion 1335, the outer claw 1336 of the clamp insert 1330 can pass the clamp 1325. If the clamp insert 1330 is fitted to the clamp 1325, then the longitudinal outer and inner surfaces 1325a, 1325b of the clamp 1325 are between the outer claw 1336 and the inner claw 1337 of the clamp insert 1330. As shown in FIG. 24, when the lever assembly 1000 and the wiper rubber assembly 110, 120 are coupled to each other, the pressing portion 1333 of the clamp insert 1330 presses the top side of the wiper rubber 110 downwardly (toward the both ends of the clamp 1325). Alternatively, the pressing portion 1333 of the clamp insert 1330 is placed on the top side of the wiper rubber 110 with little gap. Thus, the wiper rubber 110 is firmly fixed to the clamp 1325 via the clamp insert 1330.

The central lever 1100 and the end lever 1300L, 1300L are joined to each other via hinge-joint. When the central lever 1100 and the end lever 1300L, 1300R are joined to each other, the end arm 1310 of the end lever is situated in the arm receiving portion 1126 of the central spoiler portion 1120 and is thus hidden within the central spoiler portion 1120 when viewed from outside. In other words, in the lever assembly 1000, a portion (e.g., the end arm 1310) of one of the adjacent levers (e.g., the end lever 1300L, 1300R) is inside the spoiler portion of the other of the adjacent levers (e.g., the central lever 1100), which is further inward than said one of the adjacent levers. The central lever 1100 and the end lever 1300L, 1300R are joined to each other through a hinge-joint portion 1400L, 1400R penetrating through both the joint portion 1125 of the central lever and the end arm 1310 of the end lever. The hinge-joint portion 1400L, 1400R may include, but is not limited to, a rivet joint or pin joint. In this embodiment, the hinge-joint portion 1400L, 1400R includes a rivet joint.

Figure 25:
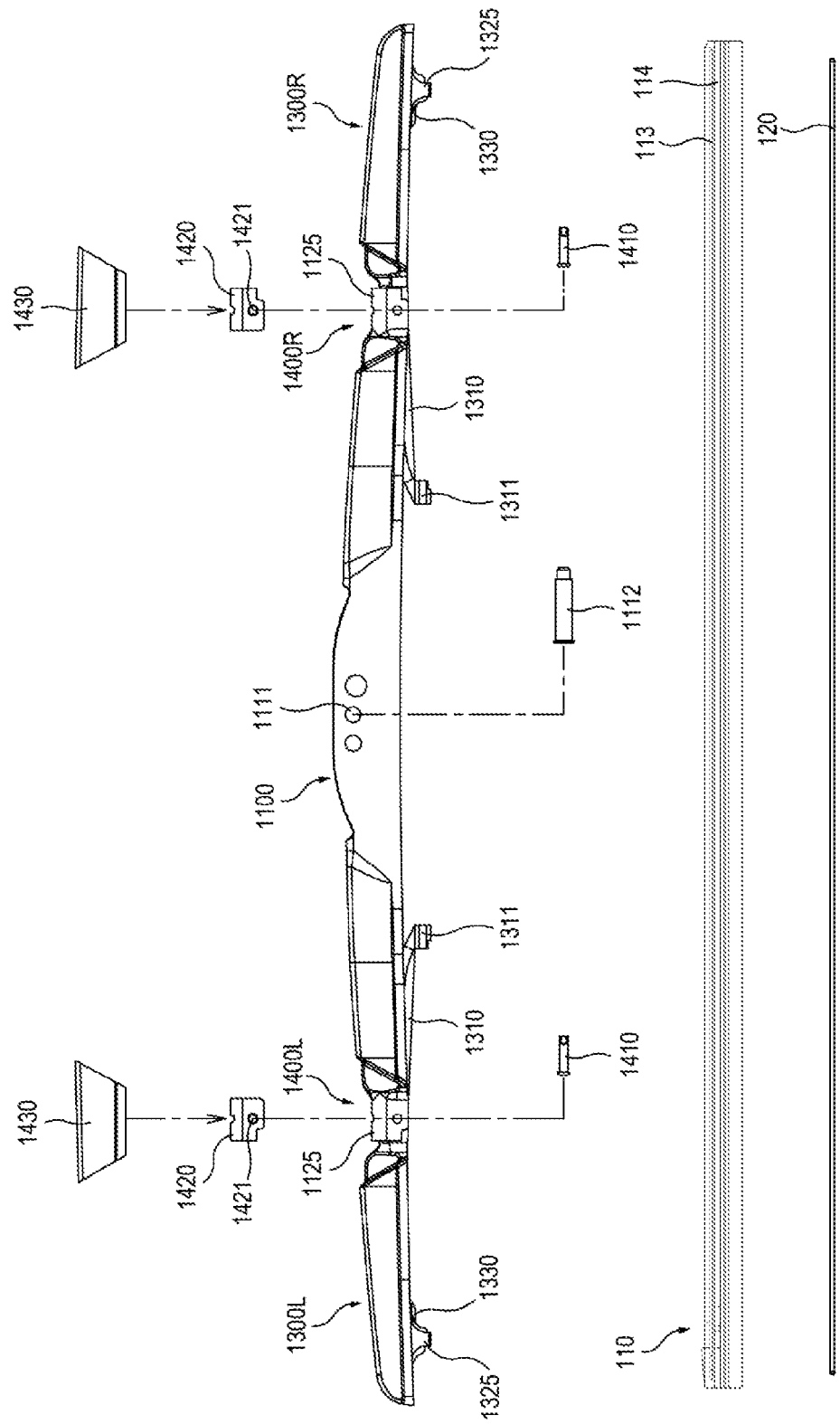
FIG. 25 is a front view showing an assembly example of the wiper blade according to the first embodiment.
Figure 26:
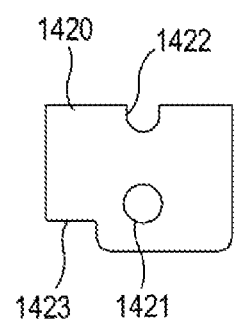
FIG. 26 is a front view of a hinge insert.
Figure 27:
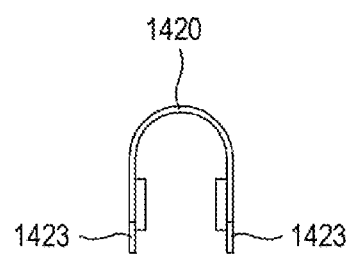
FIG. 27 is a left side view of the hinge insert shown in FIG. 26.

Referring to FIG. 25, the hinge-joint portion 1400L, 1400R includes a rivet 1410 serving as a hinge shaft and a hinge insert 1420 coupled to the rivet 1410. Through apertures 1126 for hinge-joint are formed in the joint portion 1125 of the central lever 1100 in a width direction thereof. Also, through apertures 1312 are formed in a portion of the end arm 1310 corresponding to the joint portion 1125 in a width direction thereof. Referring to FIGS. 26 and 27, the hinge insert 1420 has an inverted U-shaped cross-section. The hinge insert 1420 has through apertures 1421 in its opposing lateral portions. Further, the hinge insert 1420 has a widthwise-oriented slit 1422 in its top and indentations 1423 at its lower edge. The slit 1422 and the indentation 1423 correspond to the slit 1127 and the indentation 1128 of the joint portion 1125 of the central lever respectively.

The hinge insert 1420 is nested on the end arm 1310 such that the through apertures 1421 and the through apertures 1312 are in alignment with each other. Thereafter, the joint portion 1125 of the central lever 1100 is nested on the hinge insert 1420 such that its through apertures 1126 are aligned with the through apertures 1421. The rivet 1410 is pierced through the through apertures 1126, 1421, 1312 and then riveted thereto, thus forming the hinge-joint portion 1400L, 1400R.

Referring to FIG. 25, when the central lever 1100 and the end lever 1300L, 1300R are joined to each other, the joint portion 1125 of the central lever 1100 is nested on the end arm 1310 of the end lever 1300L, 1300R with the hinge insert 1420 therebetween and the hinge-joint portion 1400L, 1400R is formed between the central lever 1100 and the end lever 1300L, 1300R. The lever assembly 1000 includes a joint cover 1430, which is disposed between the central lever 1100 and the end lever 1300L, 1300R to cover the hinge-joint portion 1400L, 1400R.

Figure 28:
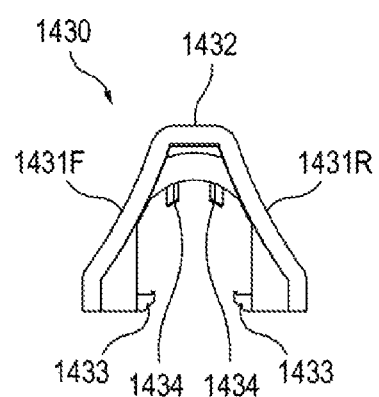
FIG. 28 is a right side view of a joint cover.
Figure 29:
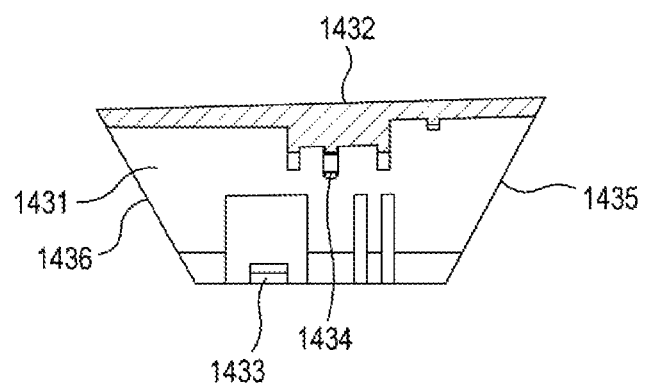
FIG. 29 is a longitudinally sectional view of the joint cover shown in FIG. 28.
Figure 30:
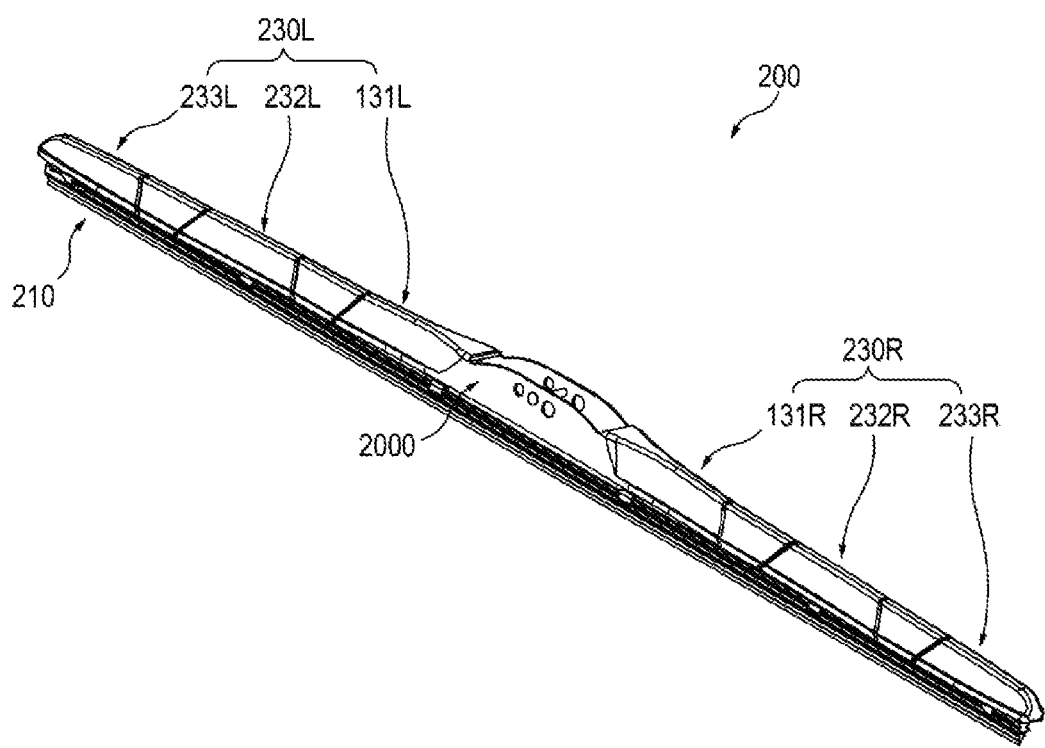
FIG. 30 is a perspective view showing a wiper blade in accordance with a second embodiment.
Figure 31:
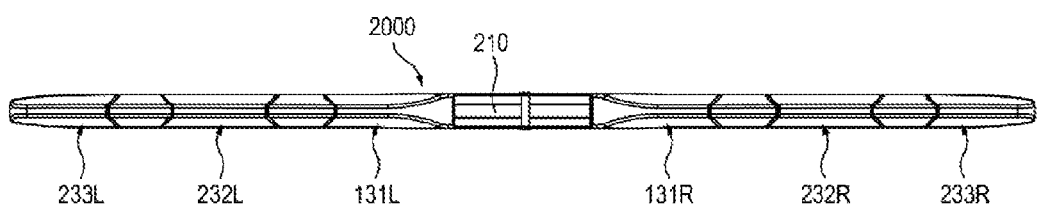
FIG. 31 is a top view of the wiper blade shown in FIG. 30.
Figure 32:
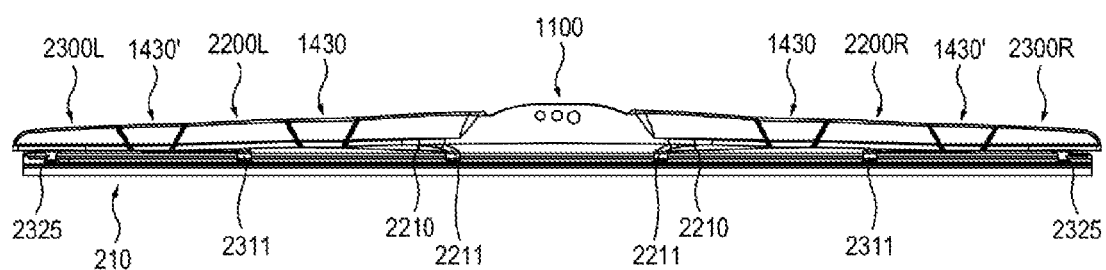
FIG. 32 is a front view of the wiper blade shown in FIG. 30.
Figure 33:
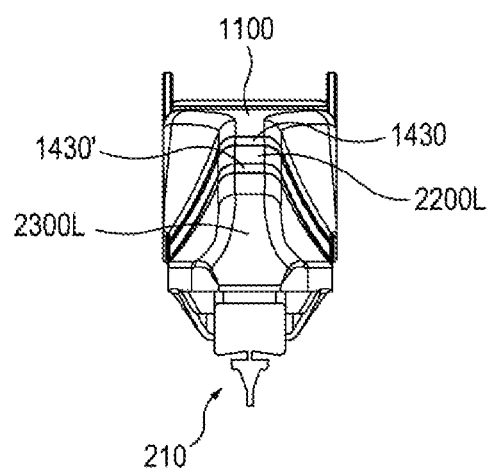
FIG. 33 is a left side view of the wiper blade shown in FIG. 30.
Figure 34:
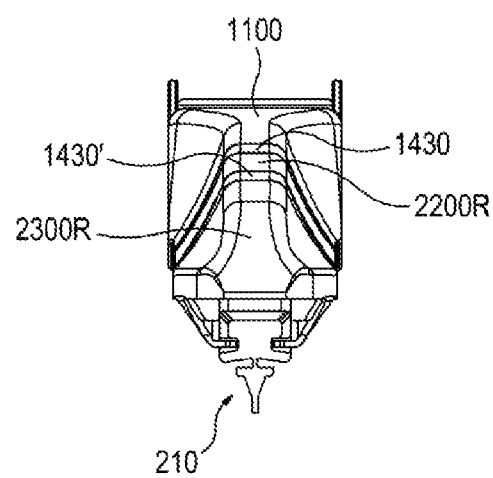
FIG. 34 is a right side view of the wiper blade shown in FIG. 30.
Figure 35:
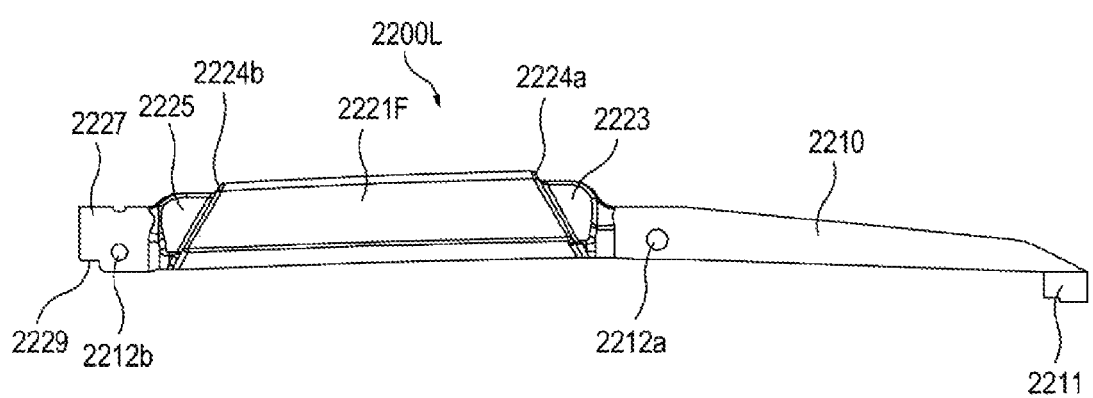
FIG. 35 is a front view of an intermediate lever of the wiper blade according to the second embodiment.
Figure 36:
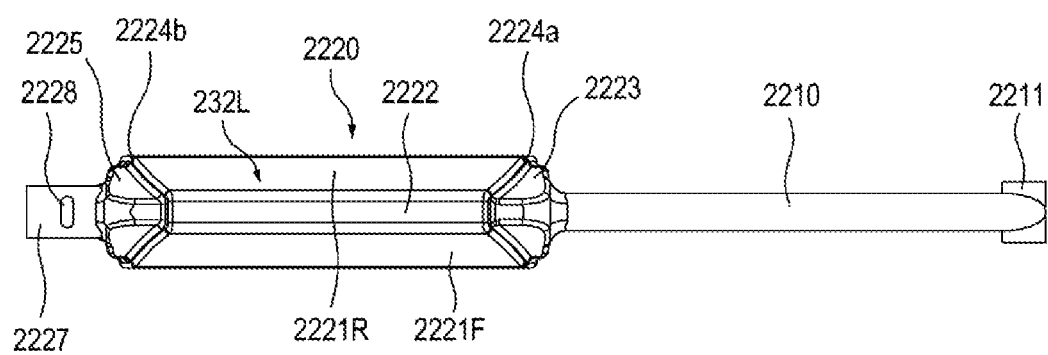
FIG. 36 is a top view of the intermediate lever shown in FIG. 35.
Figure 37:
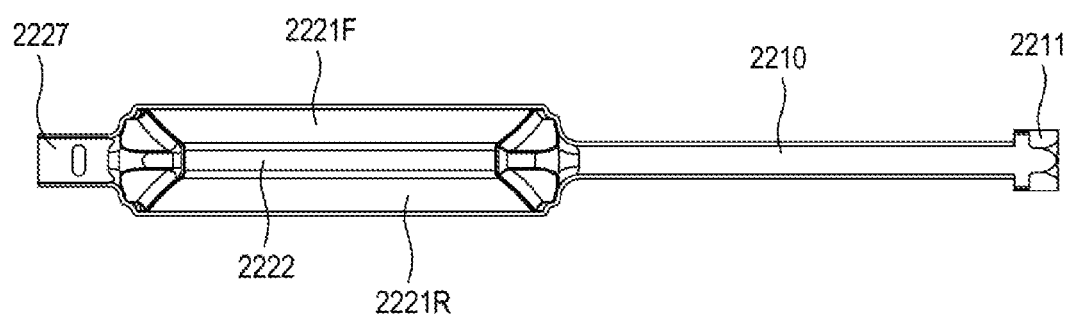
FIG. 37 is a bottom view of the intermediate lever shown in FIG. 35.
Figure 38:
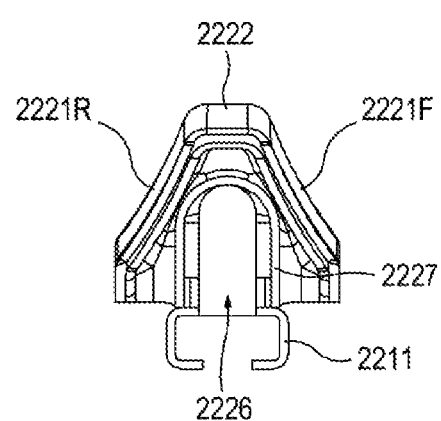
FIG. 38 is a left side view of the intermediate lever shown in FIG. 35.

Referring to FIGS. 28 and 29, the joint cover 1430 has an inverted V-shaped cross-section. The joint cover 1430 has a pair of inclined surfaces 1431F, 1431R symmetrical in a width direction thereof. An apex portion 1432 interconnects the inclined surfaces 1431F, 1431R. The inclined surface 1431F, 1431R is concave. A curvature of the inclined surface 1431F, 1431R is equal to those of the inclined surface 1121F, 1121R of the central spoiler portion and the inclined surfaces 1321F, 1321R of the end spoiler portion. A height dimension of the inclined surface 1431F, 1431R decreases gradually from a longitudinal inner end 1435 toward a longitudinal outer end 1436. A cross-sectional profile of the joint cover 1430 corresponds to both the cross-sectional profile of the central spoiler portion 1120 and the cross-sectional profile of the end spoiler portion 1320. That is, the cross-sectional profile of the joint cover 1430 decreases gradually in its height dimension toward the distal end of the lever assembly 1000. The joint cover 1430 has the cross-section profile achieving such decrease. In this embodiment, the cross-sectional profile of the joint cover 1430 includes a triangle having concave legs.

The longitudinal inner end 1435 is inclined at the same angle as the stepped surface 1124 of the central spoiler portion 1120 and is capable of contacting the stepped surface 1124 of the central spoiler portion 1120. The longitudinal outer end portion 1123 of the central spoiler portion 1120 is situated within the inclined surfaces 1431F, 1431R of the joint cover. Further, the longitudinal outer end 1436 is inclined at the same angle as a stepped surface 1324 of the end spoiler portion 1430 and is capable of contacting the stepped surface 1324 of the end spoiler portion 1320. The joint cover 1430 snap-engages the joint portion 1125 of the central lever. The joint cover 1430 has a protrusion or claw 1433 protruding from a lower inner surface of the inclined surface 1431F, 1431R. The claw 1433 snap-engages the indentation 1128 of the joint portion 1125. Further, the joint cover 1430 has a pair of positioning protrusions 1434 protruding from a lower surface of the apex portion 1432. The positioning protrusions 1434 are inserted to the slit 1127 of the joint portion 1125.

The stepped surface 1124 of the central lever 1100 is inclined at an acute angle inwardly of the wiper blade 100, while the stepped surface 1324 of the end lever 1300L, 1300R is inclined at an acute angle toward the distal end of the wiper blade 100. Further, the longitudinal inner end 1435 and outer end 1436 of the joint cover 1430 are inclined in harmony with such inclination of the stepped surfaces. Thus, when no load acts on the wiper blade 100, the central spoiler portion 1120, the joint cover 1430 and the end spoiler portion 1320 can become open with some gap therebetween. On the contrary, when a downward load acts on the wiper blade 100 (e.g., when the wiper arm applies a force to the wiper blade toward the windshield), the central spoiler portion 1120, the joint cover 1430 and the end spoiler portion 1320 are brought into close abutment with one another in the longitudinal direction of the lever assembly 1000. That is, with the stepped surfaces 1124, 1423 inclined as described above and the shape of the joint cover 1430 corresponding thereto, the end lever 1300L, 1300R cannot pivot upwardly relative to the central lever 1100. Accordingly, when a downward load acts on the wiper blade 100, the lever assembly 1000 can bring the wiper rubber 110 into strong contact with the windshield along its entire length.

Descriptions are made as to an example assembly of the wiper blade 100 according to the first embodiment with reference to FIG. 25.

In an assembly wherein the central lever 1100 and the end levers 1300L, 1300R are hinge-jointed to each other, the joint cover 1430 is snap-engaged to the joint portion 1125 of the central lever. By pressing the joint cover 1430 against the joint portion 1125, the claws 1433 of the joint cover 1430 snap-engage the indentations 1128 of the joint portion 1125 and the positioning protrusions 1434 of the joint cover 1430 are inserted to the slit 1127 of the joint portion 1125, thus coupling the joint cover 1430 to the joint portion 1125 and thereby completing the lever assembly 1000.

By fitting the clamps 1325, 1311 of the end levers 1300L, 1300R to the second groove 114 of the wiper rubber 110, the lever assembly 1000 and the wiper rubber assembly 110, 120 are coupled to each other. First, the both ends of the clamp 1325 of the end lever 1300L with the clamp insert 1330 fitted thereto are positioned in the second groove 114 of the wiper rubber 110 and then the wiper rubber assembly 110, 120 is slid along the lever assembly 1000. Subsequently, the both ends of the clamps 1311 of the end lever 1300L are positioned in the second groove 114 and then the wiper rubber assembly 110, 120 is slid along the lever assembly 1000. Thereafter, the clamps 1311, 1325 of the end lever 1300R is positioned in the second groove 114 one after the other, and the wiper rubber assembly 110, 120 is slid along the lever assembly 1000. If the both ends of the clamp 1325 of the end lever 1300L are fitted to the insertion holes 117 and the sandwiching portions 1332 of the clamp insert 1330 are placed in the recess 116, then the wiper rubber assembly 110, 120 is fixed to the lever assembly 1000.

Referring again to FIGS. 1 to 5 showing the assembled wiper blade 100, the lever assembly 1000 holds and supports the wiper rubber assembly 110, 120 at four positions (i.e., at four pressure points) via the clamps 1325, 1311 of the end lever 1300L, 1300R. Further, the central lever 1100 and the end levers 1300L, 1300R are straight arranged along the length of the wiper rubber 110 and are at the same height on the wiper rubber 110. Further, in the assembled wiper blade 100, the inclined surfaces 1121F, 1121R of the central spoiler portion 1120, the inclined surfaces 1431F, 1431R of the joint cover 1430 and the inclined surfaces 1321F, 1321R of the end spoiler portion 1320 are straight adjoined one after another, thereby defining the spoiler 130L, 130R with the cross-sectional profile varying in the longitudinal direction.

FIGS. 30 to 43 show a wiper blade according to a second embodiment, generally denoted by 200, and elements or components constituting the wiper blade 200. The wiper blade 200 according to this embodiment is configured to hold the wiper rubber at six pressure points. The wiper blade 200 has a longer length when compared to the wiper blade 100 according to the first embodiment and its lever assembly has a configuration for the longer length. In FIGS. 30 to 43, the same elements or components as those of the wiper blade 100 of the first embodiment are denoted by the same reference numerals.

Referring to FIGS. 30 to 43, the wiper blade 200 according to the second embodiment has a wiper rubber 210, which contacts the windshield surface, and a lever assembly 2000 holding and supporting the wiper rubber 210. Further, the wiper blade 200 includes a pair of spoilers 230L, 230R that produce a reaction force preventing the lift caused by wind or air stream. The left spoiler 230L and the right spoiler 230R are symmetrical relative to a longitudinal center of the wiper rubber 210. The spoilers 230L, 230R are integrated in the lever assembly 2000 and extend in the longitudinal direction of the wiper rubber 210.

The wiper rubber 210 has the same configuration as that of the wiper rubber 110 of the first embodiment and has a length longer than the wiper rubber 110. Spring rails 220 are inserted to the first grooves 113 to thus impart rigidity to the wiper rubber 210 (see FIG. 43). Hereinafter, the wiper rubber 210 with the spring rails 220 fitted thereto is referred to as a wiper rubber assembly 210, 220.

The lever assembly 2000 connects the wiper rubber assembly 210, 220 to the wiper arm and supports the wiper rubber assembly 210, 220 with respect to the wiper arm. The wiper blade 200 is coupled to the wiper arm in such a manner that the lever assembly 2000 is releasably joined to the distal end of the wiper arm. In this embodiment, the lever assembly 2000 includes a central lever 1100 centrally located in the wiper rubber assembly 210, 220, a pair of intermediate levers 2200L, 2200R joined to the central lever 1100 respectively and a pair of end levers 2300L, 2300R joined to the intermediate lever 2200L, 2200R respectively. The levers 1100, 2200L, 2200R, 2300L, 2300R constituting the lever assembly 2000 are straight arranged along a longitudinal direction of the wiper rubber 210. The adjacent levers are hinge-jointed to each other. The levers 1100, 2200L, 2200R, 2300L, 2300R have an elongated hollow shape and may be made by pressing a metallic sheet or injection molding a plastic material.

Similar to the first embodiment, a cross-sectional profile of the spoiler 230L, 230R for producing the reaction force includes a triangle having concave legs. The cross-sectional profile of the spoiler 230L, 230R decreases gradually in a height dimension toward a distal end of the wiper blade 200. Each spoiler 230L, 230R comprises spoiler sections located in the respective levers 1100, 2200L, 2200R, 2300L, 2300R. The spoiler sections of the respective levers are straight adjoined one after another, i.e. they are consecutively adjoined with the spoiler sections of adjacent levers adjoining each other, thereby defining the spoiler 230L, 230R. As described below regarding the spoiler 230L, 230R integrated in the lever assembly 2000, a spoiler section integrated in the central lever 1100 is referred to as a central spoiler 131L, 131R, and another spoiler section integrated in the intermediate lever 2200L, 2200R is referred to as an intermediate spoiler 232L, 232R, and yet another spoiler section integrated in the end lever 2300L, 2300R is referred to as an end spoiler 233L, 233R.

Each intermediate lever 2200L, 2200R is joined to the central lever 1100 and holds the wiper rubber assembly 210, 220. Descriptions are made as to the intermediate lever 2200L with reference to FIGS. 35 to 38. The intermediate lever 2200L and the intermediate lever 2200R are symmetrical in the longitudinal direction of the lever assembly 2000. The intermediate lever 2200L, 2200R includes an intermediate arm 2210 to be situated in the arm receiving portion 1126 of the central spoiler portion 1120 and an intermediate spoiler portion 2220 oppositely extending from the intermediate arm 2210. The intermediate arm 2210 has an inverted U-shaped cross-section. The intermediate spoiler portion 2220 has an inverted V-shaped cross-section. The intermediate arm 2210 extends from a longitudinal inner end portion 2223 of the intermediate spoiler portion 2220 toward the central lever 1100. A lower edge of the intermediate arm 2210 and a lower edge of the intermediate spoiler portion 2220 form an approximately straight line.

Each intermediate lever 2200L, 2200R has a clamp 2211 for fixing the wiper rubber assembly 210, 220. The clamp 2211 is formed at a distal end of the intermediate arm 2210. The clamp 2211 has the same shape as the clamp 1311 of the first embodiment. When the intermediate lever 2200L, 2200R and the wiper rubber assembly 210, 220 are coupled to each other, both ends of the clamp 2211 is inserted to the second groove 114 of the wiper rubber 210.

The intermediate spoiler 232L, 232R is integrally formed in the intermediate spoiler portion 2220. The intermediate spoiler portion 2220 has a pair of inclined surfaces 2221F, 2221R that are symmetrical in the width direction of the intermediate lever 2200L, 2200R. The inclined surfaces 2221F, 2221R are located in the lateral surfaces of the intermediate spoiler portion 2220. The inclined surfaces 2221F, 2221R extend in the longitudinal direction of the wiper rubber 210 in the intermediate lever 2200L, 2200R and form the lateral surfaces of the intermediate spoiler portion 2220. Accordingly, the intermediate spoiler 232L, 232R is integrated in the intermediate lever 2200L, 2200R through the intermediate spoiler portion 2220 having the inclined surfaces 2221F, 2221R. An apex portion 2222 interconnects the inclined surfaces 2221F, 2221R at their upper edges. The inclined surfaces 2221F, 2221R are concave in the width direction of the intermediate lever 2200L 2200R. Further, a height dimension of the inclined surfaces 2221F, 2221R decrease gradually toward the longitudinal outer end of the intermediate lever 2200L, 2200R. The inclined surfaces 2221F, 2221R of the intermediate spoiler portion 2220 may be curved with the same curvature as that of the inclined surfaces 1121F, 1121R of the central spoiler portion 1120, or curved with a curvature varying therefrom. In this embodiment, the inclined surfaces 2221F, 2221R of the intermediate spoiler portion 2220 is curved with the same curvature as that of the inclined surfaces 1121F, 1121R at the stepped surface 1124 of the central spoiler portion 1120. The curvature of the inclined surface 2221F, 2221R is constant in the longitudinal direction of the intermediate spoiler portion 2220.

The central lever 1100 and the intermediate lever 2200L, 2200R are joined to each other via a hinge-joint portion 2400L, 2400R penetrating through the joint portion 1125 and the intermediate arm 2210. When the central lever 1100 and the intermediate lever 2200L, 2200R are joined to each other, the intermediate arm 2210 of the intermediate lever is situated in the arm receiving portion 1126 of the central spoiler portion 1120 and is thus hidden within the central spoiler portion 1120 when viewed from outside. In other words, a portion (e.g., the intermediate arm 2210) of one of the adjacent levers (e.g., the intermediate lever 2200L, 2200R) is inside the spoiler portion of the other of the adjacent levers (e.g., the central lever 1100), which is further inward than said one of the adjacent levers.

Figure 43:
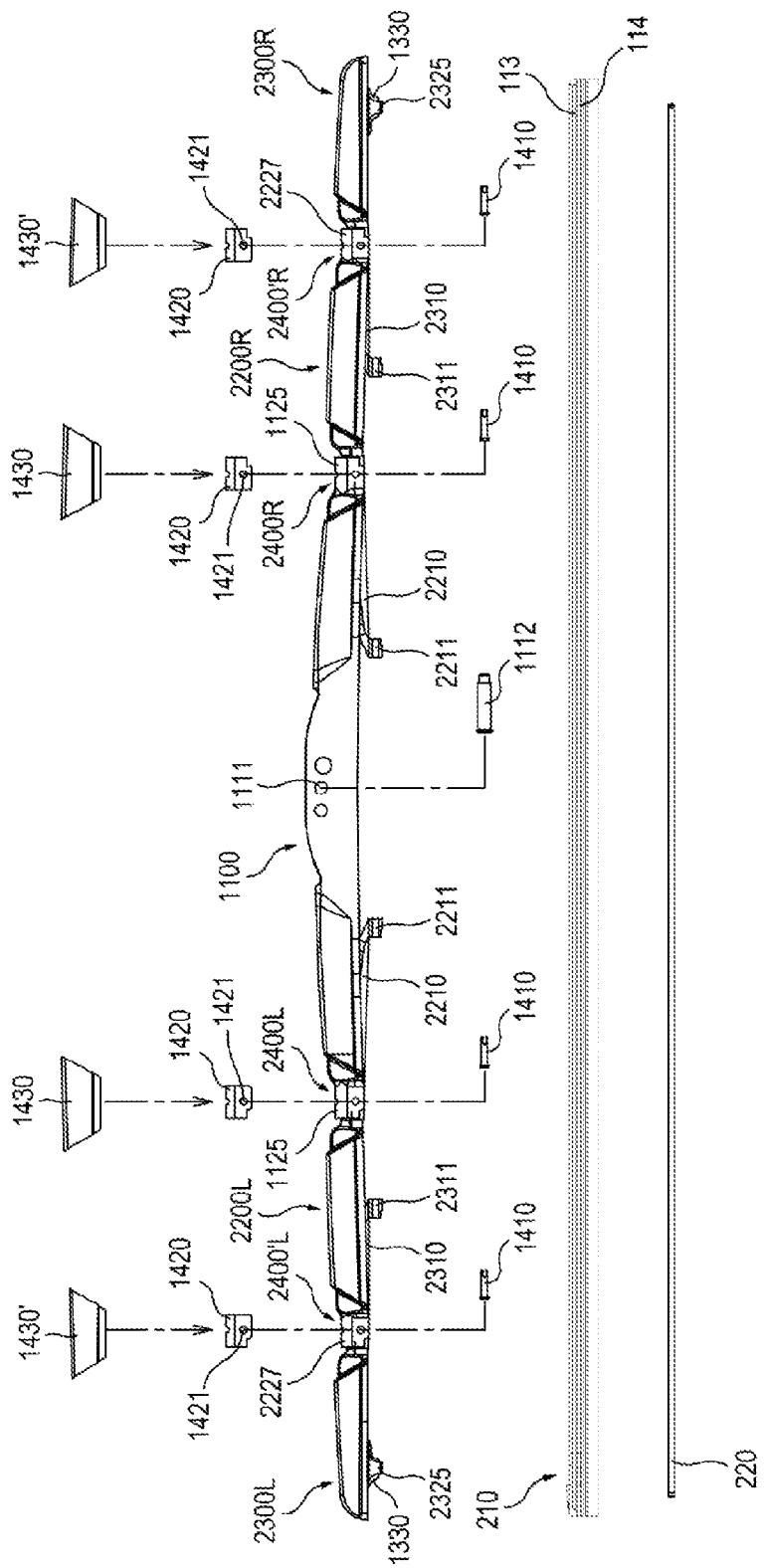
FIG. 43 is a front view showing an assembly example of the wiper blade according to the second embodiment.

The hinge-joint portion 2400L, 2400R between the central lever 1100 and the intermediate lever 2200L, 2200R has the same configuration as the hinge-joint portion 1400L, 1400R of the first embodiment. Referring to FIG. 43, the hinge-joint portion 2400L, 2400R includes the rivet 1410 serving as a hinge shaft and the hinge insert 1420 coupled to the rivet 1410. Through apertures 2212a for hinge-joint are formed in a portion of the intermediate arm 2210, which corresponds to the joint portion 1125 of the central lever 1100, in a width direction thereof. The hinge insert 1420 is nested on the intermediate arm 2210 such that the through apertures 1421 and the through apertures 2212a are in alignment with each other. Thereafter, the joint portion 1125 of the central lever 1100 is nested on the hinge insert 1420 such that the through apertures 1126 are aligned with the through apertures 1421. The rivet 1410 is pierced through the through apertures 1126, 1421, 2212a and then riveted thereto, thus forming the hinge-joint portions 2400L, 2400R.

The intermediate lever 2200L, 2200R includes a joint portion 2227, which extends from a longitudinal outer end portion 2225 of the intermediate spoiler portion 2220 toward the distal end of the wiper blade 200 and has an inverted U-shaped cross section. The joint portion 2227 has width and height dimensions less than the longitudinal outer end portion 2225 of the intermediate spoiler portion 2220. The intermediate spoiler portion 2220 has an arm receiving portion 2226 receiving a portion of the end lever 2300L, 2300R. The arm receiving portion 2226 is defined by a space between the inclined surfaces 2221F, 2221R and an interior space of the joint portion 2227. The joint portion 2227 participates in hinge-joint to the end lever 2300L, 2300R. The joint portion 2227 has a slit 2228 at its top and indentations 2229 at its lower edge. The slit 2228 and the indentations 2229 participate in engagement with the joint cover 1430'.

The end levers 2300L, 2300R are joined to the intermediate levers 2200L, 2200R respectively and hold the wiper rubber assembly 210, 220. The end lever 2300L, 2300R according to this embodiment has the same configuration as the end lever 1300L, 1300R of the first embodiment. Further, the end lever 2300L, 2300R has a length shorter than the end lever 1300L, 1300R of the first embodiment.

Figure 39:
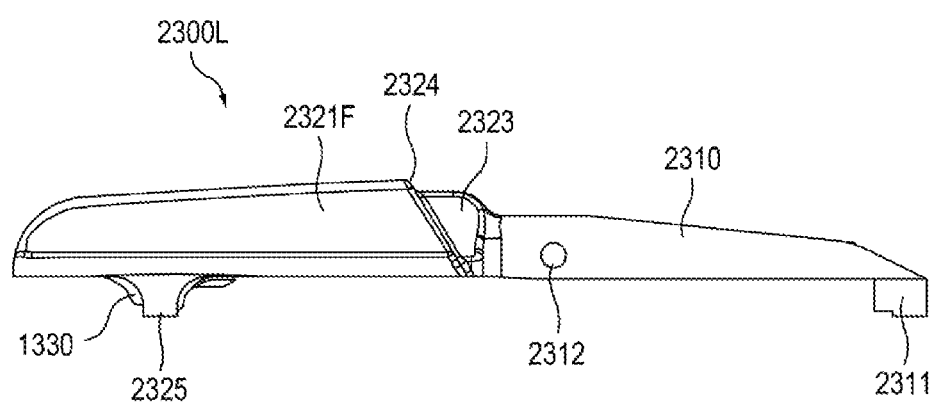
FIG. 39 is a left side view of an end lever of the wiper blade according to the second embodiment.
Figure 40:
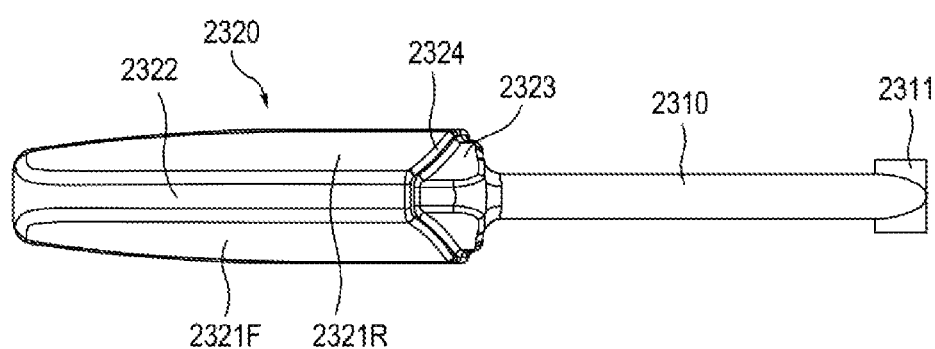
FIG. 40 is a top view of the end lever shown in FIG. 39.
Figure 41:
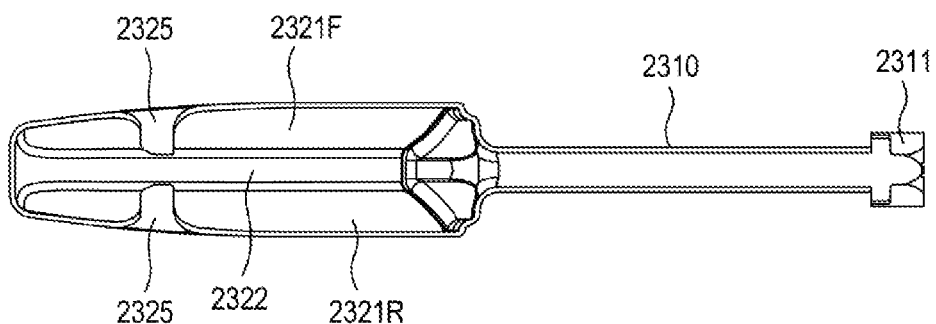
FIG. 41 is a bottom view of the end lever shown in FIG. 39.
Figure 42:
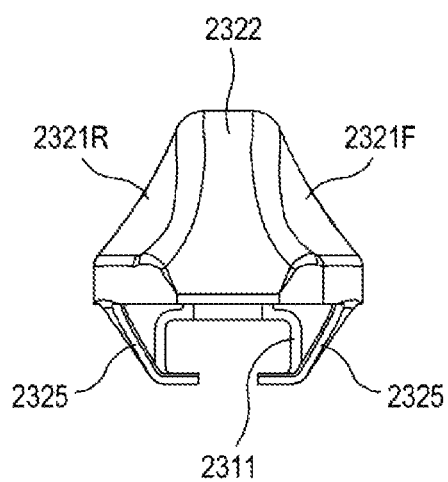
FIG. 42 is a left side view of the end lever shown in FIG. 39.

Descriptions are made as to the end lever 2300L with reference to FIGS. 39 to 42. The end lever 2300L and the end lever 2300R are symmetrical in the longitudinal direction of the lever assembly 2000. The end lever 2300L, 2300R includes an end arm 2310 to be situated in the arm receiving portion 2226 of the intermediate spoiler portion 2220 and an end spoiler portion 2320 oppositely extending from the end arm 2310. The end arm 2310 has an inverted U-shaped cross-section. The end spoiler portion 2320 has an inverted V-shaped cross-section. The end arm 2310 extends from a longitudinal inner end portion 2323 of the end spoiler portion 2320 toward the intermediate lever 2200L, 2200R. A lower edge of the end arm 2310 and a lower edge of the end spoiler portion 2320 form an approximately straight line. The inner end portion 2323 has width and height dimensions less than the longitudinally inner stepped surface 2324 of the end spoiler portion 2320. Two clamps 2325, 2311 of each end lever 2300L, 2300R fix the wiper rubber assembly 210, 220. The clamp 2325 is formed at a lower edge of the end spoiler portion 2320 in the vicinity of its longitudinal outer end. The clamp 2311 is formed at a distal end of the end arm 2310. The clamps 2311, 2325 have the same shape as the clamps 1311, 1325 of the end lever 1300L, 1300R of the first embodiment. As shown in FIG. 39, the clamp insert 1330 of the first embodiment is fitted to the clamp 2325 to fix the wiper rubber 210 to the clamp 2325.

The end spoiler portion 2320 has a pair of inclined surfaces 2321F, 2321R that are symmetrical in the width direction of the end lever 2300L, 2300R. The inclined surfaces 2321F, 2321R are located in the lateral surfaces of the end spoiler portions 2320. The inclined surfaces 2321F, 2321R extend in the longitudinal direction of the wiper rubber 210 in the end lever 2300L, 2300R and form the lateral surfaces of the end spoiler portion 2320. Accordingly, the end spoiler 233L, 233R is integrated in the end lever 2300L, 2300R through the end spoiler portion 2320 having the inclined surfaces 2321F, 2321R. An apex portion 2322 interconnects the inclined surfaces 2321F, 2321R at their upper edges. The inclined surfaces 2321F, 2321R are concave in the width direction of the end lever 2300L, 2300R. Further, a height dimension of the inclined surfaces 2321F, 2321R decreases gradually toward the longitudinal outer end of the end lever 2300L, 2300R. Further, lower edges of the inclined surfaces 2321F, 2321R approach each other at the distal end of the end lever 2300L, 2300R, thereby forming a round distal end of the end lever 2300L, 2300R along with the apex portion 2322. The inclined surfaces 2321F, 2321R may be curved with the same curvature as that of the inclined surfaces 2221F, 2221R of the intermediate spoiler portion 2220, or curved with a curvature varying therefrom. In this embodiment, the inclined surfaces 2321F, 2321R of the end spoiler portion 2320 is curved with a curvature greater than that of the inclined surfaces 2221F, 2221R of the intermediate spoiler portion.

The intermediate lever 2200L, 2200R and the end lever 2300L, 2300R are joined to each other via a hinge-joint portion 2400'L, 2400'R penetrating through the joint portion 2227 of the intermediate lever and the end arm 2310 of the end lever. When the intermediate lever 2200L, 2200R and the end lever 2300L, 2300R are joined to each other, the end arm 2310 is situated in the arm receiving portion 2226 of the intermediate spoiler portion 2220 and is thus hidden within the intermediate spoiler portion 2220 when viewed from outside.

Referring to FIG. 43, when the central lever 1100 and the intermediate lever 2200L, 2200R are joined to each other, the joint portion 1125 of the central lever 1100 is nested on the intermediate arm 2210 of the intermediate lever 2200L, 2200R with the hinge insert 1420 intervened therebetween and the hinge-joint portion 2400L, 2400R is formed therebetween. Further, when the intermediate lever 2200L, 2200R and the end lever 2300L, 2300R are joined to each other, the joint portion 2227 of the intermediate lever 2200L, 2200R is nested on the end arm 2310 of the end lever 2300L, 2300R with the hinge insert 1420 intervened therebetween and the hinge-joint portion 2400'L, 2400'R is formed therebetween. The lever assembly 2000 includes the joint covers 1430, 1430' disposed between the levers to cover the hinge-joint portions 2400L, 2400R, 2400'L, 2400'R. The joint cover 1430 snap-engages the joint portion 1125 of the central lever between the central lever 1100 and the intermediate lever 2200L, 2200R. The joint cover 1430' snap-engages the joint portion 2227 of the intermediate lever between the intermediate lever 2200L, 2200R and the end lever 2300L, 2300R. The joint cover 1430' has a configuration similar to the configuration of the joint cover 1430. A cross-sectional profile of the joint cover 1430' decreases in height dimension toward the end lever 2300L, 2300R. Further, a curvature of the inclined surface 1431F, 1431R of the joint cover 1430' increases toward the end lever 2300L, 2300R.

The stepped surface 1124 of the central spoiler portion 1120 and a stepped surface 2224b of the intermediate spoiler portion 2220 are inclined at an acute angle inwardly of the wiper blade 200, while a stepped surface 2224a of the intermediate spoiler portion 2220 and a stepped surface 2324 of the end spoiler portion 2320 are inclined at an acute angle toward the distal end of the wiper rubber 210. Further, the longitudinal both ends of the joint covers 1430, 1430' are inclined in harmony with such inclination of the stepped surfaces. Thus, when no load acts on the wiper blade 200, the central spoiler portion 1120, the joint cover 1430, the intermediate spoiler portion 2220, the joint cover 1430' and the end spoiler portion 2320 can become open with a slight gap therebetween. With the stepped surfaces 1124, 2224a, 2224b, 2324 inclined as described above and the shapes of the joint covers 1430, 1430' corresponding thereto, the intermediate lever 2200L, 2200R and the end lever 2300L, 2300R cannot pivot upwardly relative to the central lever 1100. Accordingly, when a downward load acts on the wiper blade 200, the central spoiler portion 1120, the joint cover 1430, the intermediate spoiler portion 2220, the joint cover 1430' and the end spoiler portion 2320 is brought into close abutment with one another in the longitudinal direction, thereby bringing the wiper rubber 210 into strong contact with the windshield.

Descriptions are made as to an example assembly of the wiper blade 200 according to the second embodiment with reference to FIG. 43.

In an assembly wherein the central lever 1100, the intermediate lever 2200L, 2200R and the end lever 2300L, 2300R are hinge-jointed to one another, the joint covers 1430, 1430' are snap-engaged to the hinge-joint portions 2400L, 2400R, 2400'L, 2400'R respectively by pressing the joint cover 1430 and the joint cover 1430' against the joint portion 1125 of the central lever and the joint portion 2227 of the intermediate lever respectively. The claws 1433 of the joint covers 1430, 1430' snap-engage the indentations 1128, 2229 of the joint portions 1125, 2227 and the positioning protrusions 1434 of the joint covers 1430, 1430' are inserted to the slits 1127, 2228 of the joint portions 1125, 2227, thus coupling the joint covers 1430, 1430' to the hinge-joint portions 2400L, 2400R, 2400'L, 2400'R.

By fitting the clamps 2325, 2311 of the end levers 2300L, 2300R and the clamps 2211 of the intermediate levers 2200L, 2200R to the second groove 114 of the wiper rubber 210, the lever assembly 2000 and the wiper rubber assembly 210, 220 are coupled to each other. For example, the wiper rubber assembly 210, 220 is slid along the lever assembly 2000 while sequentially inserting the following: the clamp 2325 of the end lever 2300L with the clamp insert 1330 fitted thereto, the clamp 2311 of the end lever 2300L, the clamp 2211 of the intermediate lever 2200L, the clamp 2211 of the intermediate lever 2200R, the clamp 2311 of the end lever 2300R and the clamp 2325 of the end lever 2300R with the clamp insert 1330 fitted thereto. If the both ends of the clamp 2325 of the end lever 2300L is fitted to the insertion holes 117 and the sandwiching portions 1332 of the clamp insert 1330 are placed in the recess 116, the wiper rubber assembly 210, 220 is fixed to the lever assembly 2000.

Referring again to FIGS. 30 to 34 showing the assembled wiper blade 200, the lever assembly 2000 holds the wiper rubber assembly 210, 220 at six pressure points via the clamps 2325, 2311 of the end levers 2300L, 2300R and the clamps 2211 of the intermediate levers 2200L, 2200R. Further, the central lever 1100, the intermediate levers 2200L, 2200R and the end levers 2300L, 2300R are straight arranged along the length of the wiper rubber 210 and are at the same height on the wiper rubber 210. Further, in the assembled wiper blade 200, the inclined surfaces 1121F, 1121R of the central spoiler portion 1120, the inclined surfaces 1431F, 1431R of the joint cover 1430, the inclined surfaces 2221F, 2221R of the intermediate spoiler portion 2220, the inclined surfaces 1431F, 1431R of the joint cover 1430' and the inclined surfaces 2321F, 2321R of the end spoiler portion 2320 are straight adjoined one after another, thereby defining the spoiler 230L, 230R having the cross-sectional profile with its height dimension decreasing toward the distal end of the wiper blade 200.

FIGS. 44 to 56 show a wiper blade according to a third embodiment, generally denoted by 300, and elements or components constituting the wiper blade 300. The wiper blade 300 according to this embodiment is configured to hold the wiper rubber at eight pressure points. The wiper blade 300 according to the third embodiment has a longer length when compared to the wiper blades 100, 200 according to the first and second embodiments and its lever assembly has a configuration for such a longer length. In FIGS. 44 to 56, the same elements or components as those of the wiper blades 100, 200 of the first and second embodiments are denoted by the same reference numerals.

Figure 44:
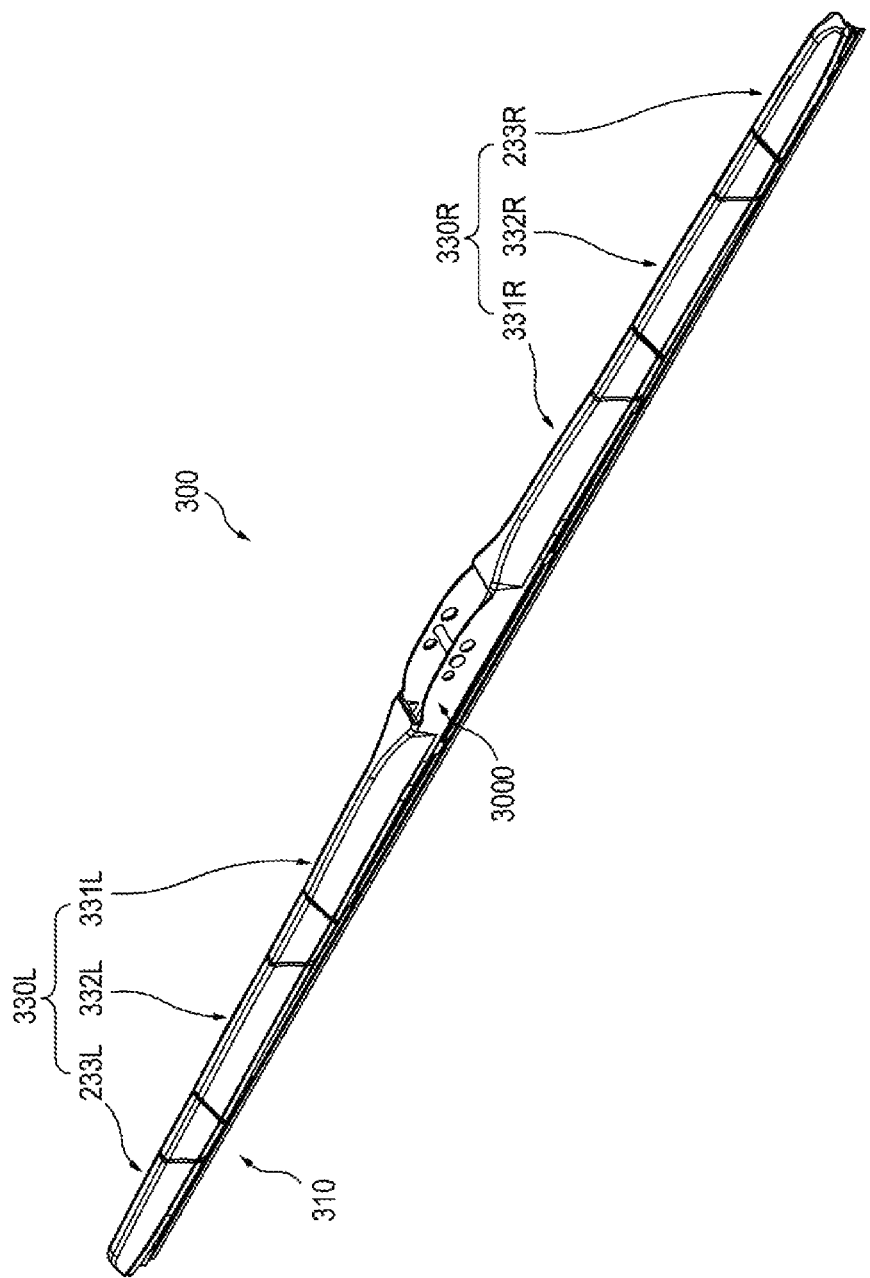
FIG. 44 is a perspective view showing a wiper blade in accordance with a third embodiment.
Figure 45:
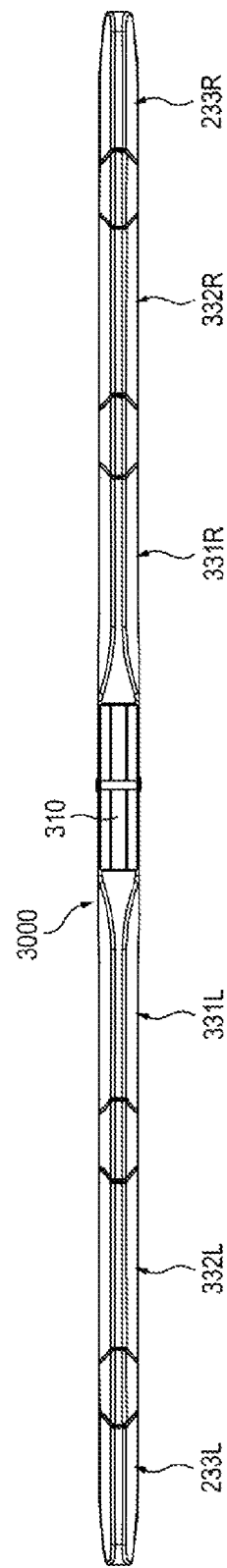
FIG. 45 is a top view of the wiper blade shown in FIG. 44.
Figure 46:
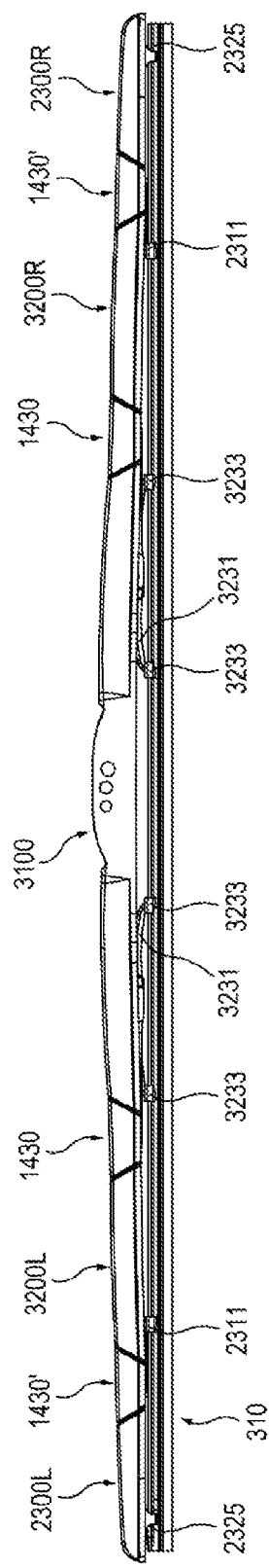
FIG. 46 is a front view of the wiper blade shown in FIG. 44.

Referring to FIGS. 44 to 46, the wiper blade 300 according to the third embodiment has a wiper rubber 310, which contacts the windshield surface, and a lever assembly 3000 holding and supporting the wiper rubber 310. Further, the wiper blade 300 includes a pair of spoilers 330L, 330R, which produce a reaction force preventing the lift caused by wind or air stream and are symmetrical relative to a longitudinal center of the wiper rubber 310. The spoilers 330L, 330R are integrated in the lever assembly 3000 and extend in the longitudinal direction of the wiper rubber 310.

The wiper rubber 310 has the same configuration as those of the wiper rubbers 110, 210 of the first and second embodiments and has a length longer than the wiper rubbers 110, 210. Spring rails 320 (see FIG. 56) are inserted to the first grooves 113 of the wiper rubber 310 to thus impart rigidity to the wiper rubber 310. The spring rail 320 has the same configuration as and a length longer than the spring rail 120 of the first embodiment. Hereinafter, the wiper rubber 310 with the spring rails 320 fitted thereto is referred to as a wiper rubber assembly 310, 320.

In this embodiment, the lever assembly 3000, which connects the wiper rubber assembly 310, 320 to the wiper arm, includes a central lever 3100, a pair of intermediate levers 3200L, 3200R joined to the central lever 3100 respectively and a pair of the end levers 2300L, 2300R joined to the intermediate lever 2200L, 2200R respectively. The levers 3100, 3200L, 3200R, 2300L, 2300R constituting the lever assembly 3000 are straight arranged along a longitudinal direction of the wiper rubber 310. The adjacent levers are hinge-jointed to each other. The levers 3100, 3200L, 3200R, 2300L, 2300R have an elongated hollow shape and may be made by pressing a metallic sheet or injection molding a plastic material The spoiler 330L, 330R is integrated in an upper surface of the lever assembly 3000 (an upper or lateral surface of each lever constituting the lever assembly) along a longitudinal direction thereof (along a longitudinal direction of the wiper rubber 310). Similar to the first and second embodiments, a cross-sectional profile of the spoiler 330L, 330R for producing the reaction force includes a triangle having concave legs. The cross-sectional profile of the spoiler 330L, 330R decreases in a height dimension toward a distal end of the wiper blade 300. Each spoiler 330L, 330R comprises spoiler sections located in respective levers 3100, 3200L, 3200R, 3300L, 3300R. The spoiler sections of the respective levers are straight adjoined one after another, i.e. they are consecutively adjoined with the spoiler sections of adjacent levers adjoining each other, thereby defining the spoiler 330L, 330R. A spoiler portion of each lever forms the spoiler section. Specifically, a portion or an entirety of a lateral surface of each spoiler portion forms the spoiler section. In the below descriptions, regarding the spoiler 330L, 330R formed in the lever assembly 3000, a spoiler section integrated in the central lever 3100 is referred to as a central spoiler 331L, 331R, and another spoiler section integrated in the intermediate lever 3200L, 3200R is referred to as an intermediate spoiler 332L, 332R, and yet another spoiler section integrated in the end lever 2300L, 2300R is referred to as an end spoiler 233L, 233R.

The central lever 3100 is located in the middle of the wiper rubber assembly 310, 320. The central lever 3100 is releasably coupled to the distal end of the wiper arm. The central lever 3100 has the same configuration as the central lever 1100 of the first embodiment. The central spoiler 331L, 331R integrally formed in the central lever 3100 is longer than the central spoiler 131L, 131R of the central lever 1100.

Figure 47:
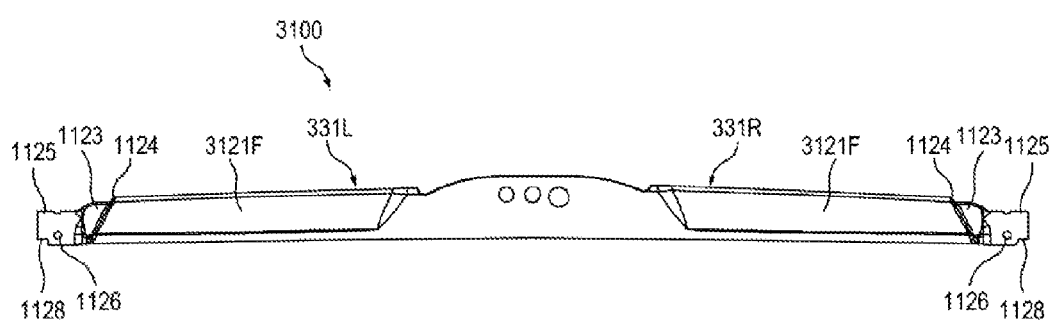
FIG. 47 is a front view of a central lever of the wiper blade according to the third embodiment.
Figure 48:
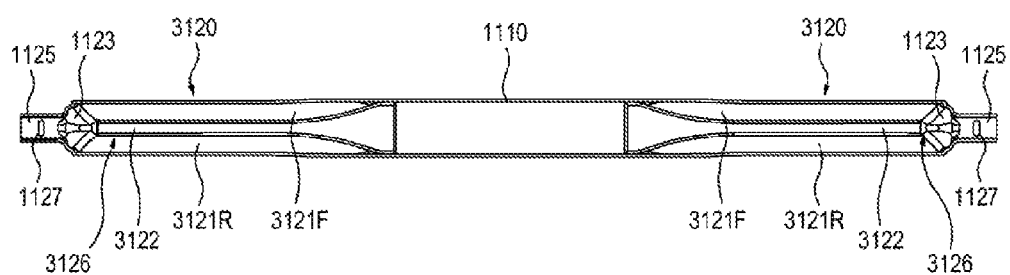
FIG. 48 is a bottom view of the central lever shown in FIG. 47.
Figure 49:
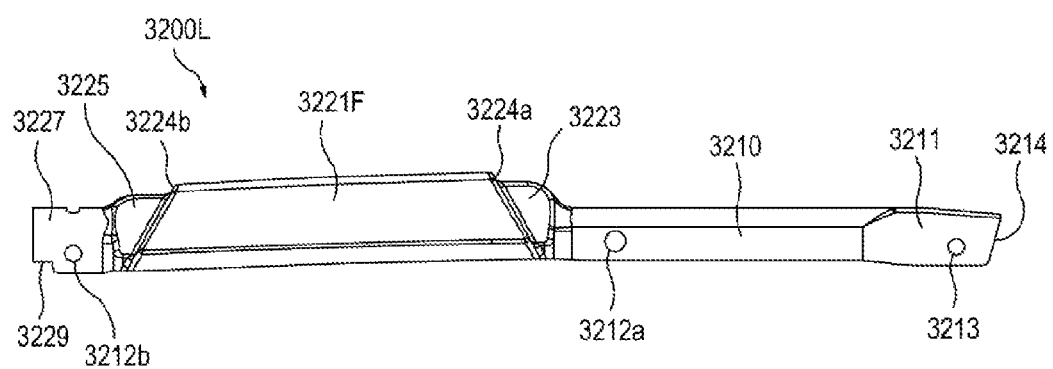
FIG. 49 is a front view of an intermediate lever of the wiper blade according to the third embodiment.
Figure 50:
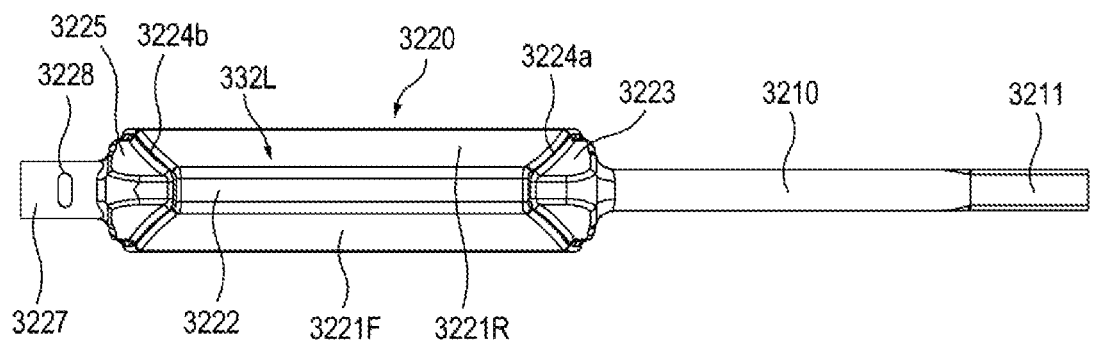
FIG. 50 is a top view of the intermediate lever shown in FIG. 49.
Figure 51:
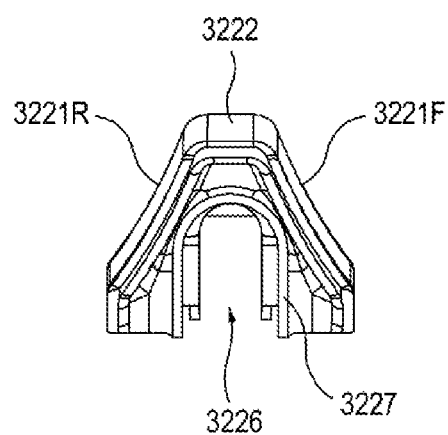
FIG. 51 is a left side view of the intermediate lever shown in FIG. 49.

Referring to FIGS. 47 and 48, the central lever 3100 includes a pair of central spoiler portions 3120, which extend from the centrally-located bracket portion 1110 in opposite directions in the longitudinal direction of the wiper rubber 310 and define the central spoiler 331L, 331R. The central spoiler portion 3120 has an inverted V-shaped cross-section. A lower edge of the central lever 3100 is straight or upwardly curved with a slight curvature.

The central spoiler portion 3120 includes a pair of inclined surfaces 3121F, 3121R that are symmetrical in the width direction of the central lever 3100. The inclined surfaces 3121F, 3121R are located in the lateral surfaces of the central spoiler portion 3120. The inclined surfaces 3121F, 3121R extend in the longitudinal direction of the wiper rubber 310 in the central lever 3100 and form the lateral surfaces of the central spoiler portion 3120. Accordingly, the central spoiler 331L, 331R is integrated in the central lever 3100 through the central spoiler portion 3120 having the inclined surfaces 3121F, 3121R. An apex portion 3122 interconnects the inclined surfaces 3121F, 3121R at their upper edges.

The inclined surfaces 3121F, 3121R includes a concave surface. A width of the apex portion 3122 becomes sharply narrow from the bracket portion 1110 and then is constant. The inclined surfaces 3121F, 3121R are concave in harmony with such width variance of the apex portion 3122. Thus, the cross-sectional profile of the central spoiler 331L, 331R, which the inclined surfaces 3121F, 3121R of the central spoiler portion 3120 define, is generally a triangle having both concave legs. The central spoiler portion 3120 has an arm receiving portion 3126 that receives a portion of the intermediate lever 3200L, 3200R. The arm receiving portion 3126 is defined by a space between the inclined surfaces 3121F, 3121R and an interior space of the joint portion 1125.

Each intermediate lever 3200L, 3200R is joined to the central lever 3100 and holds the wiper rubber assembly 310, 320. Descriptions are made as to the intermediate lever 3200L with reference to FIGS. 49 to 51. The intermediate lever 3200L and the intermediate lever 3200R are symmetrical in the longitudinal direction of the lever assembly 3000. The intermediate lever 3200L, 3200R includes an intermediate arm 3210 to be situated in the arm receiving portion 3126 of the central lever 3100 and an intermediate spoiler portion 3220 oppositely extending from the intermediate arm 3210. The intermediate arm 3210 has an inverted U-shaped cross-section. The intermediate spoiler portion 3220 has an inverted V-shaped cross-section. The intermediate spoiler portion 3220 has a stepped surface 3224a at a longitudinal inner end portion 3223. The longitudinal inner end portion 3223 has width and height dimension less than the stepped surface 3224a. The intermediate arm 3210 extends from the longitudinal inner end portion 3223 toward the central lever 3100. A lower edge of the intermediate arm 3210 and a lower edge of the intermediate spoiler portion 3220 form an approximately straight line.

The intermediate spoiler portion 3220 has a pair of inclined surfaces 3221F, 3221R, which are symmetrical in the width direction of the intermediate lever 3200L, 3200R and are located in the lateral surfaces of the intermediate spoiler portion 3220. The inclined surfaces 3221F, 3221R extend in the longitudinal direction of the wiper rubber 310 in the intermediate lever 3200L, 3200R and form the lateral surfaces of the intermediate spoiler portion 3220. Accordingly, the intermediate spoiler 332L, 332R is integrated in the intermediate lever 3200L, 3200R through the intermediate spoiler portion 3220 having the inclined surfaces 3221F, 3221R. An apex portion 3222 interconnects the inclined surfaces 3221F, 3221R at their upper edges. The inclined surfaces 3221F, 3221R are concave in the width direction of the intermediate lever 3200L 3200R. The inclined surfaces 3221F, 3221R is curved with the same curvature as that of the inclined surfaces 3121F, 3121R at the stepped surface 1124 of the central spoiler portion 3120. Further, a height dimension of the inclined surfaces 3221F, 3221R decreases gradually toward a longitudinal outer end of the intermediate lever 3200L, 3200R.

The central lever 3100 and the intermediate lever 3200L, 3200R are joined to each other via a hinge-joint portion 3400L, 3400R penetrating through the joint portion 1125 of the central lever and the intermediate arm 3210 of the intermediate lever. When the central lever 3100 and the intermediate lever 3200L, 3200R are joined to each other, the intermediate arm 3210 is situated in the arm receiving portion 3126 of the central spoiler portion 3120 and is thus hidden within the central spoiler portion 3120 when viewed from outside. The hinge-joint portion 3400L, 3400R has the same configuration as the hinge-joint portion 1400L, 1400R of the first embodiment. Through apertures 3212a for hinge-joint are formed in a portion of the intermediate arm 3210, which corresponds to the joint portion 1125 of the central lever 3100, in a width direction thereof. The hinge insert 1420 is nested on the intermediate arm 3210 such that the through apertures 1421 and the through apertures 3212a in alignment with each other. Thereafter, the joint portion 1125 of the central lever 3100 is nested on the hinge insert 1420 such that the through apertures 1126 are aligned with the through apertures 1421. The rivet 1410 is pierced through the through apertures 1126, 1421, 3212a and then riveted thereto, thus forming the hinge-joint portions 3400L, 3400R.

The intermediate lever 3200L, 3200R includes a joint portion 3227, which extends from a longitudinal outer end portion 3225 of the intermediate spoiler portion 3220 toward the distal end of the wiper blade 300 and has an inverted U-shaped cross section. The joint portion 3227 has width and height dimensions less than the longitudinal outer end portion 3225 of the intermediate spoiler portion 3220. The intermediate spoiler portion 3220 has an arm receiving portion 3226 receiving the end arm 2310 of the end lever. The arm receiving portion 3226 is defined by a space between the inclined surfaces 3221F, 3221R and an interior space of the joint portion 3227. The joint portion 3227 participates in hinge-joint to the end lever 2300L, 2300R. The joint portion 3227 has a slit 3228 at its top and indentations 3229 at its lower edge. The slit 3228 and the indentations 3229 participate in engagement with the joint cover 1430'.

Figure 52:
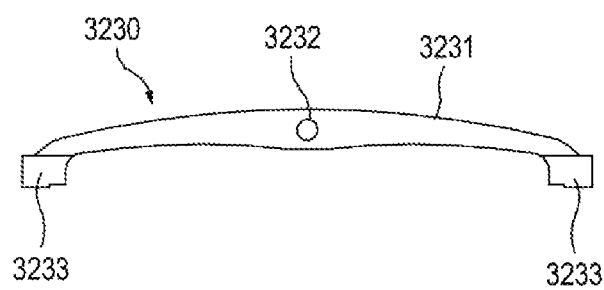
FIG. 52 is a front view of a yoke lever of the wiper blade according to the third embodiment.
Figure 53:
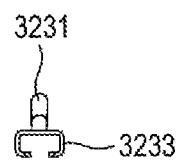
FIG. 53 is a right side view of the yoke lever shown in FIG. 52.
Figure 54:
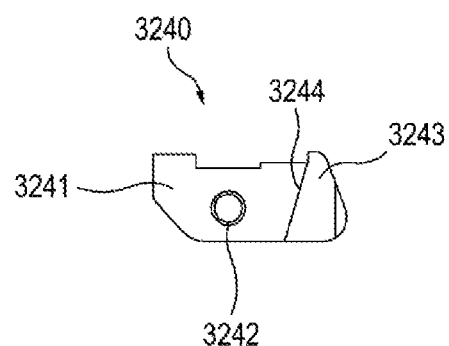
FIG. 54 is a front view of a hinge insert of the yoke lever.
Figure 55:
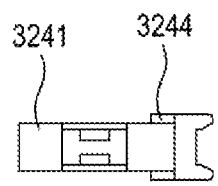
FIG. 55 is a top view of the hinge insert shown in FIG. 54.

In this embodiment, each intermediate lever 3200L, 3200R holds the wiper rubber assembly 310, 320 at two pressure points. For connection to the wiper rubber assembly 310, 320, each intermediate lever 3200L, 3200R has a yoke lever 3230 hinge-jointed to a distal end of the intermediate arm 3210. Referring to FIGS. 52 and 53, the yoke lever 3230 has an inverted U-shaped cross-section and includes yoke arms 3231 extending from a central through aperture 3232 in opposite directions. Clamps 3233 for holding the wiper rubber assembly 310, 320 are formed at both ends of the yoke arms 3231 of the yoke lever 3230 respectively. The clamps 3233 have the same shape as the clamp 1311 of the first embodiment.

A joint portion 3211 for hinge connection to the yoke lever 3230 is formed at the distal end of the intermediate arm 3210. Through apertures 3213 are formed in both lateral walls of the joint portion 3211. A distal end surface 3214 of the intermediate arm 3210 is inclined at an acute angle toward the center of the wiper rubber assembly 310, 320. A hinge insert 3240 shown in FIGS. 54 and 55 connects the yoke lever 3230 to the intermediate arm 3210. The hinge insert 3240 has a body 3241 of an inverted U-shaped cross-section such that a portion of the yoke lever 3230 with the through apertures 3232 formed therein is fitted to the body 3241. Through apertures 3242 are formed in both lateral walls of the body 3241 respectively. A stepped portion 3243 is formed in the vicinity of a longitudinal inner end of the body 3241. The stepped portion 3243 is formed with a stopper surface 3344 that abuts the distal end surface 3214 of the intermediate arm 3210 to thus restrict rotation of the hinge insert 3340 or the yoke lever 3230. The intermediate arm 3210 and the yoke lever 3230 are hinge-jointed to each other in the following manner: the hinge insert 3240 is nested on a midway portion of the yoke lever 3230; the hinge insert 3240 is inserted to the joint portion 3211 formed at the distal end of the intermediate arm 3210; and a rivet or pin is fitted to the through apertures 3232 of the yoke lever 3230, the through apertures 3242 of the hinge insert 3240 and the through apertures 3213 of the intermediate arm 3210 and is then riveted thereto.

Each end lever 2300L, 2300R is hinge-jointed to the intermediate lever 3200L, 3200R and holds the wiper rubber assembly 310, 320. When the intermediate lever 3200L, 3200R and the end lever 2300L, 2300R are hinge-joined to each other, the end arm 2310 is situated in the arm receiving portion 3226 of the intermediate spoiler portion 3220 and is thus hidden within the intermediate spoiler portion 3220 when viewed from outside. The intermediate lever 3200L, 3200R and the end lever 2300L, 2300R are joined to each other through a hinge-joint portion 3400'L, 3400'R penetrating through both the joint portion 3227 and the end arm 2310. Through apertures 3212b for hinge-joint are formed in the joint portion 3227 of the intermediate lever 3200L, 3200R in a width direction. The hinge insert 1420 is nested on the end arm 2310 of the end lever such that the through apertures 1421 and the through apertures 2312 are aligned with each other. Thereafter, the joint portion 3227 of the intermediate lever 3200L, 3200R is nested on the hinge insert 1420 such that the through apertures 3212b are aligned with the through apertures 1421. The rivet 1410 is pierced through the through apertures 3212b, 1421, 2312 and is riveted thereto, thereby forming the hinge-joint portion 3400'L, 3400'R.

Figure 56:
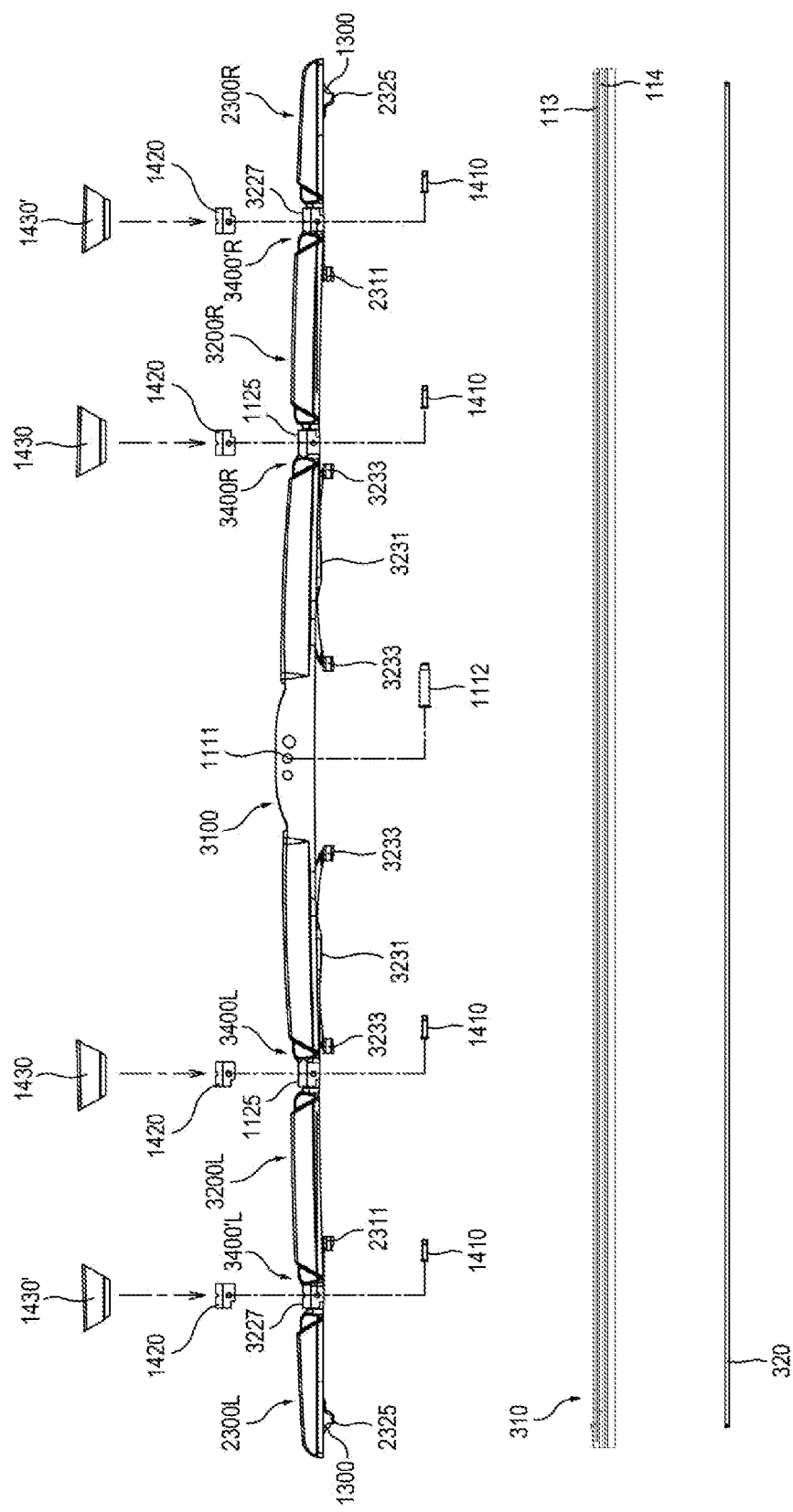
FIG. 56 is a front view showing an assembly example of the wiper blade according to the third embodiment.

Referring to FIG. 56, the lever assembly 3000 includes the joint cover 1430, which is disposed between the central lever 3100 and the intermediate lever 3200L, 3200R to cover the hinge-joint portion 3400L, 3400R, and the joint cover 1430', which is disposed between the intermediate lever 3200L, 3200R and the end lever 2300L, 2300R to cover the hinge-joint portion 3400'L, 3400'R. The joint cover 1430 snap-engages the joint portion 1125 of the central lever. The joint cover 1430' snap-engages the joint portion 3227 of the intermediate lever.

The wiper rubber assembly 310, 320 and the lever assembly 3000 are coupled to each other by fitting the clamps 3233 of the yoke lever 3230 and the clamps 2311, 2325 of the end levers 2300L, 2300R to the second groove 114 of the wiper rubber 310. If the both ends of the clamp 2325 of the end lever 2300L are inserted to the insertion holes 117 and the sandwiching portion 1332 of the clamp insert 1330 is placed in the recesses 116, then the wiper rubber assembly 310, 320 are fixed to the lever assembly 3000.

In the assembled wiper blade 300, when no load acts on the wiper blade 300, the central spoiler portion 3120, the joint cover 1430, the intermediate spoiler portion 3220, the joint cover 1430' and the end spoiler portion 2320 can become open with a slight gap therebetween. With the inclined stepped surfaces 1124, 3224a, 3224b, 2324 and the shapes of the joint covers 1430, 1430' corresponding thereto, the intermediate lever 3200L, 3200R and the end lever 2300L, 2300R cannot pivot upwardly relative to the central lever 3100. Accordingly, when the wiper arm applies a force to the wiper blade 200 toward the windshield, the central spoiler portion 3120, the joint cover 1430, the intermediate spoiler portion 3220, the joint cover 1430' and the end spoiler portion 2320 are brought into close abutment with one another in the longitudinal direction, thereby bringing the wiper rubber 310 into strong contact with the windshield.

Referring again to FIGS. 44 to 46 showing the assembled wiper blade 300, the lever assembly 3000 holds the wiper rubber assembly 310, 320 at eight pressure points via the clamps 2325, 2311 of the end levers 2300L, 2300R and the clamps 3233 of the yoke levers 3230. Further, the central lever 3100, the intermediate levers 3200L, 3200R and the end levers 2300L, 2300R are straight arranged along the length of the wiper rubber 310 and are at the approximately same height on the wiper rubber 310. Further, in the assembled wiper blade 300, the inclined surfaces 3121F, 3121R of the central spoiler portion 3120, the inclined surfaces 1431f, 1431R of the joint cover 1430, the inclined surfaces 3221F, 3221R of the intermediate spoiler portion 3220, the inclined surfaces 1431F, 1431R of the joint cover 1430' and the inclined surfaces 2321F, 2321R of the end spoiler portion 2320 are straight adjoined one after another, thereby defining the spoiler 330L, 330R having the cross-sectional profile with its height dimension decreasing gradually toward the distal end of the wiper blade 300.

In another embodiment similar to this embodiment, the wiper rubber assembly 310, 320 can be held at eight pressure points without the yoke lever 3230. In such an example, the lever assembly may be constructed such that two intermediate levers each having the clamp at its distal end of the intermediate arm (e.g., the intermediate lever 2200L, 2200R in the second embodiment) are juxtaposed. That is, the lever assembly of such an example may be configured such that the central lever, the first and second intermediate levers (e.g., intermediate levers similar to the intermediate lever 2200L, 2200R) and the end levers may be straight arranged and hinge-jointed one another.

FIGS. 57 to 60 show a wiper blade 400 according to a fourth embodiment and elements or components constituting the wiper blade 400. In a lever assembly 4000 of the wiper blade 400 according to this embodiment, opposing end surfaces of adjacent levers directly face to each other with little gap therebetween. To this end, the lever assembly 4000 includes a hinge-joint portion of a joint, which is hinge-jointed to the arm of one of the adjacent levers, and which is hidden in and coupled to the spoiler portion of the other of the adjacent levers. Via said joint, the arm of the one of the adjacent levers and the spoiler portion of the other of the adjacent levers, which is further inward than said one of the levers, are hinge-jointed to each other. Accordingly, the wiper blade 400 according to this embodiment does not include the joint cover 1430, 1430' in the foregoing embodiments. In FIGS. 57 to 60, the same elements or components as those of the wiper blade 200 of the second embodiment are denoted by the same reference numerals.

Figure 57:
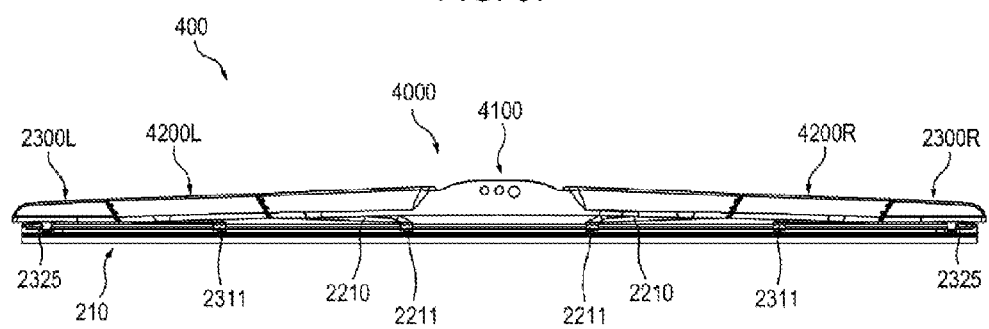
FIG. 57 is a front view of a wiper blade in accordance with a fourth embodiment.
Figure 58:
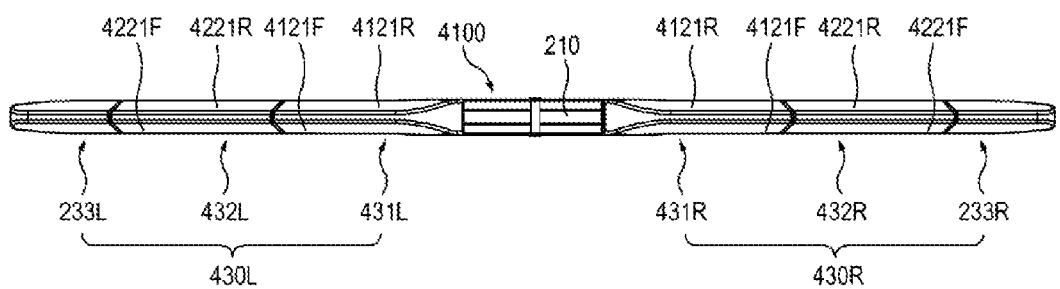
FIG. 58 is a top view of the wiper blade shown in FIG. 57.

Referring to FIGS. 57 and 58, the lever assembly 4000 of the wiper blade 400 holds the wiper rubber assembly 210, 220. The spoiler 430L, 430R is integrated in an upper surface of the lever assembly 4000 (an upper or lateral surface of each lever constituting the lever assembly) along a longitudinal direction of the wiper rubber 210. Each spoiler 430L, 430R produces a reaction force preventing the lift of the wiper blade 400. Similar to the second embodiment, a cross-sectional profile of the spoiler 430L, 430R for producing the reaction force includes a triangle having concave legs. The cross-sectional profile of the spoiler 430L, 430R decreases in a height dimension toward a distal end of the wiper blade 400. The lever assembly 4000 includes a central lever 4100 centrally located in the wiper rubber assembly 210, 220, a pair of intermediate levers 4200L, 4200R hinge-jointed to both longitudinal ends of the central lever 4100 respectively and a pair of the end levers 2300L, 2300R hinge-joined to both longitudinal ends of the intermediate levers 4200L, 4200R respectively. Each spoiler 430L, 430R comprises a central spoiler 431L, 431R, which is integrated in the central lever 4100 to become a section of the spoiler 430L, 430R, an intermediate spoiler 432L, 432R, which is integrated in the intermediate lever 4200L, 4200R to become another section of the spoiler 430L, 430R, and an end spoiler 233L, 233R, which is integrated in the end lever 2300L, 2300R to become yet another section of the spoiler 430L, 430R. Each lever has a spoiler portion forming the spoiler section.

Figure 59:
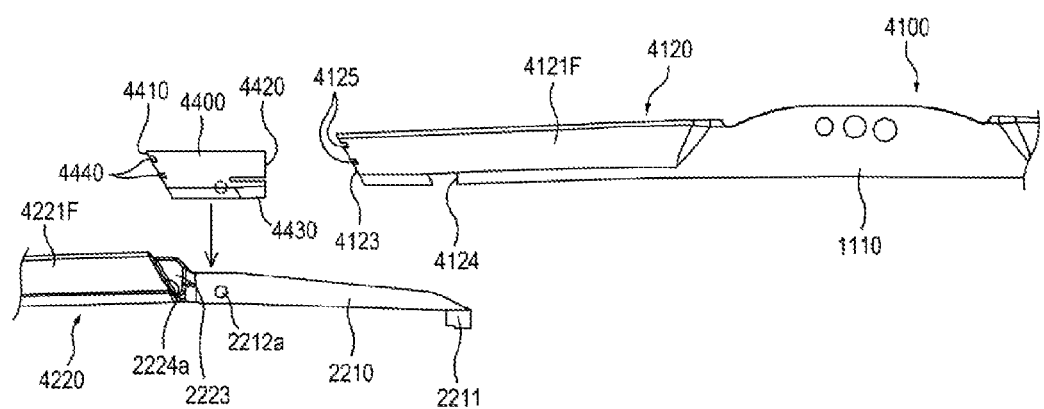
FIG. 59 depicts a coupling example between a joint and an intermediate lever in the wiper blade according to the fourth embodiment.

Referring to FIGS. 58 and 59, the central lever 4100 includes a pair of central spoiler portions 4120, which extend from the bracket portion 1110 in opposite directions in the longitudinal direction of the wiper rubber 210 and define the central spoiler 431L, 431R respectively.

The central spoiler portion 4120 has a pair of inclined surfaces 4121F, 4121R that are symmetrical in the width direction of the central lever 4100. The inclined surfaces 4121F, 4121R are located in the lateral surfaces of the central spoiler portion 4120. The inclined surfaces 4121F, 4121R extend in the longitudinal direction of the wiper rubber 210 in the central lever 4100 and form the lateral surfaces of the central spoiler portion 4120. Accordingly, the central spoiler 431L, 431R is integrated in the central lever 4100 through the central spoiler portion 4120 having the inclined surfaces 4121F, 4121R. A longitudinal outer end surface 4123 of the central spoiler portion 4120 is inclined at an acute angle toward the distal end of the wiper rubber 210. The intermediate lever 4200L, 4200R includes the intermediate arm 2210 to be situated inside the central spoiler portion 4120 and an intermediate spoiler portion 4220 oppositely extending from the intermediate arm 2210. A lower edge of the intermediate arm 2210 and a lower edge of the central spoiler portion 4220 form an approximately straight line. The intermediate spoiler portion 4220 has a pair of inclined surfaces 4221F, 4221R, which are symmetrical in the width direction of the intermediate lever 4200L, 4200R. The inclined surfaces 4221F, 4221R extend in the longitudinal direction of the wiper rubber 210 in the intermediate lever 4200L, 4200R and form the lateral surfaces of the intermediate spoiler portion 4220. Accordingly, the intermediate spoiler 432L, 432R is integrated in the intermediate lever 4200L, 4200R through the intermediate spoiler portion 4220.

When the central lever 4100 and the intermediate lever 4200L, 4200R are joined to each other, the intermediate arm 2210 is situated inside the central spoiler portion 4120 and is thus hidden within the central spoiler portion 4120 when viewed from outside. The intermediate arm 2210 is hinge-jointed to the central spoiler portion 4120 via the joint 4400.

The joint 4400 has a generally triangular cross-section so as to fit inside the central spoiler portion 4120. Height and width dimensions of the joint 4400 are determined such that a longitudinal outer end portion 4410 of the joint is nested on a portion (e.g., the intermediate arm 2210) of one of the adjacent levers (e.g., the intermediate lever 4200L, 4200R) and a longitudinal inner end portion 4420 of the joint is fitted to the spoiler portion of the other of the adjacent levers (e.g., the central lever 4100), which is further inward than said one of the adjacent levers. The joint 4400 and the intermediate lever 4200L, 4200R are joined to each other by means of hinge-joint between inner surfaces of the joint 4400 and through apertures 2212a formed in the intermediate arm 2210. When hinge-jointed, the longitudinal end portion 4410 of the joint 4400 is nested on the longitudinal inner end portion 2223 of the intermediate spoiler portion 4220.

The joint 4400 has an element snap-engaging the spoiler portion of the other of the adjacent levers (e.g., the central lever 4100). Specifically, the joint 4400 has snap protrusions 4430 at its longitudinal inner lower edge. A longitudinal outer end surface of the snap protrusion 4430 is inclined toward the distal end of the wiper rubber 210. Further, the joint 4400 has an element to be fitted to the end surface of the spoiler portion of the other of the adjacent levers (e.g., the central lever 4100). Specifically, the joint 4400 has two mating protrusions 4440 at either longitudinal outer end surface. The spoiler portion of the other of the adjacent levers (e.g. the central spoiler portion 4120 of the central lever 4100) has an element for snap-engagement with the joint 4400. A snap notch 4124, to which the snap protrusion 4430 is fitted, is formed at a lower edge of the central spoiler portion 4120. Further, the spoiler portion of the other of the adjacent levers (e.g. the central spoiler portion 4120 of the central lever 4100) has an element for engagement with the joint 4400. Mating notches 4125 mating the mating protrusions 4440 are formed in an outer end surface 4123 of the central spoiler portion 4120.

Figure 60:
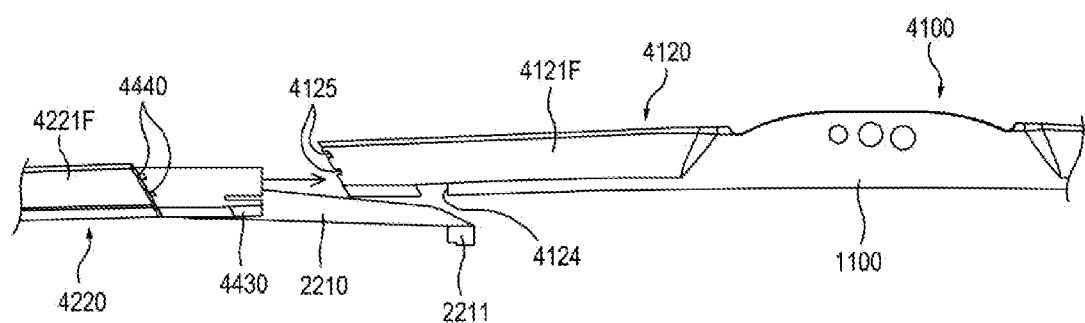
FIG. 60 depicts a coupling example between an intermediate lever and a central lever in the wiper blade according to the fourth embodiment.

Referring to FIGS. 59 and 60, the intermediate arm 2210 with the joint 4400 hinge-jointed thereto is inserted to the inside of the central spoiler portion 4120 and the joint 4400 attached to the intermediate lever 4200L, 4200R is pushed into the central spoiler portion 4120. Then, the inner surface of the central spoiler portion 4120 is moved along or slid on the outer surface of the joint 4400 and then the outer end surface 4123 of the central spoiler portion 4120 abuts the longitudinal inner stepped surface 2224a of the intermediate spoiler portion 4220 or faces the same with little gap therebetween. Further, the mating protrusions 4440 of the joint 4400 are fitted to the mating notches 4125 of the central spoiler portion 4120 and the snap protrusion 4430 of the joint 4400 snap-engages the snap notch 4124 of the central spoiler portion 4120, thereby coupling the joint 4400 to the central lever 4100.

The intermediate lever 4200L, 4200R and the end lever 2300L, 2300R are also joined to each other by means of the above-described joint. In this case, the joint between the intermediate lever 4200L, 4200R and the end lever 2300L, 2300R has width and height dimensions less than those of the above-described joint 4400. Further, a longitudinal outer end surface of the intermediate spoiler portion 4220 of the intermediate lever 4200L, 4200R is inclined toward the distal end of the wiper rubber 210. Mating notches are formed in the longitudinal outer end surface of the intermediate spoiler portion 4220 and a snap notch is formed at the lower edge of the intermediate spoiler portion 4220. The joint between the intermediate lever 4200L, 4200R and the end lever 2300L, 2300R is joined to the end arm 2310 of the end lever 2300L, 2300R by means of hinge-joint and has mating protrusions and snap protrusions corresponding to the mating notches and the snap notches respectively.

The above-described joint and the connection configuration using the same may be employed to a lever assembly configured to hold the wiper rubber at four pressure points (e.g., the lever assembly 1000 of the first embodiment) or a lever assembly configured to hold the wiper rubber at eight pressure points (e.g., the lever assembly 3000 of the third embodiment).

FIGS. 61 to 72 show a wiper blade according to a fifth embodiment, generally denoted by 500, and elements or components constituting the wiper blade 500. In a lever assembly 5000 of the wiper blade 500 according to this embodiment, opposing end surfaces of adjacent levers face to each other with little gap therebetween. Further, in this embodiment, a hinge-joint portion between adjacent levers of the lever assembly 5000 directly hinge-joints an arm, which is provided in one of the adjacent levers of the lever assembly 5000 to hold the wiper rubber, to an inside of a spoiler portion of the other of the adjacent levers. Such a hinge-joint configuration may be employed to any one of the wiper blades 100, 200, 300 of the foregoing embodiment. In FIGS. 61 to 72, the same elements or components as those of the wiper blade 200 of the second embodiment are denoted by the same reference numerals.

Figure 61:
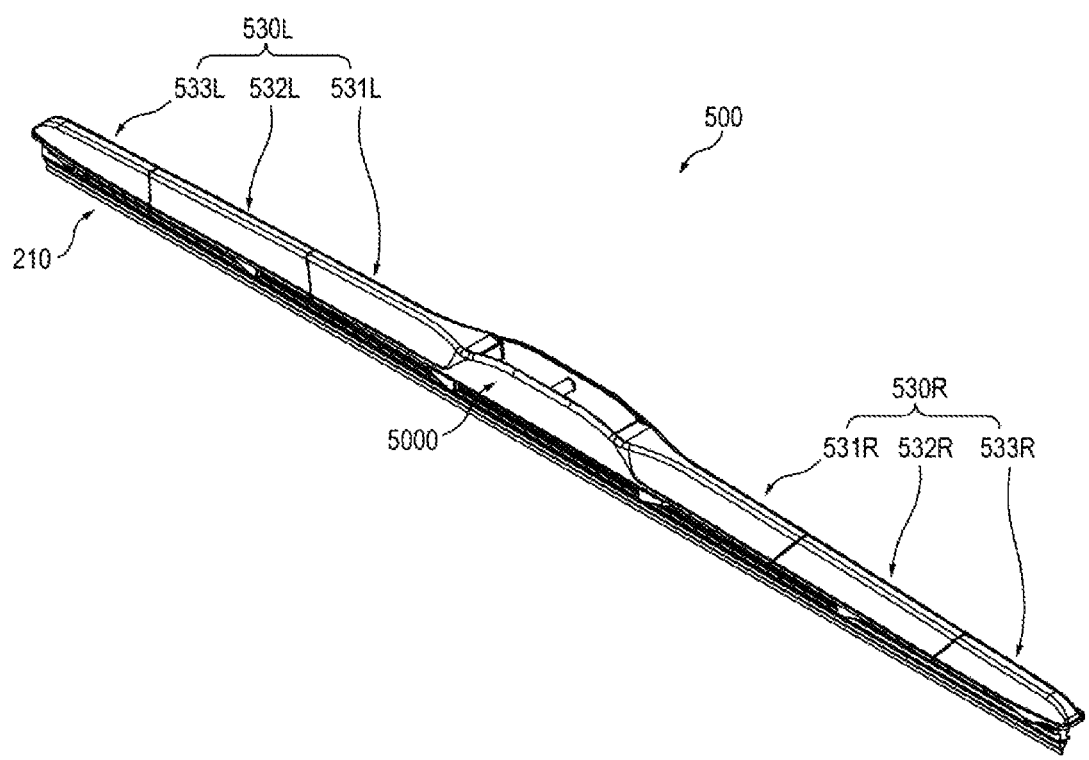
FIG. 61 is a perspective view showing a wiper blade in accordance with a fifth embodiment.
Figure 62:
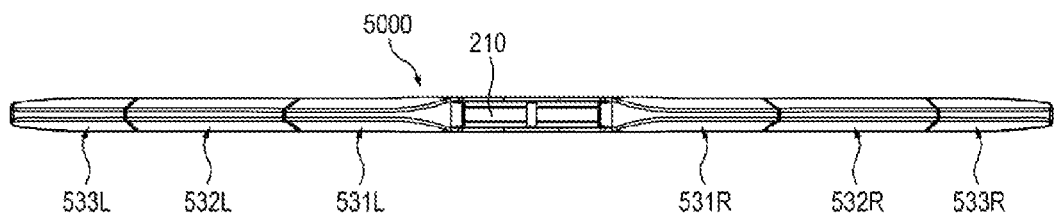
FIG. 62 is a top view of the wiper blade shown in FIG. 61.
Figure 63:
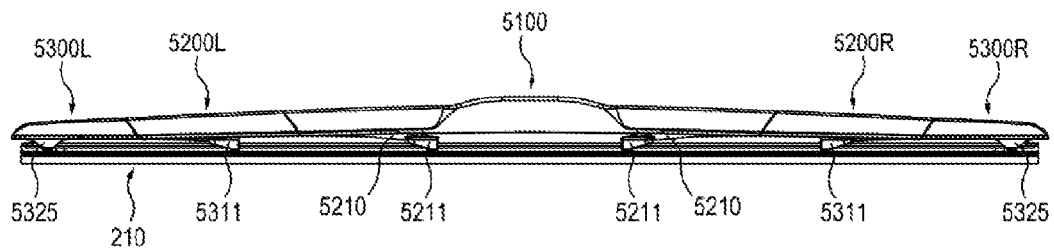
FIG. 63 is a front view of the wiper blade shown in FIG. 61.
Figure 64:
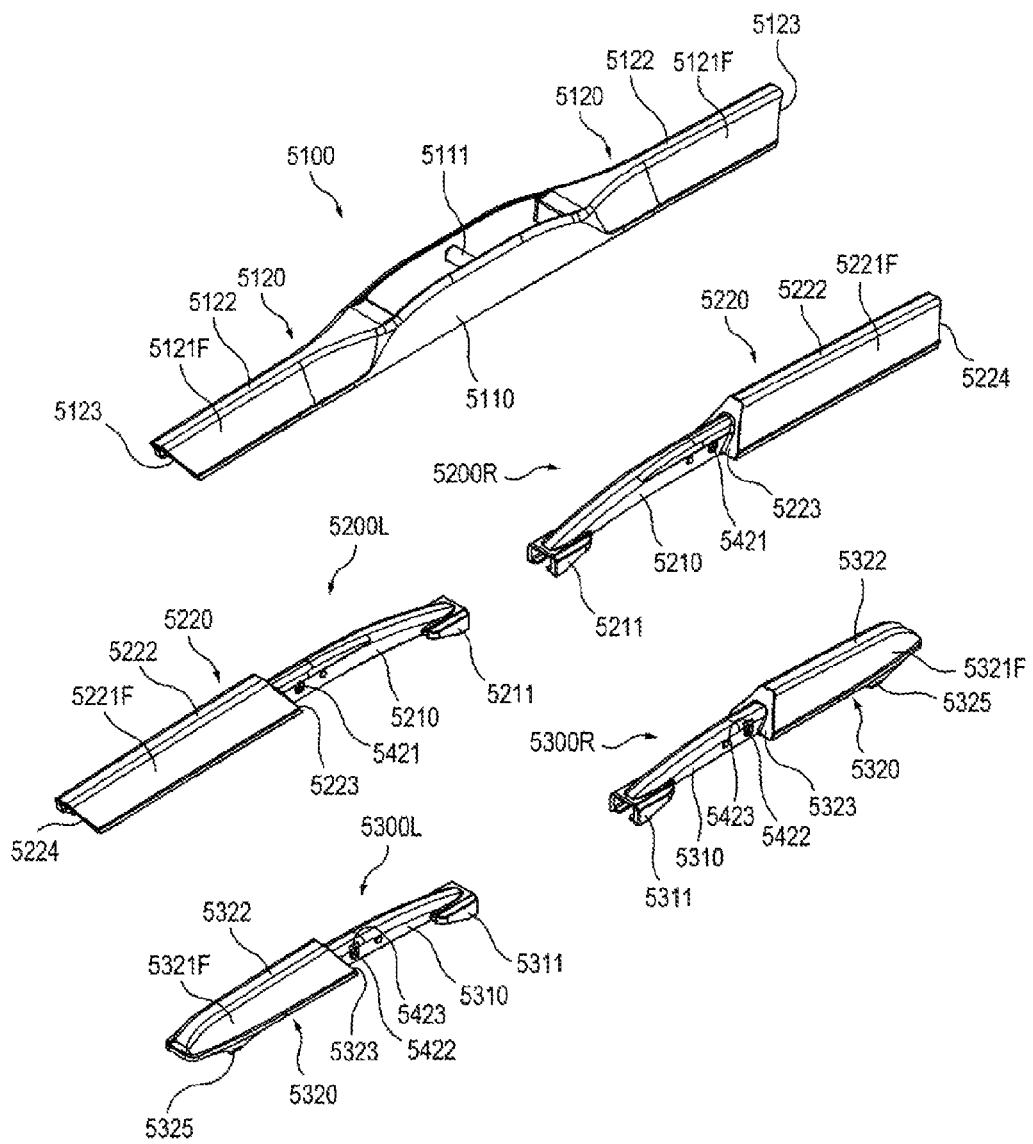
FIG. 64 is an exploded perspective view of a lever assembly of the wiper blade according to the fifth embodiment.
Figure 65:
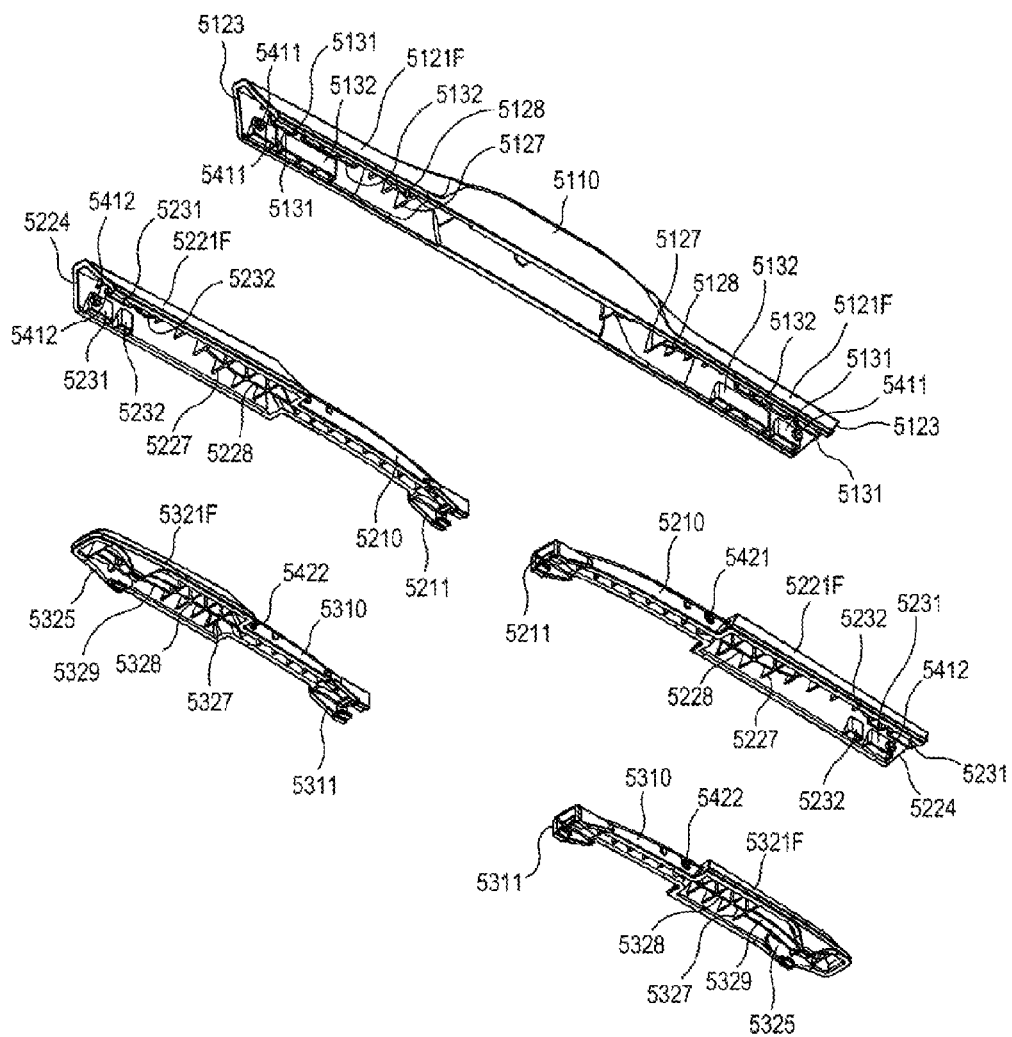
FIG. 65 is a lower perspective view of the lever assembly shown in FIG. 64.
Figure 66:
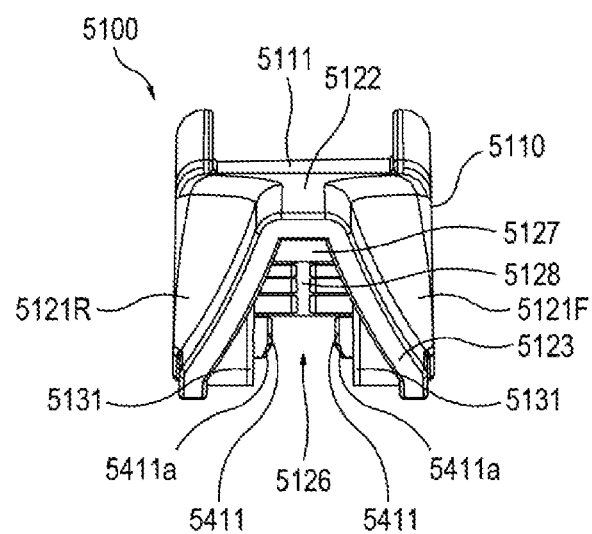
FIG. 66 is a left side view of a central lever of the lever assembly shown in FIG. 64.
Figure 67:
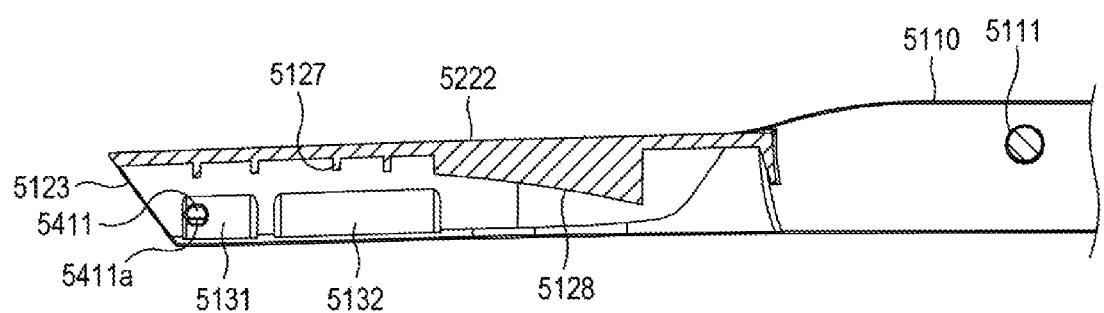
FIG. 67 is a fragmentary longitudinal sectional view of the central lever of the lever assembly shown in FIG. 64.
Figure 68:
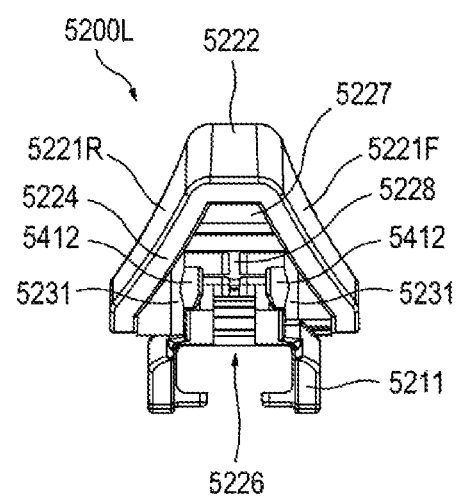
FIG. 68 is a left side view of an intermediate lever of the lever assembly shown in FIG. 64.
Figure 69:
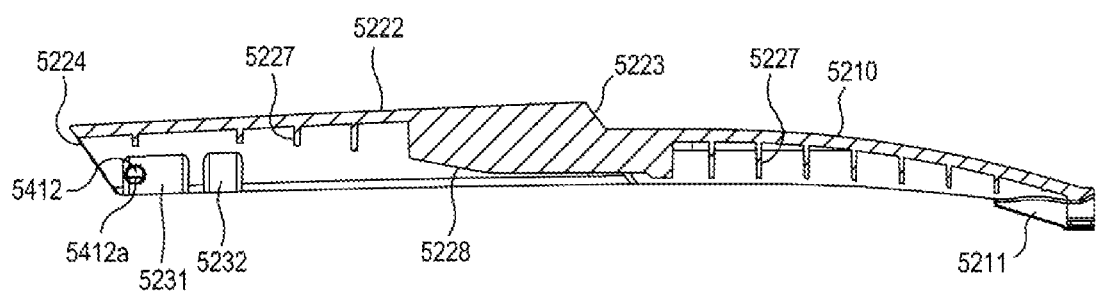
FIG. 69 is a longitudinal sectional view of the intermediate lever of the lever assembly shown in FIG. 64.
Figure 70:
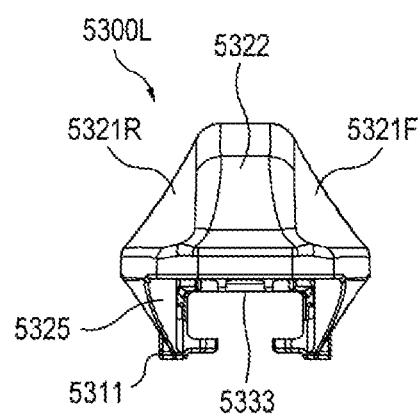
FIG. 70 is a left side view of an end lever of the lever assembly shown in FIG. 64.
Figure 71:
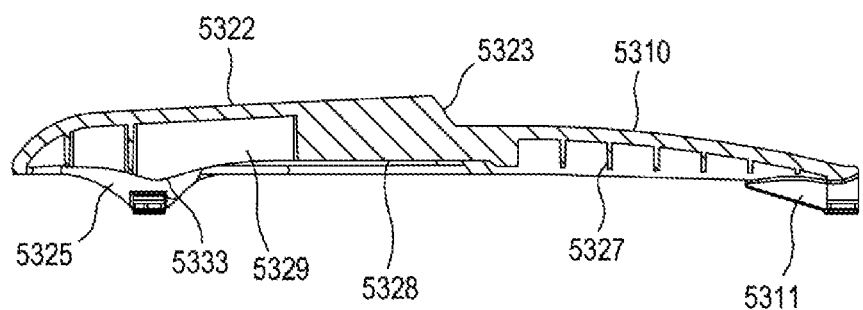
FIG. 71 is a longitudinal sectional view of the end lever of the lever assembly shown in FIG. 64.

Referring to FIGS. 61 to 63, the wiper blade 500 according to the fifth embodiment has a lever assembly 5000 holding and supporting the wiper rubber assembly 210, 220. Further, the wiper blade 500 includes a pair of spoilers 530L, 530R. The left spoiler 530L and the right spoiler 530R are symmetrical relative to a longitudinal center of the wiper rubber 210. The spoilers 530L, 530R are integrated in the lever assembly 5000 and extend in the longitudinal direction of the wiper rubber 210.

The lever assembly 5000 connects the wiper rubber assembly 210, 220 to the wiper arm and supports the wiper rubber assembly 210, 220 with respect to the wiper arm. In this embodiment, the lever assembly 5000 includes a central lever 5100 centrally located in the wiper rubber assembly 210, 220, a pair of intermediate levers 5200L, 5200R joined to the central lever 5100 respectively and a pair of end levers 5300L, 5300R joined to the intermediate levers 5200L, 5200R respectively. The central lever, the intermediate lever and the end lever have an appearance similar to the central lever, the intermediate lever and the end lever of the foregoing embodiments respectively. The levers are straight arranged along the length of the wiper rubber 210 to thus constitute the lever assembly 5000. Adjacent levers are hinge-jointed to each other. The levers 5100, 5200L, 5200R, 5300L, 5300R have an elongated hollow shape and may be made by injection molding a plastic material.

The pair of the spoilers 530L, 530R are integrated in an upper surface of the lever assembly 5000 along the longitudinal direction of the wiper rubber 210. A portion of the upper surface of the lever assembly 5000 (a portion of an upper or lateral surface of each lever constituting the lever assembly) defines the spoiler 530L, 530R.

Each spoiler 530L, 530R reacts to wind or air stream impinging against the wiper blade 500 during running of a motor vehicle and produces a reaction force preventing the wiper blade 500 from being lifted. Such a reaction force is produced by interaction between wind or air stream and a cross-sectional profile of the spoiler 530L, 530R. The cross-sectional profile of the spoiler 530L, 530R may be constant along the length of the lever assembly 5000 or vary in width and height dimensions toward a distal end of the wiper blade 500. Further, the cross-sectional profile may be symmetrical or asymmetrical in a width direction of the wiper rubber assembly (in a direction perpendicular to the longitudinal direction of the wiper rubber). In this embodiment, similar to the foregoing embodiments, the cross-sectional profile of the spoiler 530L, 530R includes a triangle having somewhat concave legs.

Each spoiler 530L, 530R comprises spoiler sections located in the respective levers 5100, 5200L, 5200R, 5300L, 5300R of the lever assembly 5000. The spoiler sections of the respective levers are straight adjoined one after another, i.e. the spoiler sections of the respective levers are straight adjoined one after another with the spoiler sections of adjacent levers adjoining each other, thereby defining the spoiler 530L, 530R. A portion of the upper surface of the lever, specifically a portion or the entirety of the lateral surface of the spoiler portion forms the spoiler section. Further, a spoiler portion included in each lever forms each spoiler section. In the below descriptions of the wiper blade 500 according to the fifth embodiment, regarding the spoiler 530L, 530R formed in the lever assembly 1000, a spoiler section integrated in the central lever 5100 to become a section of the spoiler 530L, 530R is referred to as a central spoiler 531L, 531R, and a spoiler section integrated in the intermediate lever 5200L, 5200R to become another section of the spoiler 530L, 530R is referred to as an intermediate spoiler 532L, 532R, and a spoiler section integrated in the end lever 5300L, 5300R to become yet another section of the spoiler 530L, 530R is referred to as an end spoiler 533L, 533R.

The central lever 5100 centrally located in the lever rubber assembly 210, 220 is releasably coupled to the distal end of the wiper arm. Referring to FIGS. 64 to 67, the central lever 5100 includes a bracket portion 5110 at its middle. The bracket portion 5110 has a shape of a vertically-pierced rectangular parallelepiped. A pin is formed in the middle of the bracket portion 5110 in a direction perpendicular to the longitudinal direction of the central lever 5100. The pin 5111 participates in connection to the wiper arm. An adaptor (not shown), which is configured to be connected to a corresponding element provided in the distal end of the wiper arm through fitting, snapping, engaging, etc., may be coupled to the pin 5111. The pin 5111 may function as a pivot shaft of the wiper blade 500.

Further, the central lever 5100 includes a pair of central spoiler portions 5120, which extend in opposite directions from the bracket portion 5110 in the longitudinal direction of the wiper rubber 210 and form the central spoiler 531L, 531R. The central spoiler portion 5120 has an inverted V-shaped cross-section. A lower edge of the central lever 5100 (lower edges of the bracket portion 5110 and the central spoiler portion 5120) is straight or curved with a slight curvature. The central spoiler portion 5120 includes a pair of inclined surfaces 5121F, 5121R that are symmetrical in a width direction of the central lever 5100. The inclined surfaces 5121F, 5121R are located in the lateral surfaces of the central spoiler portion 5120. The inclined surfaces 5121F, 5121R extend in the longitudinal direction of the wiper rubber 510 in the central lever 5100 and form the lateral surfaces of the central spoiler portion 5120. Accordingly, the central spoiler 531L, 531R is integrated in the central lever 5100 through the central spoiler portion 5120 having the inclined surfaces 5121F, 5121R. An apex portion 5122 interconnects the inclined surfaces 5121F, 5121R at their upper edges.

The inclined surfaces 5121F, 5121R includes a concave surface. A width of the apex portion 5122 becomes sharply narrow from the bracket portion 5110 and is then constant. The inclined surfaces 5121F, 5121R are concave in harmony with such a width of the apex portion 5122. Thus, the cross-sectional profile of the central spoiler 531L, 531R is generally a triangle having both concave legs. The central spoiler portion 5120 has an arm receiving portion 5126 that receives a portion of the intermediate lever 5200L, 5200R and hides the same therein. The arm receiving portion 5126 is defined by a space between the inclined surfaces 5121F, 5121R. A longitudinal outer end surface 5123 of the central spoiler portion 5120 is inclined at an acute angle toward the distal end of the wiper rubber 210. The central lever 5100 has a plurality of transverse ribs 5127, which are oriented in the width direction, and a longitudinal rib 5128, which is oriented in the longitudinal direction and intersects the transverse ribs 5127. The transverse ribs 5127 and the longitudinal rib 5128 protrude such that they do not interfere with a top side of a portion of the intermediate lever 5200L, 5200R to be situated in the central spoiler portion 5120.

Each intermediate lever 5200L, 5200R is joined to the central lever 5100 and holds the wiper rubber assembly 210, 220. Descriptions are made as to the intermediate lever 5200L with reference to FIGS. 64, 65, 68 and 69. The intermediate lever 5200L and the intermediate lever 5200R are symmetrical in the longitudinal direction of the lever assembly 5000. The intermediate lever 5200L, 5200R includes an intermediate arm 5210 to be situated in the arm receiving portion 5126 of the central spoiler portion 5120 and an intermediate spoiler portion 5220 oppositely extending from the intermediate arm 5210. The intermediate arm 5210 has an inverted U-shaped cross-section. The intermediate spoiler portion 5220 has an inverted V-shaped cross-section. The intermediate arm 5210 extends from a longitudinal inner end surface 5223 of the intermediate spoiler portion 5220 toward the central lever 5100. A lower edge of the intermediate arm 5210 and a lower edge of the intermediate spoiler portion 5220 form an approximately straight line.

Each intermediate lever 5200L, 5200R has a clamp 5211 for fixing the wiper rubber assembly 210, 220. The clamp 5211 is formed at a distal end of the intermediate arm 5210. The clamp 5211 has a generally rectangular cross-section with its bottom side cut away partially and thus both ends thereof extend inwardly. When the intermediate lever 5200L, 5200R and the wiper rubber assembly 210, 220 are coupled to each other, an upper inner surface of the clamp 5211 is placed on a top side of the wiper rubber 210 and lateral portions of the clamp 5211 sandwich the spring rail 220 and a portion of the wiper rubber 210 adjacent thereto and the both ends of the clamp 5211 are inserted to the second groove 114 of the wiper rubber (see FIG. 72).

The intermediate spoiler 532L, 532R is integrally formed in the intermediate lever 5200L, 5200R. The intermediate spoiler portion 5220 has a pair of inclined surfaces 5221F, 5221R that are symmetrical in the width direction of the intermediate lever 5200L, 5200R. The inclined surfaces 5221F, 5221R are located in the lateral surfaces of the intermediate spoiler portion 5220. The inclined surfaces 5221F, 5221R extend in the longitudinal direction of the wiper rubber 210 in the intermediate lever 2200L, 2200R and form the lateral surfaces of the intermediate spoiler portion 5220. Accordingly, the intermediate spoiler 532L, 532R is integrated in the intermediate lever 5200L, 5200R through the intermediate spoiler portion 5220 having the inclined surfaces 5221F, 5221R. An apex portion 5222 interconnects the inclined surfaces 5221F, 5221R at their upper edges. The inclined surfaces 5221F, 5221R includes a concave surface. Further, a height dimension of the inclined surfaces 5221F, 5221R decreases gradually toward a longitudinal outer end of the intermediate lever 5200L, 5200R The inclined surfaces 5221F, 5221R may be curved with the same curvature as that of the inclined surfaces 5121F, 5121R of the central spoiler portion 5120, or curved with a curvature varying therefrom. In this embodiment, the inclined surfaces 5221F, 5221R of the intermediate spoiler portion 5220 is curved with the same curvature as that of the inclined surfaces 5121F, 5121R at the outer end surface 5123 of the central spoiler portion 5120.

The intermediate spoiler portion 5220 has an arm receiving portion 5226, which receives a portion of the end lever 5300L, 5300R and hides the same therein. The arm receiving portion 5226 is defined by a space between the inclined surfaces 5221F, 5221R. The intermediate lever 5200L, 5200R has a plurality of transverse ribs 5227 and a longitudinal rib 5228 therein. The transverse ribs 5227 are oriented in the width direction. The longitudinal rib 5228 is oriented in the longitudinal direction and intersects the transverse ribs 5227. The transverse ribs 5227 and the longitudinal rib 5228 are located in the intermediate arm 5210 as well as the intermediate spoiler portion 5220. Further, the transverse ribs 5227 and the longitudinal rib 5228 in the intermediate spoiler portion 5220 protrude such that they do not interfere with a portion of the end lever 5300L, 5300R to be situated in the intermediate spoiler portion 5220.

The central lever 5100 and the intermediate lever 5200L, 5200R are joined to each other via a hinge-joint portion hinge-jointing the interior of the central spoiler portion 5120 and the intermediate arm 5210. When the central lever 5100 and the intermediate lever 5200L, 5200R are joined to each other, the intermediate arm 5210 of the intermediate lever is situated in the arm receiving portion 5126 of the central spoiler portion 5120 and is thus hidden within the central spoiler portion 5120 when viewed from outside. In other words, a portion (e.g., the intermediate arm 5210) of one of the adjacent levers (e.g., the intermediate lever 5200L, 5200R) is situated in and hinge-jointed to the spoiler portion of the other of the adjacent levers (e.g., the central lever 5100), which is further inward than said one of the adjacent levers.

The hinge-joint portion of this embodiment comprises a pair of hinge pins 5411 and a pair of fitting holes 5421 to which the hinge pins 5411 are fitted respectively. Hinge engagement between the hinge pins 5411 and the fitting holes 5421 makes the hinge-joint portion. In this embodiment, the hinge pins 5411 are disposed in the arm receiving portion 5126 of the central spoiler portion 5120, while the fitting holes 5421 are disposed in the intermediate arm 5210 of the intermediate lever 5200L, 5200R.

The central lever 5100 has an element for restricting the intermediate arm 5210 from moving in the width direction of the central lever 5100 so that the intermediate lever 5200L, 5200R joined to the central lever can be retained relative to the central lever 5100 without shake. Said element is configured such that the intermediate arm 5210 is inserted to the element and the movement in its width direction is restricted. The element comprises a pair of opposing surface portions or protrusion portions, which are located in the arm receiving portion 5126 of the central spoiler portion 5120, and to which the intermediate arm 5210 can be inserted or fitted. In this embodiment, the element comprises two pairs of raised surfaces 5131, 5132 formed in a lower inner surface of the central spoiler portion 5120. The raised surfaces 5131, 5132 of each pair are opposed to each other inside the central spoiler portion 5120 and protrude inwardly of the central spoiler portion 5120. The hinge pins 5411 protrude from the raised surfaces 5131 inwardly of the central spoiler portion 5120. The hinge pin 5411 has a beveled surface 5411a at its lower portion to facilitate fitting to the fitting holes 5421. When the central lever 5100 and the intermediate lever 5200L, 5200R are joined to each other, the intermediate arm 5210 is inserted or fitted in between the raised surfaces 5131, 5132. Spacing between the raised surfaces 5131, 5132 of each pair is almost equal to or somewhat greater than the width of the intermediate arm 5210.

The fitting holes 5421 may pierce through the lateral portions of the intermediate arm 5210 or be formed at a predetermined depth. The fitting holes 5421 are spaced from the longitudinal inner end surface 5223 of the intermediate spoiler portion 5220 by the spacing between the longitudinal outer end surface 5123 of the central spoiler portion 5120 and the hinge pin 5411.

The end levers 5300L, 5300R are joined to the intermediate levers 5200L, 5200R respectively and hold the wiper rubber assembly 210, 220. Descriptions are made as to the end lever 5300L with reference to FIGS. 64, 65, 70 and 71. The end lever 5300L and the end lever 5300R are symmetrical in the longitudinal direction of the lever assembly 5000. The end lever 5300L, 5300R includes an end arm 5310 to be situated in the arm receiving portion 5226 of the intermediate spoiler portion 5220 and an end spoiler portion 5320 oppositely extending from the end arm 5310. The end arm 5310 has an inverted U-shaped cross-section. The end spoiler portion 5320 has an inverted V-shaped cross-section. The end arm 5310 extends from a longitudinal inner end surface 5323 of the end spoiler portion 5320 toward the central lever 5100. A lower edge of the end arm 5310 and a lower edge of the end spoiler portion 5320 form an approximately straight line.

The end spoiler 533L, 533R is integrally formed in the end lever 5300L, 5300R. The end spoiler portion 5320 has a pair of inclined surfaces 5321F, 5321R that are symmetrical in the width direction of the end lever 5300L, 5300R. The inclined surfaces 5321F, 5321R are located in the lateral surfaces of the end spoiler portion 5320. The inclined surfaces 5321F, 5321R extend in the longitudinal direction of the wiper rubber 210 in the end lever 5300L, 5300R and form the lateral surfaces of the end spoiler portion 5320. Accordingly, the end spoiler 533L, 533R is integrated in the end lever 5300L, 5300R through the end spoiler portion 5320 having the inclined surfaces 5321F, 5321R. An apex portion 5322 interconnects the inclined surfaces 5321F, 5321R at their upper edges. The inclined surfaces 5321F, 5321R includes a concave surface. Further, a height dimension of the inclined surfaces 5321F, 5231R decreases gradually toward the distal end of the wiper blade 500. Further, lower edges of the inclined surfaces 5321F, 5321R approach each other at a distal end of the end lever 5300L, 5300R, thereby forming a round distal end of the end lever 5300L, 5300R along with the apex portion 5322. The inclined surfaces 5321F, 5321R may be curved with the same curvature as that of the inclined surfaces 5221F, 5221R of the intermediate spoiler portion 5220, or curved with a curvature varying therefrom. In this embodiment, the inclined surfaces 5321F, 5321R of the end spoiler portion is curved with the curvature greater than that of the inclined surfaces 5221F, 5221R at the outer end surface 5224 of the intermediate spoiler portion 5220.

The end lever 5300L, 5300R has a plurality of transverse ribs 5327 and a longitudinal rib 5328 therein. The transverse ribs 5327 are oriented in the width direction. The longitudinal rib 5328 is oriented in the longitudinal direction and intersects the transverse ribs 5327. The transverse ribs 5327 and the longitudinal rib 5328 are located in the end arm 5310 as well as the end spoiler portion 5320.

Each end lever 5300L, 5300R has two clamps 5325, 5311 for fixing the wiper rubber assembly 210, 220. A longitudinal inner clamp 5311 is formed at a distal end of the end arm 5310. The clamp 5311 has the same configuration as the clamp 5211 of the intermediate lever. A longitudinal outer clamp 5325 is formed at a lower edge of the end spoiler portion 5320 in the vicinity of a longitudinal outer end thereof. The clamp 5325 extends from the lower edge of the end spoiler portion 5320 in a V shape. Both ends of each clamp 5311, 5325 are inserted to the second groove 114 of the wiper rubber 210. A pair of longitudinally extending ribs 5329 are formed inside the end spoiler portion 5320 opposite the clamp 5325. A portion of the rib 5329 above the both ends of the clamp 5325 protrude downwardly to form a pressing portion 5333. When the lever assembly 5000 and the wiper rubber assembly 210, 220 are coupled to each other, the pressing portion 5333 presses the top side of the wiper rubber 210 downwardly (toward the both ends of the clamp 5325) or is placed on the top side of the wiper rubber 210 with little gap. Thus, the wiper rubber 210 is firmly fixed to the clamp 5325 by the pressing portion 5333.

The intermediate lever 5200L, 5200R and the end lever 5300L, 5300R are joined to each other via a hinge-joint portion hinge-jointing the interior of the intermediate spoiler portion 5220 and the end arm 5310 to each other. When the intermediate lever 5200L, 5200R and the end lever 5300L, 5300R are joined to each other, the end arm 5310 is situated in the arm receiving portion 5226 of the intermediate spoiler portion 5220 and is thus hidden within the intermediate spoiler portion 5220 when viewed from outside.

The hinge-joint portion between the intermediate lever 5200L, 5200R and the end lever 5300L, 5300R comprises a pair of hinge pins 5412 and a pair of fitting holes 5422 to which the hinge pins 5412 are fitted respectively. The hinge pins 5412 are disposed in the arm receiving portion 5226 of the intermediate spoiler portion 5220. The fitting holes are disposed in the end arm 5310.

The intermediate lever 5200L, 5200R has an element for restricting the end arm 5310 from moving in the width direction of the intermediate lever 5200L, 5200R so that the end lever 5300L, 5300R joined to the intermediate lever can be retained relative to the intermediate lever 5200L, 5200R without shake. Said element in the intermediate lever 5200L, 5200R has the same configuration as the element described above in connection with the central lever 5100. As said element, two pairs of raised surfaces 5231, 5232 are formed in a lower inner surface of the intermediate lever 5200L, 5200R. The raised surfaces 5231, 5232 of each pair are opposed to each other inside the intermediate spoiler portion 5220 and protrude inwardly of the arm receiving portion 5226. The hinge pins 5412 protrude from the raised surfaces 5231 inwardly of the arm receiving portion 5226. The hinge pin 5412 has a beveled surface 5412a at its lower portion to facilitate fitting to the fitting holes 5422. When the intermediate lever 5200L, 5200R and the end lever 5300L, 5300R are joined to each other, the end arm 5310 is inserted or fitted in between the raised surfaces 5231, 5232. Spacing between the raised surfaces 5231, 5232 of each pair is almost equal to or somewhat greater than the width of the end arm 5310.

The fitting holes 5422 may pierce through the lateral portions of the end arm 5310 or be formed at a predetermined depth. The fitting holes 5422 are spaced from the longitudinal inner end surface 5323 of the end spoiler portion 5320 by the spacing between the longitudinal outer end surface 5224 of the intermediate spoiler portion 5220 and the hinge pin 5412. A guide groove 5423 for guiding the insertion of the hinge pin 5412 is formed from a top side of the end arm 5310 to the fitting hole 5422.

Figure 72:
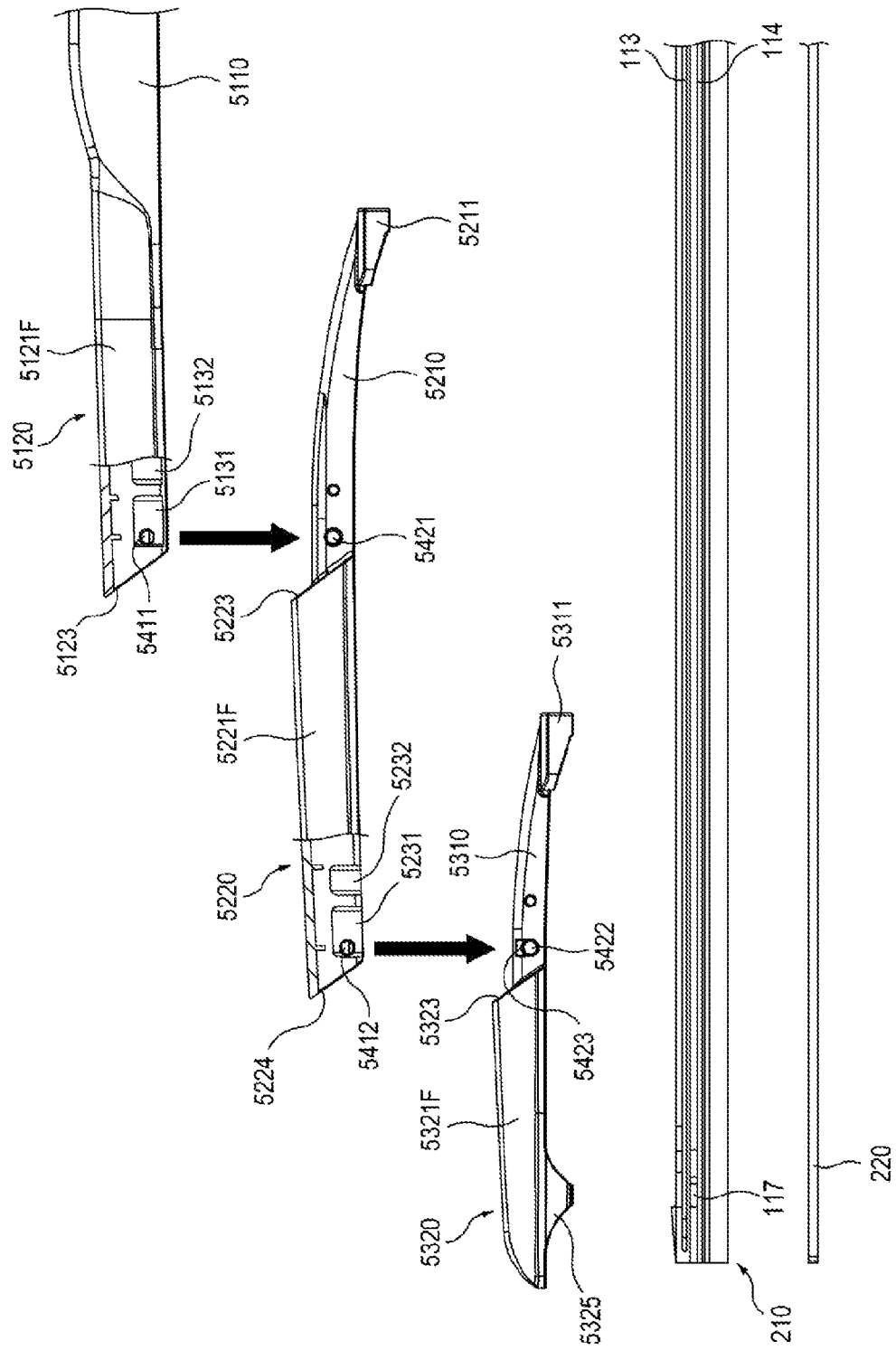
FIG. 72 depicts an assembly example of the wiper blade according to the fifth embodiment.

Descriptions are made as to an example assembly of the wiper blade 500 according to the fifth embodiment with reference to FIG. 72.

The longitudinal outer end surface 5123 of the central spoiler portion 5120 and the longitudinal inner end surface 5223 of the central spoiler portion 5220 are approximated and one of them is pressed or pushed down against the other of them. Then, the hinge pins 5411 of the central spoiler portion 5120 enter the fitting holes 5421 while pressing or pinching an upper portion of the intermediate arm 5210. Subsequently, the hinge pins 5411 snap-engage the fitting holes 5421, thereby hinge-jointing the central lever 5100 and the intermediate lever 5200L to each other via the hinge pins 5411 and the fitting holes 5421. When the central lever 5100 and the intermediate lever 5200L are joined to each other, a portion of the intermediate arm 5210 adjacent to the fitting hole 5421 and another portion further inward than the portion are sandwiched between the raised surfaces 5131 as well as between the raised surfaces 5132. The intermediate lever 5200L and the end lever 5300L are joined to each other in the above-described manner. That is, the longitudinal outer end surface 5224 of the intermediate spoiler portion 5220 and the longitudinal inner end surface 5323 of the end lever 5300L are approximated and one of them is pressed against the other of them. Then, the hinge pins 5412 of the intermediate spoiler portion 5220 snap-engage the fitting holes 5422 of the end arm 5210, thereby hinge-jointing the intermediate lever 5200L and the end lever 5300L to each other. Hinge-joint between the central lever 5100 and the intermediate lever 5200R and hinge-joint between the intermediate lever 5200R and the end lever 5300L are made in the above-described manner.

By fitting the clamps 5325, 5311 of the end levers 5300L, 5300R and the clamps 5211 of the intermediate levers 5200L, 5200R to the second groove 114 of the wiper rubber 210, the wiper rubber assembly 210, 220 and the lever assembly 5000 are coupled to each other. For example, the clamps 5325, 5311 of the end lever 5300L, the clamp 5211 of the intermediate lever 5200L, the clamp 5211 of the intermediate lever 5200R and the clamps 5311, 5325 of the end lever 5300R are inserted to the second groove 114 of the wiper rubber one after another while sliding the wiper rubber assembly 210, 220 along the lever assembly 5000. If the both ends of the clamp 5325 of the end lever 5300L is fitted to the insertion holes 117, then the wiper rubber assembly 210, 220 is fixed to the lever assembly 5000.

Referring again to FIGS. 61 to 63 showing the assembled wiper blade 500, the lever assembly 5000 holds the wiper rubber assembly 210, 220 at six pressure points via the clamps 5325, 5311 of the end levers 5300L, 5300R and the clamps 5211 of the intermediate levers 5200L, 5200R. Further, the central lever 5100, the intermediate levers 5200L, 5200R and the end levers 5300L, 5300R are straight arranged along the length of the wiper rubber 210 and are at the same height on the wiper rubber 210. Further, in the assembled wiper blade 500, the inclined surfaces 5121F, 5121R of the central spoiler portion 5120, the inclined surfaces 5221F, 5221R of the intermediate spoiler portion 5220 and the inclined surfaces 5321F, 5321R of the end spoiler portion 5320 are straight adjoined one after another, thereby defining the spoiler 530L, 530R having the cross-sectional profile varying in the longitudinal direction and having a decreasing height dimension. The longitudinal end surface 5123 of the central lever 5100, the longitudinal end surfaces 5223, 5224 of the intermediate lever 5200L, 5200R and the longitudinal end surface 5323 of the end lever 5300L, 5300R are inclined at an acute angle toward the distal end of the wiper blade 500. Thus, the intermediate lever 5200L, 5200R and the end lever 5300L, 5300R cannot pivot upwardly relative to the central lever 5100. Accordingly, when a downward load acts on the wiper blade 500, the lever assembly 5000 brings the wiper rubber 210 into strong contact with the windshield.

In this embodiment, the hinge pins 5411, 5412 are located in the central spoiler portion 5120 and the intermediate spoiler portion 5220, while the fitting holes 5421, 5422 are located in the intermediate arm 5210 and the end arm 5310. In another embodiment, the hinge pins may be disposed in the intermediate arm 5210 and the end arm 5310, while the fitting holes corresponding to the hinge pins may be in the arm receiving portion 5126 of the central spoiler portion 5120 and the arm receiving portion 5226 of the intermediate spoiler portion 5220. Further, wiper blades according to other embodiments may be configured to hold the wiper rubber at four or eight pressure points by means of the above-described hinge-joint portion. That is, opposing end surfaces of two adjacent levers in the lever assembly 1000 of the first embodiment or the lever assembly 3000 of the third embodiment may be inclined toward the distal end of the wiper rubber and hinge joint between the adjacent levers may comprise the hinge pins 5411, 5412 and the fitting holes 5421, 5422.

FIGS. 73 to 78 show a wiper blade 600 according to a sixth embodiment. The wiper blade 600 includes a lever assembly having an additional element that prevents the lift of the wiper blade or minimizes an eddy flow phenomenon occurring inside the lever assembly.

In the foregoing embodiments, since the spoiler portion of each lever of the lever assembly has an inverted V-shaped cross-section, the spoiler portion is hollow. The wiper rubber extends below each lever and has a width narrower than each lever. Thus, during running of a motor vehicle, wind or air stream can enter the interior of each lever through between the lower edge of the spoiler portion of the each lever and the wiper rubber. For example, wind or air stream can enter the interior of each lever through between the wiper rubber and a lower edge of the inclined surface, which faces forward when a motor vehicle runs. The entering wind or air stream impinges against the inclined surface facing backward and then eddies inside the lever. As a result, during running of the motor vehicle, an eddy flow may occur inside each lever. Such an eddy flow may lift the wiper blade from a surface of a windshield.

The lever assembly of the wiper blade 600 has an air hole at each lever. The air hole allows the wind or air stream within each lever to flow out of the lever. The air hole is formed in the inclined surface of each lever, which faces backward during running of a motor vehicle. Such an air hole may be employed to all the wiper blades 100, 200, 300, 400, 500 according to the first to fifth embodiments. In FIGS. 73 to 76, the same elements or components as those of the wiper blade 200 of the second embodiment are denoted by the same reference numerals.

Figure 73:
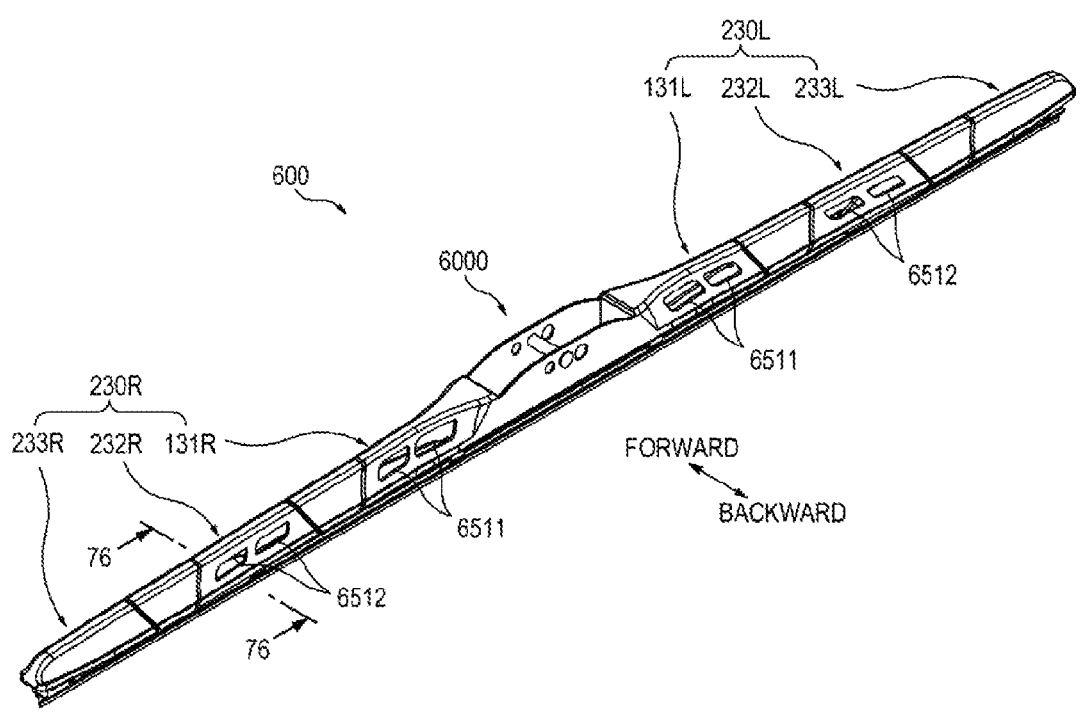
FIG. 73 is a rear perspective view of a wiper blade in accordance with a sixth embodiment.
Figure 74:
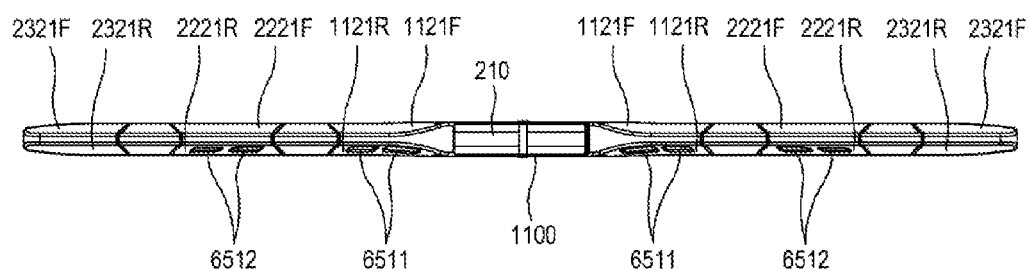
FIG. 74 is a top view of the wiper blade shown in FIG. 73.
Figure 75:
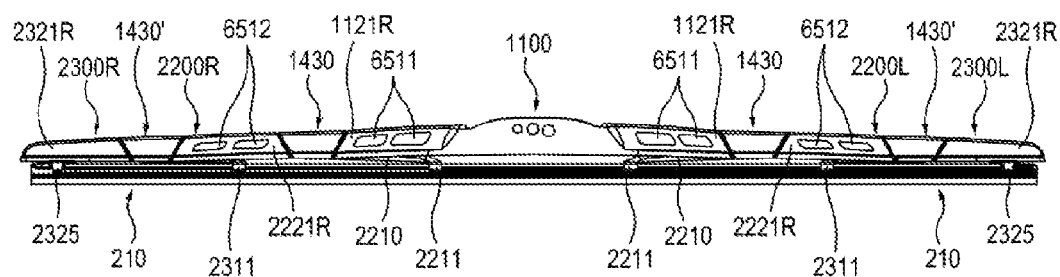
FIG. 75 is a rear view of the wiper blade shown in FIG. 73.
Figure 76:
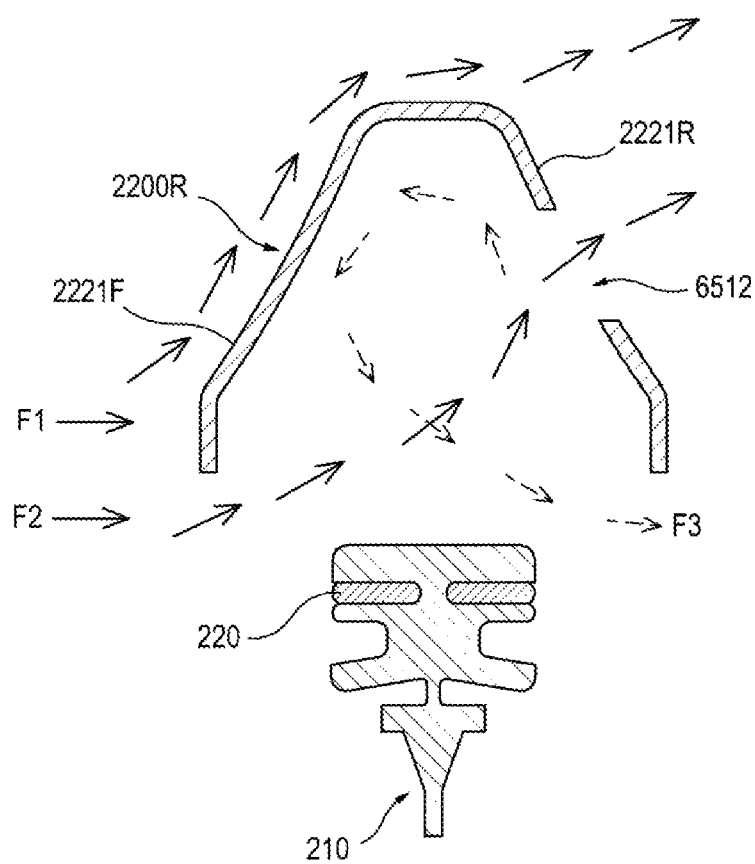
FIG. 76 is a schematic sectional view taken along the line 76-76 in FIG. 73.

Referring to FIGS. 73 to 75, a lever assembly 6000 of the wiper blade holds and supports the wiper rubber assembly 210, 220. The spoiler 230L, 230R that extends in the longitudinal direction of the wiper rubber is integrally formed in the lever assembly 6000. The lever assembly 6000 includes the central lever 1100 centrally located in the wiper rubber assembly 210, 220, the intermediate levers 2200L, 2200R hinge-jointed to the both longitudinal ends of the central lever 1100 respectively and the end levers 2300L, 2300R hinge-jointed to the longitudinal ends of the intermediate levers 2200L, 2200R respectively. The spoiler 230L, 230R comprises spoiler sections integrated in the respective levers. That is, the central spoiler 131L, 131R is integrated in the central lever 1100, and the intermediate spoiler 232L, 232R is integrated in the intermediate lever 2200L, 2200R, and the end spoiler 233L, 233R is integrated in the end lever 2300L, 2300R. The central spoiler 131L, 131R is defined by a pair of the inclined surfaces 1121F, 1121R of the central spoiler portion 1120. The intermediate spoiler 232L, 232R is defined by a pair of the inclined surfaces 2221F, 2221R of the intermediate spoiler portion 2220. The end spoiler 233L, 233R is defined by a pair of the inclined surfaces 2321F, 2321R of the end spoiler portion 2320. The inclined surfaces 1121F, 2221F, 2321F among said inclined surfaces are a forward inclined surface that faces forward in a running direction of a motor vehicle, while the inclined surfaces 1121R, 2221R, 2321R are a backward inclined surface, which is opposite to the forward inclined surface and faces backward in the running direction of a motor vehicle.

The above-described air hole is provided in the backward inclined surface. Specifically, two air holes 6511, 6512 are provided in the inclined surface 1121R of the central lever 1100 and the inclined surface 2221R of the intermediate lever 2200L, 2200R, respectively. The air hole 6511, 6512 is a through hole perforated in the lateral surfaces of the spoiler portion 1120, 2220, at which the inclined surface 1121R, 2221R is located. The air hole 6511 is located in the inclined surface 1121R of the central lever between its upper edge and its lower edge. The air hole 6512 is located in the inclined surface 2221R of the intermediate lever between its upper edge and its lower edge. In FIGS. 73 to 75, the air hole 6511, 6512 generally has a parallelogram shape. In other embodiment, the air hole 6511, 6512 may have a shape of a rectangle, a circle, an ellipse, etc. Further, in other embodiment, the above-described air hole may be formed in the inclined surface 2321R of the end lever 2300L, 2300R.

The air hole 6511, 6512 allows the wind or air stream, which enters the interior of each lever, to flow out of each lever. For example, referring to FIG. 76 and assuming that a motor vehicle runs with the wiper blade 600 placed on the windshield surface, the flow of air or wind around the wiper blade 600 may be divided into the following two flows: a flow F1 crossing over the spoiler portion (in FIG. 76, the inclined surface 2221F defining the intermediate spoiler 232R); and a flow F2 flowing to the interior of the lever (in FIG. 76, the intermediate lever 2200R) through between the lower edge of the spoiler portion (the lower edge of the inclined surface 2221F) and the wiper rubber 210. The flow F2 flows to the interior of the intermediate lever 2200R and then flows out of the inclined surface 2221R of the intermediate lever 2200R through the air hole 6512. A portion of the flow F2 may impinge against the inner surface of the intermediate lever 2200R above the air hole 6512 to thus form an eddy flow and then form a flow F3 that flows out of the intermediate lever 2200R through between the lower edge of the inclined surface 2221R and the wiper rubber 210. As described above, most of the flow F2, which enters the interior of the lever through the lower edge of the spoiler portion, flows out of the lever through the air hole 6511, 6512, thus minimizing the occurrence of the eddy flow inside the lever.

Figure 77:
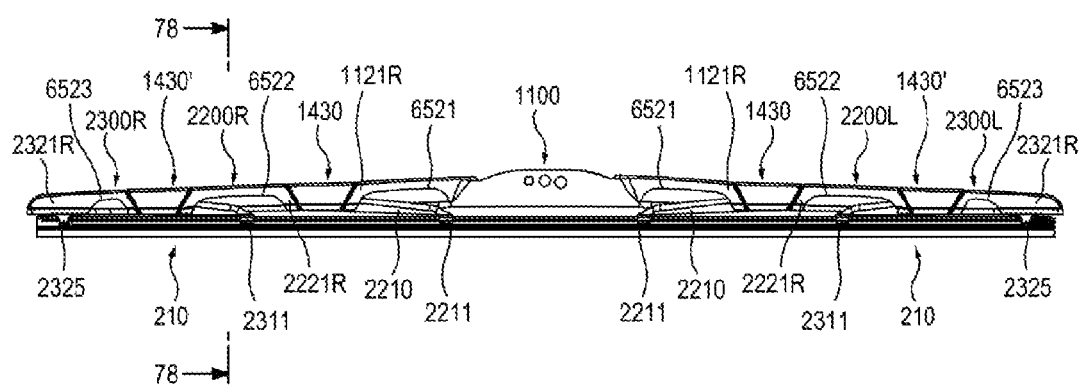
FIG. 77 is a rear view of the wiper blade according to the sixth embodiment showing another example of an air hole.
Figure 78:
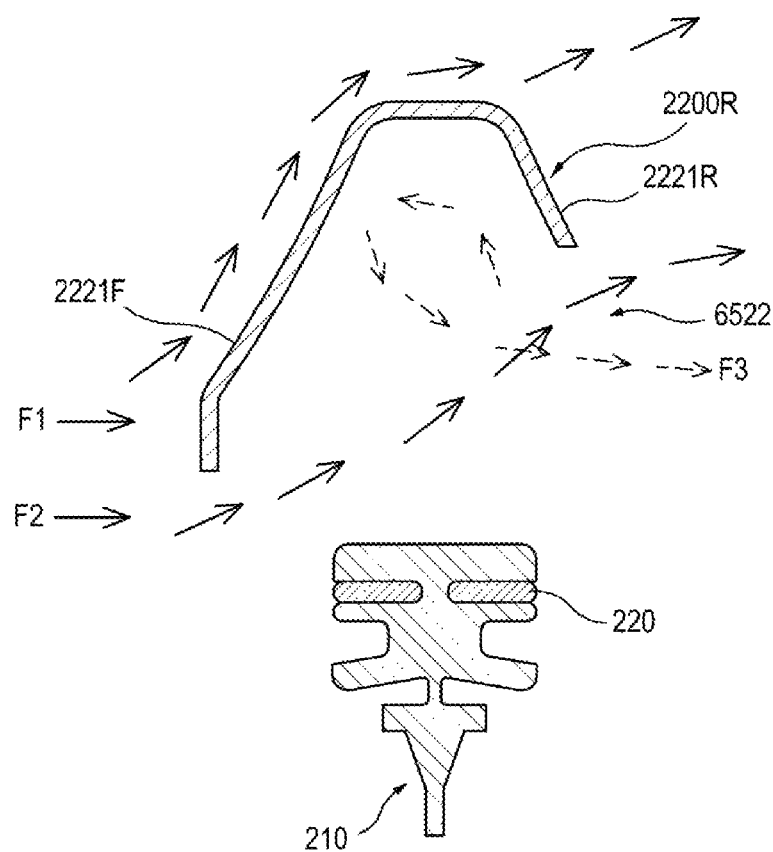
FIG. 78 is a schematic sectional view taken along the line 78-78 in FIG. 77.

FIGS. 77 and 78 show another example of the air hole. Referring to FIG. 77, the air holes 6521, 6522, 6523 are formed in the central lever 1100, the intermediate lever 2200L, 2200R and the end lever 2300L, 2300R respectively. In this example, the air hole 6521, 6522, 6523 is an opening that is cut away in a semi-elliptical shape from the lower edge of the spoiler portion 1120, 2220, 2320 with the backward inclined surface 1121R, 2221R, 2321R. Referring to FIG. 78, most of the flow F2, which flows into the interior of the intermediate lever 2200R through between the lower edge of the inclined surface 2221F of the intermediate lever 2200R and the wiper rubber 210, flows out of the inclined surface 2221R of the intermediate lever 2200R through the air hole 6522. Only the partial flow F3 of the flow F2, which impinges against the inner surface of the intermediate lever 2200R above the air hole 6522, makes the eddy flow and then flows out of the inclined surface 2221R of the intermediate lever 2200R through the air hole 6522. As described above, most of the flow F2, which enters the interior of the lever through the lower edge of the spoiler portion, flows out of the lever through the air hole 6521, 6522, 6523, thus minimizing the occurrence of the eddy flow inside the lever.

Figure 79:
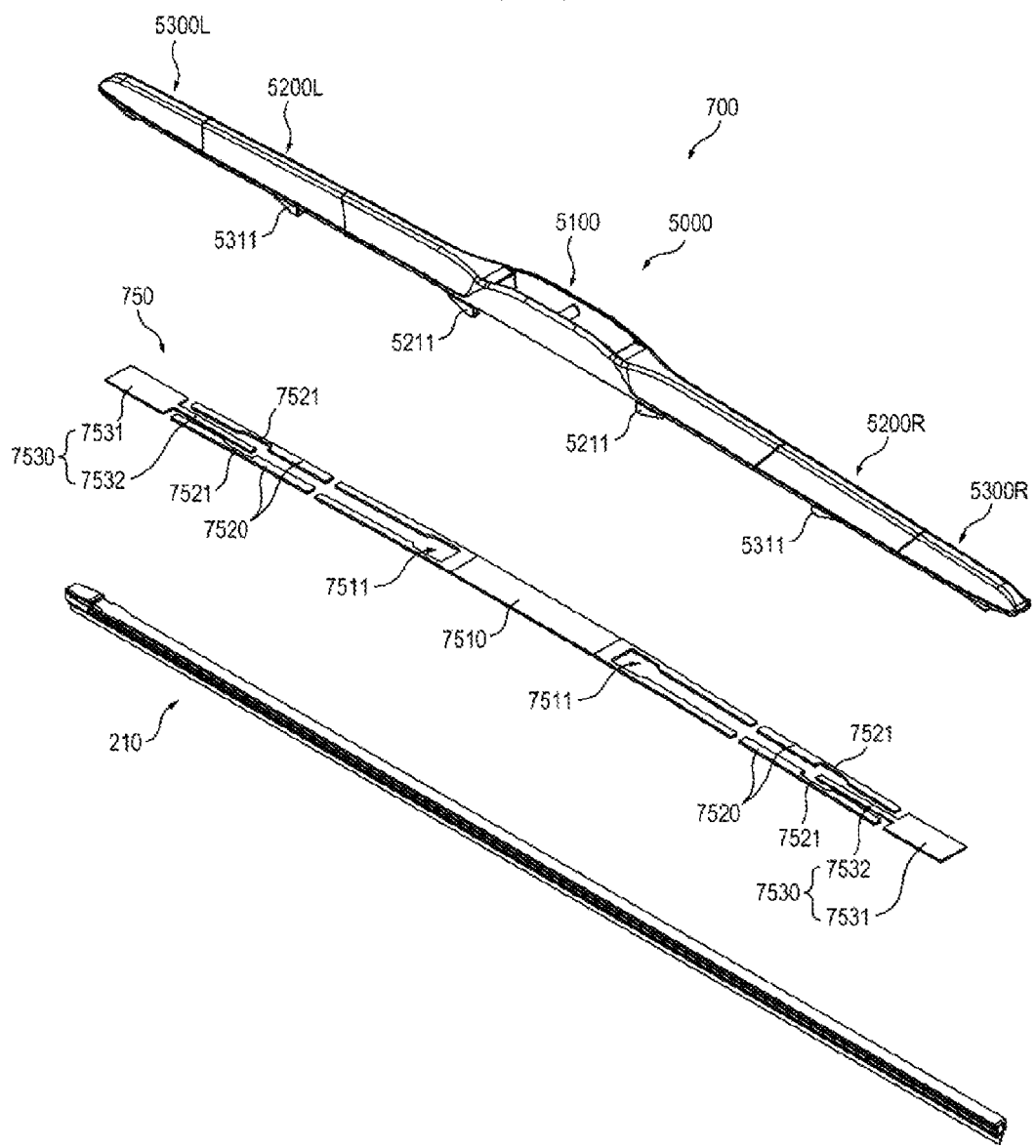
FIG. 79 is an exploded perspective view of a wiper blade in accordance with a seventh embodiment.
Figure 80:
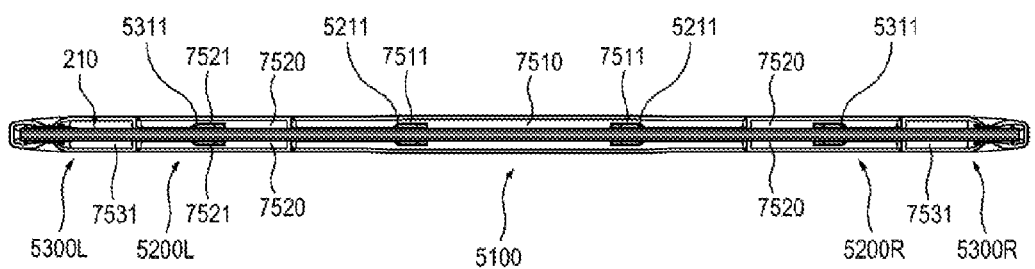
FIG. 80 is a bottom view of the wiper blade shown in FIG. 79.
Figure 81:
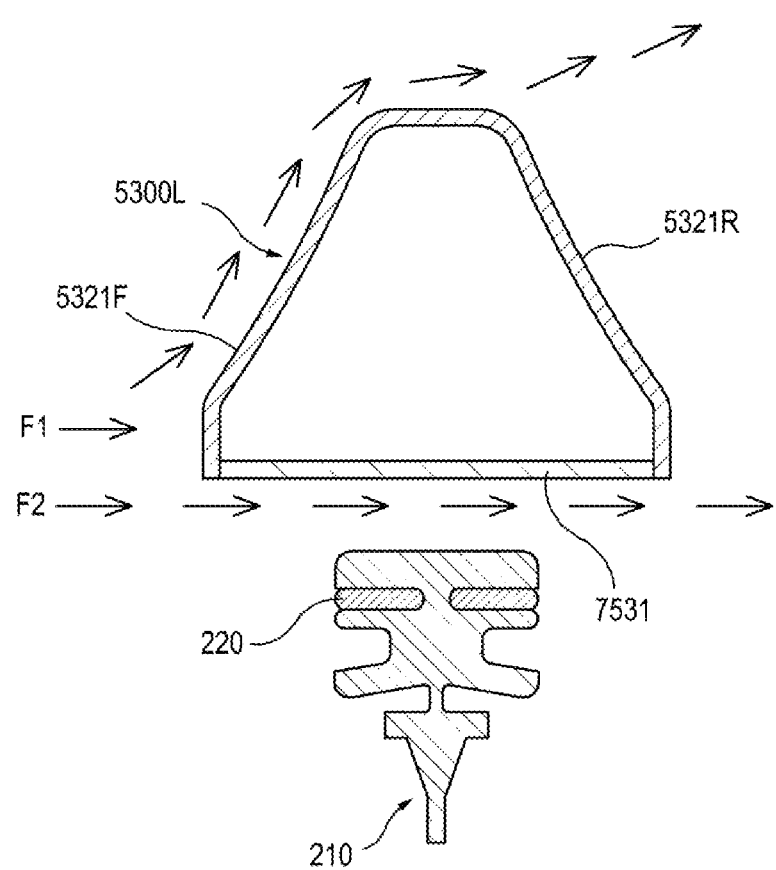
FIG. 81 shows an example of a cross-section of the wiper blade shown in FIG. 79.

FIGS. 79 to 81 show a wiper blade 700 according to a seventh embodiment. A lever assembly of the wiper blade 700 according to this embodiment is configured to prevent wind or air stream from entering the interior of the lever assembly during running of a motor vehicle.

The lever assembly of the wiper blade 700 includes a covering member at its underside. The covering member covers the interior of the lever assembly or its lever, thus preventing wind or air stream from entering the interior of the lever of the lever assembly during running of a motor vehicle. Such a covering member may be employed to all the wiper blades 100, 200, 300, 400, 500 according to the foregoing first to fifth embodiments. Descriptions are made below as to the wiper blade of this embodiment by way of example wherein said covering member is employed to the lever assembly 5000 of the wiper blade 500 according to the fifth embodiment.

Referring to FIGS. 79 and 80, the lever assembly 5000 of the wiper blade 700 includes the covering member 750 that is coupled to the underside of the lever assembly 5000 in the longitudinal direction. The covering member 750 is elongated to correspond to a plane shape of the underside of the lever assembly 5000 and comprises a sheet body made from a plastic or metallic material. The covering member 750 may comprise a single one elongated piece extending along the length of the lever assembly 5000 or a plurality of single pieces as many as levers constituting the lever assembly 5000. In this embodiment, the covering member 750 comprises a plurality of covering sheets corresponding to each lever of the lever assembly 5000 respectively.

The covering member 750 comprises a central covering sheet 7510 coupled to the underside of the central lever 5100, an intermediate covering sheet 7520 coupled to the underside of the intermediate lever 5200L, 5200R, and an end covering sheet 7530 coupled to the underside of the end lever 5300L, 5300R. Each covering sheet may be coupled to the associated lever in various manners and such coupling between the covering sheet and the lever is not limited to the particular manner. For example, the covering sheet may be coupled to the lever through snap-engagement, fitting, attachment, etc. As to snap-engagement, opposing edges of the underside of each lever may be provided with hook-shaped elements capable of hooking the edges of the corresponding covering sheet therein. As to fitting, the opposing edges of the underside of each lever may be provided with a pair of rails or grooves and the covering sheet may be fitted to those rails or grooves. As to attachment, the covering sheet may be adhered to the associated lever by means of adhesive.

Each covering sheet is configured to substantially cover the interior of the associated lever at the underside of the associated lever. Further, each covering sheet is configured not to interfere with the arm and the clamp of the lever. The central covering sheet 7510 has, at its longitudinal sides, slits 7511 for avoiding interference with the intermediate arm 5210 and the clamp 5211 of the intermediate lever 5200L, 5200R. The slit 7511 extends inwardly from an end of the central covering sheet 7510 and is configured to accommodate the intermediate arm 5210 and the clamp 5211. When the central covering sheet 7510 is coupled to the central lever 5100 in the lever assembly 5000 with its levers adjoined one after another, the intermediate arm 5210 and the clamp 5211 of the intermediate lever 5200L, 5200R are situated in the slit 7511. The intermediate covering sheet 7520 includes a pair of sheets. Opposing edges of the sheets are formed with a notch 7521 for avoiding interference with the clamp 5311 of the end lever 5300L, 5300R. When the intermediate covering sheet 7520 is coupled to the intermediate lever 5200L, 5200R in the lever assembly 5000 with its levers adjoined one after another, the clamp 5311 of the end lever 5300L, 5300R is situated between a pair of the notches 7521. The end covering sheet 7530 has a portion 7531, which is located in the underside of the end lever 5300L, 5300R, and an extension portion 7532 extending from the portion 7531 toward the intermediate covering sheet 7520. The extension portion 7532 extends up to the notch 7521 between the sheets of the intermediate covering sheet 7520. When the end covering sheet 7530 is coupled to the end lever 5300L, 5300R in the lever assembly 5000 with its levers adjoined one after another, the portion 7531 is coupled to the underside of the end lever 5300L, 5300R and the extension portion 7532 is placed below a portion of the end lever 5310.

If the central covering sheet 7510, the intermediate covering sheet 7520 and the end covering sheet 7530 are coupled to the respective associated levers, then the interior of the lever assembly 5000 is substantially covered by the covering sheets. Thus, those covering sheets prevent wind or air stream from entering each lever of the lever assembly 5000. For example, referring to FIG. 81 and assuming that a motor vehicle runs with the wiper blade 700 placed on the windshield surface, the flow of air or wind around the wiper blade 700 may be divided into the following two flows: a flow F1 crossing over the upper surface of the lever (in FIG. 81, the end lever 5300L); and a flow F2 passing by the underside of the lever (in FIG. 81, the end lever 5300L). The flow F2 cannot enter the interior of the lever or the lever assembly due to the covering sheet located at the underside of the lever (in FIG. 81, the end covering sheet). Accordingly, since wind or air stream does not enter the interior of the lever assembly 5000 during running of a motor vehicle, the wiper blade 700 can be brought into strong contact with windshield surface under the reaction force produced by the spoiler 530L, 530R.

Figure 82:
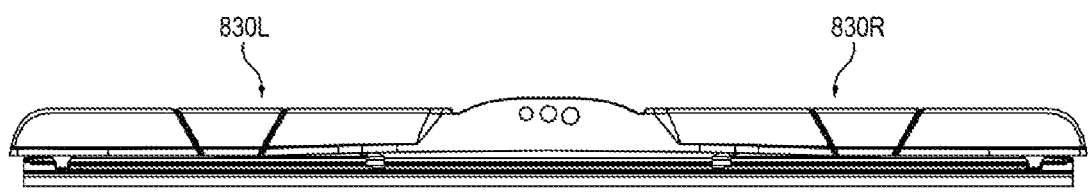
FIG. 82 is similar to FIG. 3 and shows another example of a cross-sectional profile of a spoiler.
Figure 83:
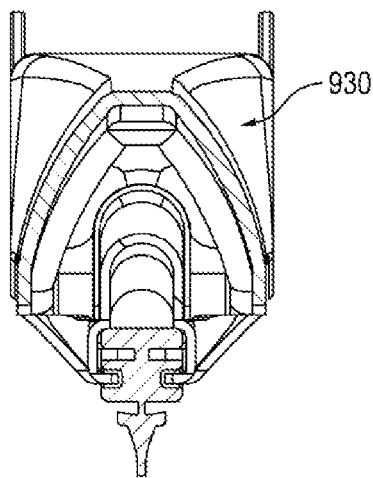
FIG. 83 is similar to FIG. 6 and shows yet another example of a cross-sectional profile of a spoiler.

In the foregoing embodiments, the spoiler 130L, 130R, 230L, 230R, 330L, 330R, 430L, 430R, 530L, 530R integrated in the lever assembly has the cross-section profile of a triangle with both concave legs. The wiper blade of the present invention may have a cross-sectional profile other than the above-described cross-section profile. For example, as shown in FIG. 82, a spoiler 830L, 830R integrated in the lever assembly may have a cross-sectional profile, a height dimension of which is constant from the center of the wiper blade to its distal end. Further, as shown in FIG. 83, a cross-sectional profile of a spoiler 930 integrated in the lever assembly may include a triangle with both convex legs, a semicircle, or a semi-oval. That is, the cross-sectional profile of the spoiler 930 may include a pair of convex curves that are symmetrical in the width direction of the lever assembly.

In the foregoing first to third embodiments, the hinge-joint portion 1400L, 1400R, 2400L, 2400R, 2400'L, 2400'R, 3400L, 3400R, 3400'L, 3400'R comprises a rivet joint. By way of another example of the hinge-joint portion, the hinge-joint portion comprises a pin joint using a pin instead of a rivet. In such an example, the joint cover 1430, 1430' may have an element for fixing the pin therein.

Further, in other embodiment, a portion of one of two adjacent levers may be situated within a spoiler portion of the other of the two adjacent levers, which is further outward than said one of the two adjacent levers. That is, the central lever may include an arm extending toward the distal end of the wiper blade. Further, the intermediate lever or the end lever, which adjoins the central lever, may include a spoiler portion, which forms the spoiler section and hides the arm of the central lever, and an arm, which extends from the spoiler portion toward the distal end of the wiper blade and has a clamp at its distal end.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A wiper blade, comprising:
   a wiper rubber; and
   a lever assembly holding the wiper rubber and coupled to a wiper arm, the lever assembly including a plurality of levers, adjacent levers of which are hinge-jointed to each other,
   wherein one of the adjacent levers includes a spoiler portion forming a section of a spoiler integrated in the one of the adjacent levers and the other of the adjacent levers includes a spoiler portion forming a section of a spoiler integrated in the other of the adjacent levers,
   wherein the one of the adjacent levers includes an arm extending from the spoiler portion of the one of the adjacent levers toward the other of the adjacent levers and holding the wiper rubber at a distal end; and a stepped surface formed between the spoiler portion of the one of the adjacent levers and the arm of the one of the adjacent levers,
   wherein the arm of the one of the adjacent levers is situated in the spoiler portion of the other of the adjacent levers,
   wherein a longitudinal outer end surface of the spoiler portion of the other of the adjacent levers faces the stepped surface of the one of the adjacent levers,
   wherein the lever assembly further includes a joint nested on the arm of the one of the adjacent levers and hinge-jointed to the arm of the one of the adjacent levers, the joint being located adjacent to the stepped surface of the one of the adjacent levers,
   wherein the joint is inserted to an inside of the spoiler portion of the other of the adjacent levers and snap-engages the spoiler portion of the other of the adjacent levers,
   wherein the joint has a snap protrusion at a longitudinal inner lower edge and a mating protrusion at a longitudinal outer end surface,
   wherein the spoiler portion of the other of the adjacent levers has a snap notch, to which the snap protrusion is fitted, at a lower edge and a mating notch, which mates the mating protrusion, at the longitudinal outer end surface, and
   wherein when the joint is inserted to the inside of the spoiler portion of the other of the adjacent levers, all portions of the joint except the snap protrusion and the mating protrusion are hidden in the spoiler portion of the other of the adjacent levers.

2. The wiper blade of claim 1, wherein the spoiler portion of the one of the adjacent levers includes an inclined surface extending in a longitudinal direction of the wiper rubber and defining the section of a spoiler of the one of the adjacent levers,
   wherein the spoiler portion of the other of the adjacent levers includes an inclined surface extending in a longitudinal direction of the wiper rubber and defining the section of a spoiler of the other of the adjacent levers,
   wherein at least a portion of a lateral surface of the spoiler portion of the one of the adjacent levers forms the inclined surface of the spoiler portion of the one of the adjacent levers, and
   wherein at least a portion of a lateral surface of the spoiler portion of the other of the adjacent levers forms the inclined surface of the spoiler portion of the other of the adjacent levers.

3. The wiper blade of claim 2, wherein the inclined surface comprises a forward inclined surface facing forward in a running direction of a motor vehicle and a backward inclined surface opposed to the forward inclined surface, and
   wherein the backward inclined surface has at least one air hole.

4. The wiper blade of claim 1, wherein the arm of the one of the adjacent levers is hidden in the spoiler portion of the other of the adjacent levers, and
   wherein the arm and the spoiler portion of the one of the adjacent levers extend straight.

5. The wiper blade of claim 1, wherein an outermost lever of the plurality of levers includes a clamp formed at an end portion of the spoiler portion thereof and holding the wiper rubber; and a clamp insert fitted to the clamp and bringing the wiper rubber into contact with the clamp.

6. The wiper blade of claim 1, wherein the lever assembly includes a covering sheet covering an interior of the lever assembly.

7. The wiper blade of claim 1, wherein the plurality of levers comprise:
   a central lever coupled to the wiper arm; and
   a pair of end levers each holding the wiper rubber and joined to the central lever.

8. The wiper blade of claim 1,
   wherein the plurality of levers comprise:
   a central lever coupled to the wiper arm;
   a pair of intermediate levers each holding the wiper rubber and joined to the central lever; and
   a pair of end levers each holding the wiper rubber and joined to the pair of intermediate levers.

9. The wiper blade of claim 8, wherein each respective intermediate lever includes a yoke lever, said yoke lever being hinge-jointed to a distal end of the each respective intermediate lever and holding, at both ends, the wiper rubber.

10. The wiper blade of claim 1, wherein the spoiler has a cross-sectional profile varying in a longitudinal direction of the wiper rubber.

11. The wiper blade of claim 1, wherein the spoiler has a cross-sectional profile including one of a triangle with both curved legs, a semicircle and a semiellipse.

* * * * *